United States Patent [19]
Brotsky et al.

[11] Patent Number: 5,490,246
[45] Date of Patent: Feb. 6, 1996

[54] IMAGE GENERATOR USING A GRAPHICAL FLOW DIAGRAM WITH AUTOMATIC GENERATION OF OUTPUT WINDOWS

[75] Inventors: Daniel C. Brotsky, Berkeley, Calif.; Daniel E. Rabin, New Haven, Conn.; David M.E. Levy, Palo Alto, Calif.

[73] Assignee: Xerox Corporation, Stamford, Conn.

[21] Appl. No.: 294,780

[22] Filed: Aug. 23, 1994

Related U.S. Application Data

[63] Continuation of Ser. No. 744,630, Aug. 13, 1991, abandoned.

[51] Int. Cl.$^6$ ..................................................... G06F 3/00
[52] U.S. Cl. ........................... 395/161; 395/159; 395/157
[58] Field of Search .................................. 395/155–161, 395/152, 140; 345/117–120; 358/443

[56] References Cited

U.S. PATENT DOCUMENTS

| | | | |
|---|---|---|---|
| 4,611,306 | 9/1986 | Crehan et al. | 395/156 |
| 4,813,013 | 3/1989 | Dunn et al. | 395/159 |
| 4,860,204 | 8/1989 | Gendron et al. | 395/140 |
| 4,881,130 | 11/1989 | Hayashi | 358/443 |
| 4,901,063 | 2/1990 | Kimura et al. | 395/161 X |
| 4,901,221 | 2/1990 | Kodosky et al. | 395/159 X |
| 4,914,568 | 4/1990 | Kodosky et al. | 395/159 X |
| 4,928,247 | 5/1990 | Doyle et al. | 395/160 |
| 4,941,057 | 7/1990 | Lehmbeck et al. | 358/443 |
| 4,953,106 | 8/1990 | Gansner et al. | 395/160 |
| 5,021,976 | 6/1991 | Wexelblat et al. | 395/159 |
| 5,093,907 | 3/1992 | Hwong et al. | 395/152 |
| 5,301,301 | 4/1994 | Kodosky et al. | 395/159 X |
| 5,325,481 | 6/1994 | Hunt | 395/159 |
| 5,377,318 | 12/1994 | Wolber | 395/159 |

OTHER PUBLICATIONS

Wilson, "A Picture's Worth a Thousand Lines of Code", ESD Mag., Jul. 1989, pp. 57–62.
Smith, "Visual Programming in the Interface Construction Set", IEEE, 1988, pp. 109–120.
Edel, "The Tinkertoy Graphical Programming Environment", IEEE, 1988, pp. 1110–1115.
Tonomura et al, "Content Oriented Visual Interface Using Video Icons for Visual Database Systems", IEEE, 1989, pp. 68–73.
Yoshimoto et al, "Interactive Iconic Programming Facility in HI–VISUAL", IEEE Workshop, Jun. 1986, pp. 34–41.
Williams et al, "A Visual Language for Image Processing", IEEE, Oct. 1990, pp. 86–91.
Hirakawa et al, "A Generic Model for Constructing Visual Programming Systems", IEEE, 1989, pp. 124–129.
Clarisse et al, "An Icon Manager in Lisp", IEEE Workshop, Oct. 1985, pp. 116–131.
Hirakawa et al, "A Framework for Construction of Icon Systems", 1988 IEEE Workshop, Oct. 1988, pp. 70–77.
Hurt, "IDF"; IEEE 1990 Int. Conf., Nov. 1990, pp. 351–360.
Ichikawa et al., "Visual Programming—Toward Realization (List continued on next page.)

*Primary Examiner*—Raymond J. Bayerl
*Assistant Examiner*—John E. Breene
*Attorney, Agent, or Firm*—Oliff & Berridge

[57] ABSTRACT

A graphics editor generates an Appearance Construction Graph (ACG) which represents an image formation process as a Directed Acyclic Graph (DAG). The ACG image transformation operations (transforms), and outputs (viewable images—sinks) which can be displayed, for example, in a window of a display screen, and manipulated to construct and edit complex images. Accordingly, the displayed ACG is a user interface that permits complex graphics images to be constructed in a straightforward manner, and thus easily understood and manipulated (edited) by an operator. The nodes in the ACG are selectively interconnected by links (edges). The complex image represented by the ACG can be constructed and displayed in a viewer window on the display screen by "running" the ACG. The graphics editor "runs" the ACG by performing operations on the image fragments as defined by the interconnected nodes of the ACG. When the ACG is "run", each output (or viewer) node displays its image in a viewer window which is automatically created.

34 Claims, 16 Drawing Sheets

OTHER PUBLICATIONS of User–Friendly Programming Environments", 1987 Proceedings, Oct. 1987, pp. 129–137.

Myers, "The State of the Art in Visual Programming", CMU Technical Report, Feb. 1988, pp. 1–25.

Shu, "Visual Programming", IBM Systems Journal, vol. 28, No. 4, 1989, pp. 525–547.

Macintosh System Software User's Guide v. 60, Apple Corp., 1988, pp. 14–43, 148–150.

Chang, "Visual Languages", IEEE Software, Jan. 1987, pp. 29–39.

Hirakawa et al, "An Iconic Programming System, HI–Visual" IEEE Trans. on Software Eng., Oct. 1990, pp. 1178–1184.

Microsoft Paintbrush, Microsoft Corp., 1986, pp. 11–20.

Byte, Jan., 1990—Gray F/X: Xerox Brings Good Image–Editing Tools to DOS, pp. 84 and 86.

ACM Conference on Document Processing Systems, Dec. 5–9, 1988, The Escher Document Imaging Model, pp. 159–168.

Smith, "Building Interfaces Interactively", Proceedings of the ACM Siggraph. symposium on User Interface Software, Oct. 17, 1988.

Schonhut et al., "Constructive Page Description", IEEE Computer Graphics and Applications, vol. 11, No. 2, pp. 71–78, Mar., 1991.

Wyvill, "Space Division for Ray Tracing in CSG", IEEE Computer Graphics and Applications, vol. 6, No. 4, pp. 28–34, Apr., 1986.

Bier et al., "Gabriel: A Design Environment for DSP", IEEE Micro, vol. 10, No. 5, pp. 28–45, Oct., 1990.

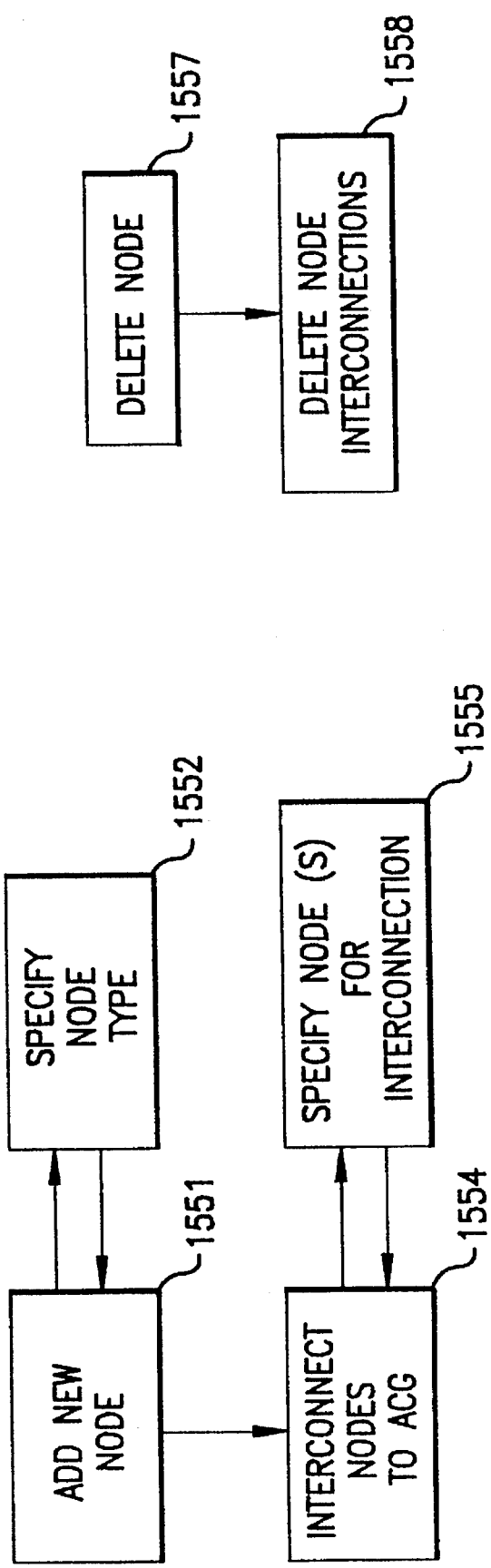

IMAGE GENERATOR USING A GRAPHICAL FLOW DIAGRAM WITH AUTOMATIC GENERATION OF OUTPUT WINDOWS

This is a Continuation of application Ser. No. 07/744,630 filed Aug. 13, 1991, now abandoned.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of the Invention

The present invention relates to graphics editors, and more particularly to graphics editors for constructing and editing complex graphics images, and to methods for forming and editing complex graphics images through the use of a user interface.

2. Description of Related Art

The standard What-You-See-Is-What-You-Get (WYSIWYG) point-and-click editing paradigm presents difficulties for the construction of complex graphics images. If the user can only view the final WYSIWYG image, it is hard to see and understand its composition, that is, its components and their relations. Consequently, it is difficult to point to the components and modify them. It is also difficult to reuse the same image, whether transformed or modified, without interactively copying it one or more times.

For example, to operate on a graphics image, users need to indicate—that is, refer to—the part or parts of the image they wish to effect. This is often done by pointing with a mouse. Experienced users know that when manipulating complex images, it can be difficult to find and point to the relevant parts, especially when there are dense clusters of overlapping figures. Related to this, users sometimes find that parts of the image they can see are not recognized by the editor, so cannot be pointed at and operated on independently. A simple example is when a rectangle is created using a "rectangle" tool. It typically is not possible to select one of the sides of the rectangle and move it away. To do this, the rectangle must be created as four line segments. There is no ability to reparse or reregister the rectangle—to decompose it into parts other than the ones out of which it was first constructed. This ability to reregister is closely related to the problem of reference, since, the registration of an image determines the parts that can be referred to.

Another problem which arises with the WYSIWYG display screen is the inability of an operator to determine the graphical domain in which a portion of a complex image is located. A number of commercially available text/graphics editors are capable of constructing images in both the bitmap and vector domains. For example, Superpaint® is a graphics editor which incorporates some painting (bitmap) and drawing (vector) capabilities. However, unless the user of the system knows (based on experience) in which domain a particular portion of an image is created, the user may attempt to perform editing operations on that image portion while in a domain in which that editing cannot be performed.

Accordingly, a need exists for a graphics editor which conveys the underlying components and operations which are performed to produce a complex image to the operator, and which permits the operator to easily construct and edit complex images.

U.S. Pat. No. 4,901,063 to Kimura et al discloses an image processing apparatus which displays both a sample image as it appears before a selected image process is executed, and a processed sample image corresponding to an image resulting from the selected image process. With the apparatus, an operator can obtain processed sample images and can perform image processing on an original image by inputting a processing command.

U.S. Pat. No. 4,611,306 to Crehan et al discloses a word processing system having a display menu/chart key for toggling back and forth between a graphics image and a menu display used to define a graphics image. The system provides an interface which allows an operator to visually check and revise the definition of a graphics image. By using the menu/chart key, the operator can see how changing a menu item will cause a graphics image to be changed. When the key is pressed while a graphic image is being displayed, a most recently processed menu is again displayed. This editing system does not permit the viewing of an entire complex image formation process, or the simultaneous viewing of an image formation process and the image formed thereby.

U.S. Pat. No. 4,928,247 to Doyle et al discloses a host system which executes one or more application programs which result in graphics data structures. These graphics data structures are then continuously and asynchronously traversed. In particular, hierarchical data structures are built in memory to permit the definition of complex data structures representative of the primitives, attributes and geometric transformations of three dimensional objects. This data structure is then asynchronously traversed by a structure walker.

U.S. Pat. No. 4,021,976 to Wexelblat et al discloses a method and system for generating dynamic interactive visual representations of complex information structures within a computer. Boundaries of the information system are established, and a set of mathematical relationships is provided which indicates a degree of correlation between parameters of interest to a user and segments of information contained within the boundaries. A visual display is generated for the user which has a plurality of iconic representations and features corresponding to the parameters defined by the mathematical relationships. The iconic representations and visual features of the visual display change with movement of the mathematical relationships within the boundaries of the information system according to the degree of correlation between parameters of interest and a segment of information through which the mathematical relationships are passing. The shapes of the icons can be used to denote the type of data represented by the icons.

U.S. Pat. No. 4,860,204 to Gendron et al discloses a method for constructing computer programs through use of visual graphical representations. Computer programs are illustrated as visual roadmaps of an intended sequence of actions. Each operational entity of a program graph displayed on a screen is represented as an elemental unit. The elemental unit is a multidimensional graphical unit of programming information which has four modes, or "layers" of operation. The elemental units reside in very general form in a work station library and are optimized by specialization. The system of Gendron et al permits programs to be written using icons instead of by writing source code.

U.S. Pat. No. 4,953,106 to Gansner et al discloses a computer implemented technique for drawing directed graphs providing reduced crossing and improved picture quality.

OBJECTS AND SUMMARY OF THE INVENTION

It is an object of the present invention to provide a graphics editor which permits complex images to be formed and edited easily, and in a straightforward manner.

It is another object of the present invention to provide a graphics editor having a user interface for forming complex graphics images which provides explicit, precise control of how a desired image is to be constructed from various components.

It is another object of the present invention to provide a graphics editor which permits the integration of multiple figural models (graphical domains) in a straightforward manner thus providing an editor which is extensible.

It is a further object of the present invention to provide a graphics editor including a user interface which provides an operator with an understanding of the relationships between elements in a complex image and a tool for constructing a graphical flow diagram of an image formation process which can then be walked to generate the complex image.

In order to achieve the foregoing and other objects, and to overcome the shortcomings discussed above, a graphics editor generates an Appearance Construction Graph (ACG) which represents a complex image formation process as a Directed Acyclic Graph (DAG). The ACG includes nodes representing image fragments (sources), image transformation operations (transforms), and outputs (viewable images—sinks) which can be displayed, for example, in a window of a display screen, and manipulated by a user to construct and edit complex images. Accordingly, the displayed ACG is a user interface that permits complex graphics images to be constructed in a straightforward manner, and thus easily understood and manipulated (edited) by an operator. The nodes in the ACG are selectively interconnected by user defined links (edges) therebetween. The complex image represented by the ACG can be constructed and displayed in a viewer window on the display screen by "running" the ACG. The graphics editor "runs" the ACG by performing operations on image fragments as defined by the interconnected nodes of the ACG.

An operator constructs an ACG graphically in a Graph View window by selecting node types, placing icons for these types in the Graph View window, and creating links (edges) between the nodes. The operator can add or delete nodes or links at any time. Additionally, the image fragments (source node contents) can be edited or imported by, for example, reference to a library of source images. When editing image fragments, another window (i.e., an Editor Window) is displayed which permits the operator to edit the contents of a selected source node. Once an ACG has been constructed, and content created or imported for each source node, the ACG can be run and its results displayed.

The present invention is implemented by directly representing ACGs in an object-oriented graph representation language. The nodes in the graph are objects which keep track of their connections to neighbors and which respond to a standard set of graph traversal messages. The graphics functionality of nodes is implemented by making their objects inherit functionality not only from the node's class (type of node) but also from a graphics operator class which responds to standard operation messages such as reading inputs and providing outputs. Node types correspond to subclasses of the generic operator class which implement functionality appropriate to the node type.

As an operator uses the graph-construction interface of the present invention to build an ACG, the editor builds the ACG in the underlying object model. When the operator requests that the ACG be executed, the editor runs a graph traversal algorithm which, as it walks the graph (e.g., from leaf nodes toward root nodes), invokes the graphics operations associated with each source, transform, and sink. This has the effect of constructing and displaying the appropriate appearance (complex output image). That is, the editor executes ACGs by propagating graphics information along the dataflow arcs which connect the nodes of the ACGs.

Thus, the present invention permits an operator to control complex image formation by manipulating a displayed graph of the image formation process. An operator is able to develop an image formation process by forming and modifying a graphical display of the image formation process.

BRIEF DESCRIPTION OF THE DRAWINGS

The invention will be described in detail with reference to the following drawings in which like reference numerals refer to like elements and wherein:

FIGS. 18A and 18B are flow diagrams of ACG editing processes.

DETAILED DESCRIPTION OF THE PREFERRED EMBODIMENTS

A. System Overview

Figure 1:
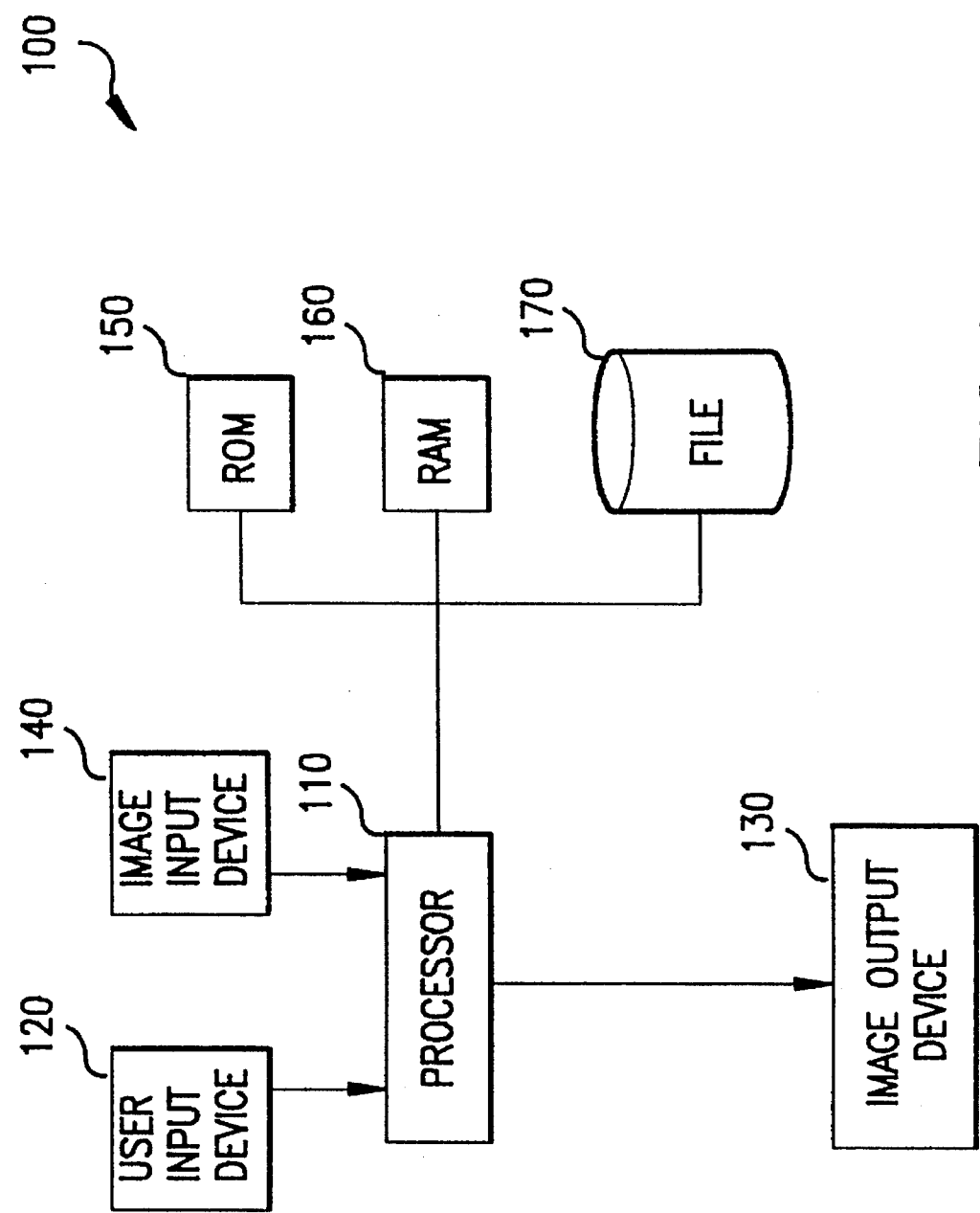
FIG. 1 is a block diagram showing general components that can be used with the present invention.

The present invention is a graphics editor, thus it produces a desired graphics image (or appearance). The present invention is characterized by a variety of features. The present invention manipulates image data drawn from more than one figural model (graphical domain). A figural model as defined herein is what is referred to in graphics literature as an imaging model—a specification of constructable appearances in terms of the operations available for marking a surface. Specifically, the present invention can manipulate both raster graphics (bitmap graphics) which are figures defined over a discrete, cellular grid, and line-segment graphics (vector graphics) which are figures constructed using line segments in the real plane (where real numbers are approximated by computer floating point numbers). The present invention can also be extended to include other figural models, such as, for example, text, video and three-dimensional figural models.

In the present invention, graphics images are constructed by directly manipulating underlying image fragments and by applying graphics operators (transforms) to one or more underlying image fragments in order to produce new images. Specifically, the present invention permits the application of arbitrarily defined transformations to images, including transformations which translate images from one figural model to another so that the "transformed" image can be further operated on in the new figural model.

The user interface provided by the present invention explicitly represents all the underlying image fragments being used, all the operations being applied to them, and all the places where output images should be produced. Specifically, an operator works by manipulating a graphical flow diagram whose nodes represent image fragments (sources), operations (transforms), and outputs (sinks). This allows the reuse of image fragments and transformed image fragments (the outputs of transform nodes) without confusion as to what effect changes in the sources and operations will have on the final output image.

The modular construction of the present invention means that it is completely extensible, both with respect to the transforms available and the underlying figural models from which one may draw source images. Specifically, new transducers can be integrated which perform arbitrary image transformations or which implement new figural models. In order to integrate a new figural model, all that is required is the integration of image sources from that new figural model and operations (transforms) for converting an image in the new figural model to one of the existing figural models. Once an image from a new figural model is converted to an existing figural model, operations appropriate for the existing figural models can be performed on the converted image.

The present invention is implemented on a conventional hardware system 100 which includes a microprocessor 110 for receiving signals from, and outputting signals to various other components of system 100, according to one or more software programs run on microprocessor 110. A user input device 120 such as, for example, a mouse, a keyboard, a touch screen and/or combinations thereof is provided for permitting an operator to interface with the editor by, for example, supplying control signals thereto. An image output device 130, such as, for example, a video display monitor, or a printer can be provided for outputting image data. An image input device 140, such as, for example, a scanner can be provided for scanning images which are then stored in memory as image sources. Image sources can also be supplied from, for example, discs.

Microprocessor 110 includes a read only memory (ROM) 150 for storing operating programs and image data, used by the present invention to construct and edit images. A random access memory (RAM) 160 is provided for running the various operating programs, and additional files 170 can be provided for RAM overflow.

A prototype of the present invention was implemented in version 1.2.2 of Macintosh Allegro Common Lisp (Macintosh is a registered trademark of Apple Computers; Allegro Common Lisp is a trademark of Franz, Inc.), a dialect of Common Lisp available from Apple Computer. This prototype will run on any computer which supports Macintosh Allegro Common Lisp, however, a Macintosh II computer (or faster) with at least 5 megabytes of RAM and a 19-inch diagonal monitor is preferred so as to provide an editor which is adequately fast.

In order to convey the manner in which the present invention works, and the basic mechanisms which provide it with its novel capabilities, examples of the user interface provided by the present invention will now be provided.

B. User Interface Examples

The present invention displays an ACG which represents the image manipulation processes which are performed on one or more image fragments to produce one or more final output images. The ACG is displayed in, for example, a window on a monitor's display screen. When executed, the final output images created by the ACG (some of the output images may be components or intermediate images of other output images) are also displayed on the monitor display screen in their own respective windows. Thus, the present invention provides a type of two-view graphics editor. One view shows the final (i.e., the WYSIWYG) image(s), and the other view displays the ACG representing the construction of that (those) image(s) (i.e., the image fragments and operations performed on the image fragments which result in the output image(s).)

B1. Example One

Figure 2:
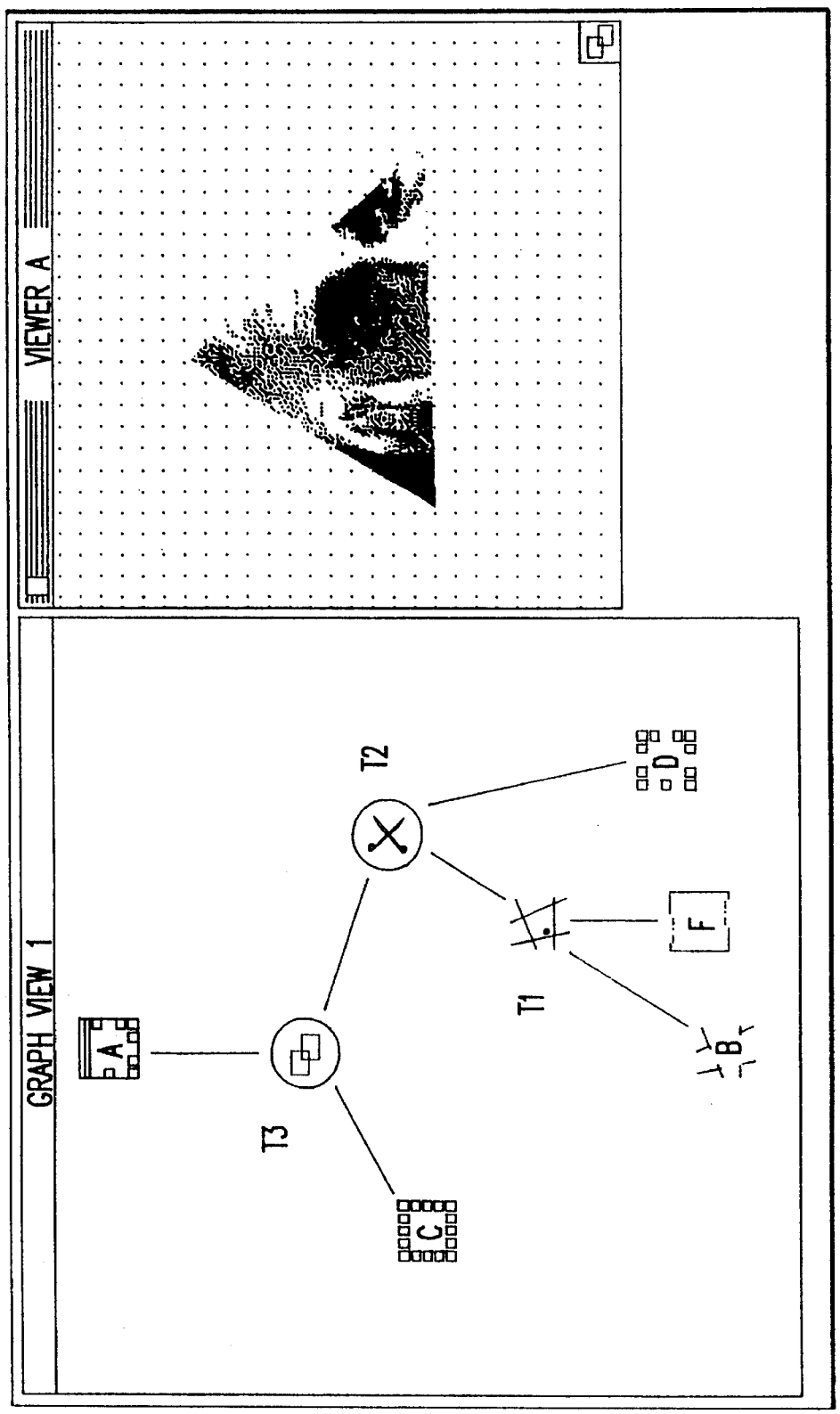
FIG. 2 is a view of a display screen having an ACG in one window and a constructed output image in another window.

FIG. 2 shows a simple, first example of a display screen which includes an ACG displayed in the lefthand window and the final output image displayed in the righthand window. The final image is a triangular portion of an image of Einstein superimposed on a dotted background. The ACG has three types of nodes: source nodes; transform (operator) nodes; and sink nodes.

Figure 3:
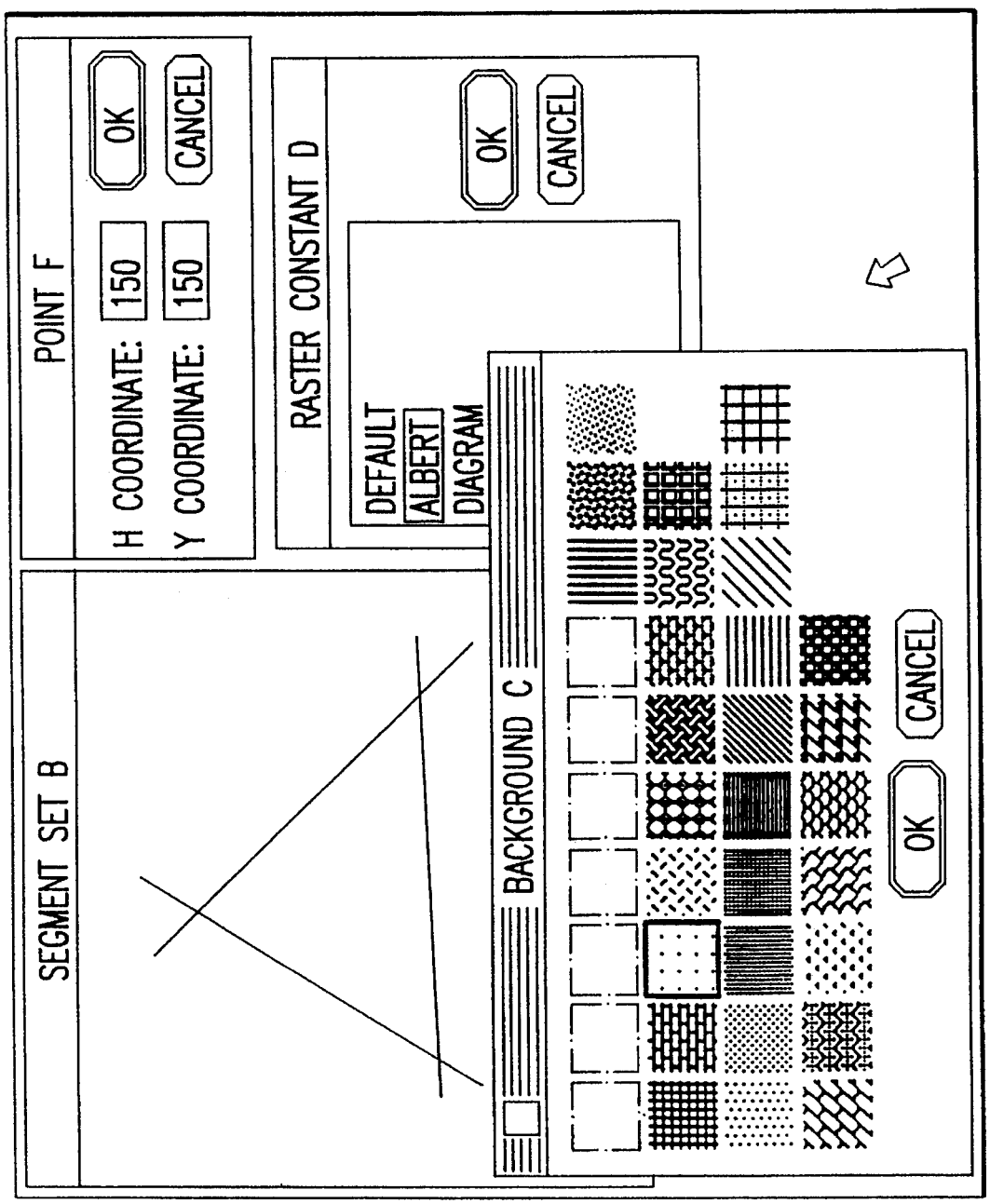
FIG. 3 is a view of a display screen having windows containing different types of source image editors.
Figure 9:
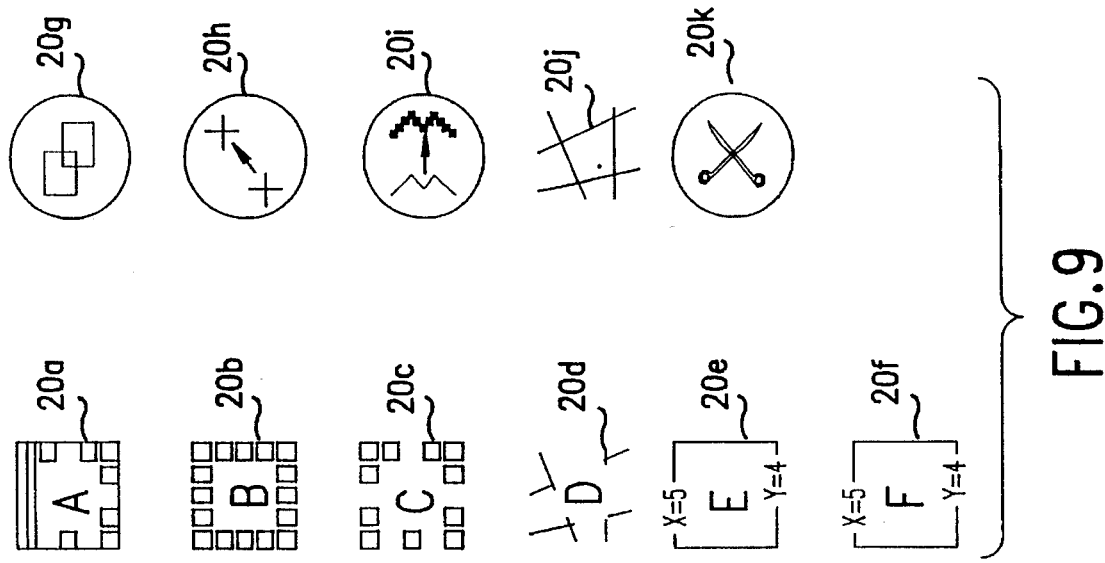
FIG. 9 is a list of node icons.

Source nodes, which are the bottom-most ("leaf") nodes in the ACG, represent image fragments or other source data. In the ACG of FIG. 2, the source nodes are labelled (from left-to-right) C,B,F,D. The icon for each of these nodes indicates the type of source data it contains. (FIG. 9 is a list of the various icons which can be selected). Thus, in FIG. 2, the node labelled C contains a uniform raster pattern (a "background" raster image), while node B contains a set of vectors, or line segments. The actual contents of each of the four source nodes are illustrated in the display of FIG. 3. Each node's contents is displayed in a separate window which is labelled with the same letter as that node. For example, the window entitled "Segment Set B" corresponds to the source node "B" in the ACG. Window B thus reveals that the content of node B includes three line segments intersecting to form a triangle. When displayed in a window on the monitor screen, the contents of these nodes can be edited by an operator inputting commands. For example, the operator can manipulate a cursor and/or press buttons (on a mouse or keyboard) to edit the contents of a source node. Additionally, source images can be imported from external libraries in a conventional manner. The editing steps can be performed in conventional ways using conventional software.

Transforms (operator nodes) are the intermediate nodes in an ACG. In FIG. 2, the three icons labelled T1, T2, and T3 are transforms. Transforms operate on image fragments, i.e., they take image fragments and other data as input and produce a new image fragment as output. Inputs to transforms come either from source nodes (primitive image fragments) or from the outputs of other transforms (which can produce intermediate images). Thus, the transform T1 has two inputs, both of which are the content of source nodes B and F, while T2 has two inputs, one the content of source node D, the other the output of transform T1. (Source nodes can be thought of as transforms that have no inputs and produce their content as output). The inputs and outputs of transforms are typed. Thus, T3 takes two or more raster images as input and produces as output a raster image constructed by superimposing the input images one on top of the other.

Sink nodes are the root nodes in an ACG, indicating where an image is to be output. Sink nodes, such as node A in FIG. 2, can represent windows or "viewers" on the display screen. In the present embodiment, inputs to sink nodes must be raster images. Sink nodes might also represent other output devices such as printers or files, and might be capable of accepting types of input other than raster. For example, monitors could accept images in the video figural model, and a plotter could accept images in the vector figural model. The window labelled "Viewer A" in FIG. 2 corresponds to sink node A in the FIG. 2 ACG.

Images are synthesized (or created) by traversing the image fragments and operations represented by the ACG with a structure walker. In the illustrative embodiment, image fragments flow upward (from leaf nodes to root nodes), are transformed and combined by transforms, and are displayed in, for example, windows on the display screen.

Referring to FIG. 2, the final output image, displayed in viewer A, is the output of transform T3. T3 is the superposition transform, it superimposes the output of transform T2 on top of the background raster (the grid of dots) represented by source node C. Transform T2 is a clipping operator which clips out a polygonal section of a raster image. One input of transform T2 is the raster image to be clipped (source node D, whose contents is a raster image of Einstein), the other input is a set of vectors specifying the polygonal mask (the output of transform T1). Transform T1 is a simple "recognition" operator: a "polygon finder". Given a set of vectors (the content of source node B) and a point (the content of source node F), transform T1 finds and outputs the smallest polygon enclosing that point.

Images are created in three stages:

1. ACG creation and modification. The operator creates an ACG graphically by inputting commands for selecting node types (from a displayed menu or list of node types), placing icons for these node types in the ACG window, and creating links (edges) between the nodes. The user can add or delete nodes or links at any time.

2. Image fragment (source node content) importation and editing. A different type of editor is provided for each type of source node, so that the contents of that source node can be edited. Each "source node editor" includes a window labelled with the same letter as that source node's icon in the ACG, in which the contents can be edited. With reference to FIG. 3, the window labelled "Segment Set B" permits the operator to move and create line segments which are used to define a polygon. The window labelled "Point F" permits the location of a point, used by "polygon finder" T1 to be changed. The window labelled "Raster Constant D" permits an operator to define a raster image fragment by selecting from a menu of background patterns. Selections are made in a conventional manner by, for example, moving a cursor and striking keys (on a mouse and/or a keyboard). Additionally, source node contents can be imported from libraries such as, for example, discs.

3. Image Viewing. Once an ACG has been constructed and content created for each of its source nodes, the ACG can be executed and its results displayed.

Figure 4:
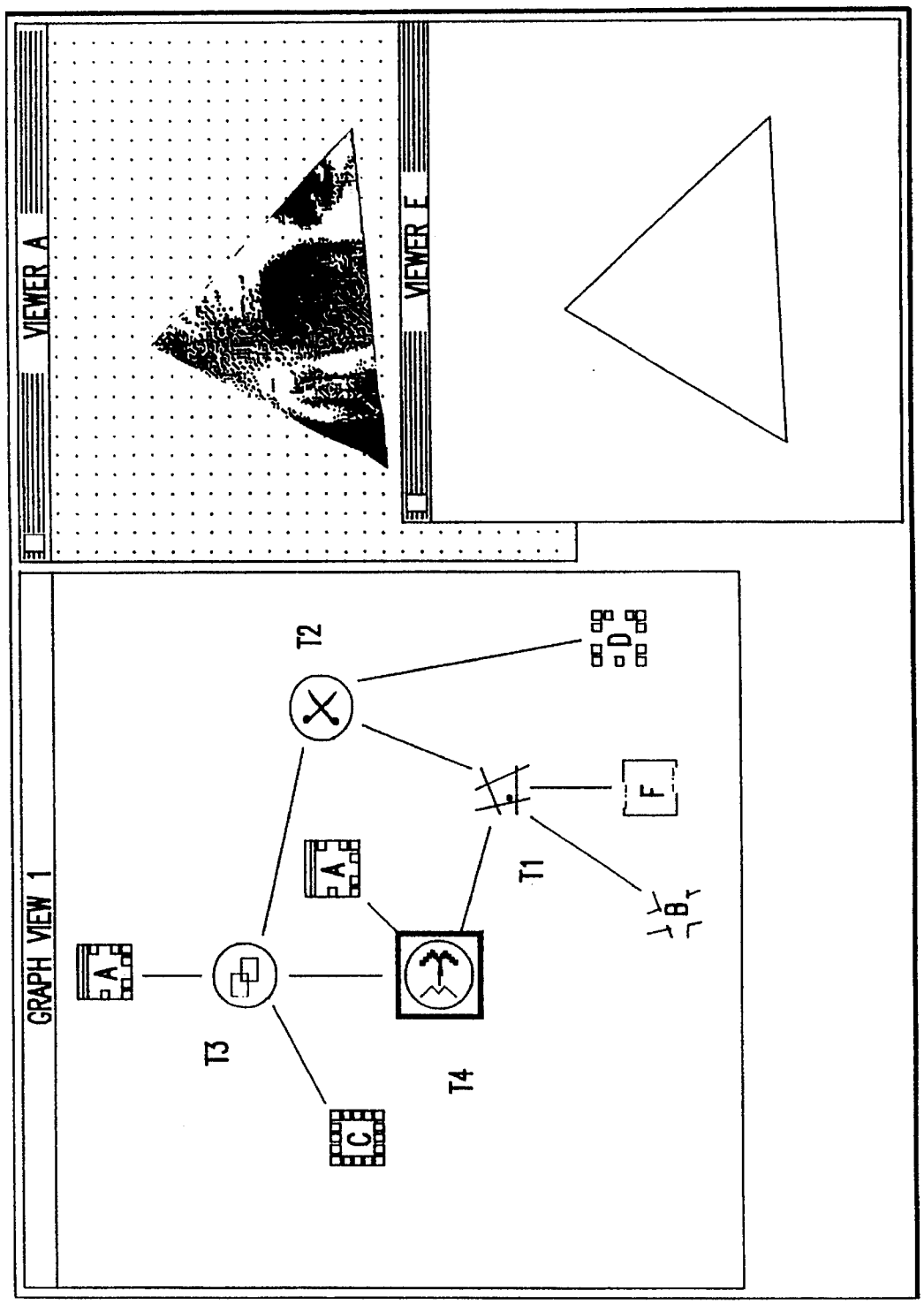
FIG. 4 is a view of a display screen having an ACG of FIG. 2 modified and the Viewer windows which result.

The ACG or source node contents can be modified at any time by providing the appropriate control signals to the microprocessor using, for example, the cursor and key strokes. FIG. 4 shows a modified ACG and the resulting images. The triangular clipping of Einstein now has a black border around it, and there is a new viewer window, Viewer E, showing three vectors forming a triangle. The FIG. 4 ACG differs from the FIG. 2 ACG in the addition of two new nodes -a transform labelled T4 and a viewer node labelled E- and three new edges connecting T3 and T4, T4 and T1, and T4 and E, respectively.

The new transform, T4, is a scan conversion operator: it takes a set of vectors as input and yields a raster image by scan converting each of the vectors. Thus, the border around the clipped Einstein image is the result of scan converting the recognized polygon (which was also used as a mask to the clipping operator T2) and superimposing it on top of the clipped Einstein and the dotted background. The output of transform T4 is also displayed in Viewer E. A comparison of Viewer E with the contents of the window labelled "Segment Set B" in FIG. 3 shows that transform T1 has "sliced and diced" the original vectors in node B, outputting only those fragments that form a polygon (in this case, a triangle).

Figure 5:
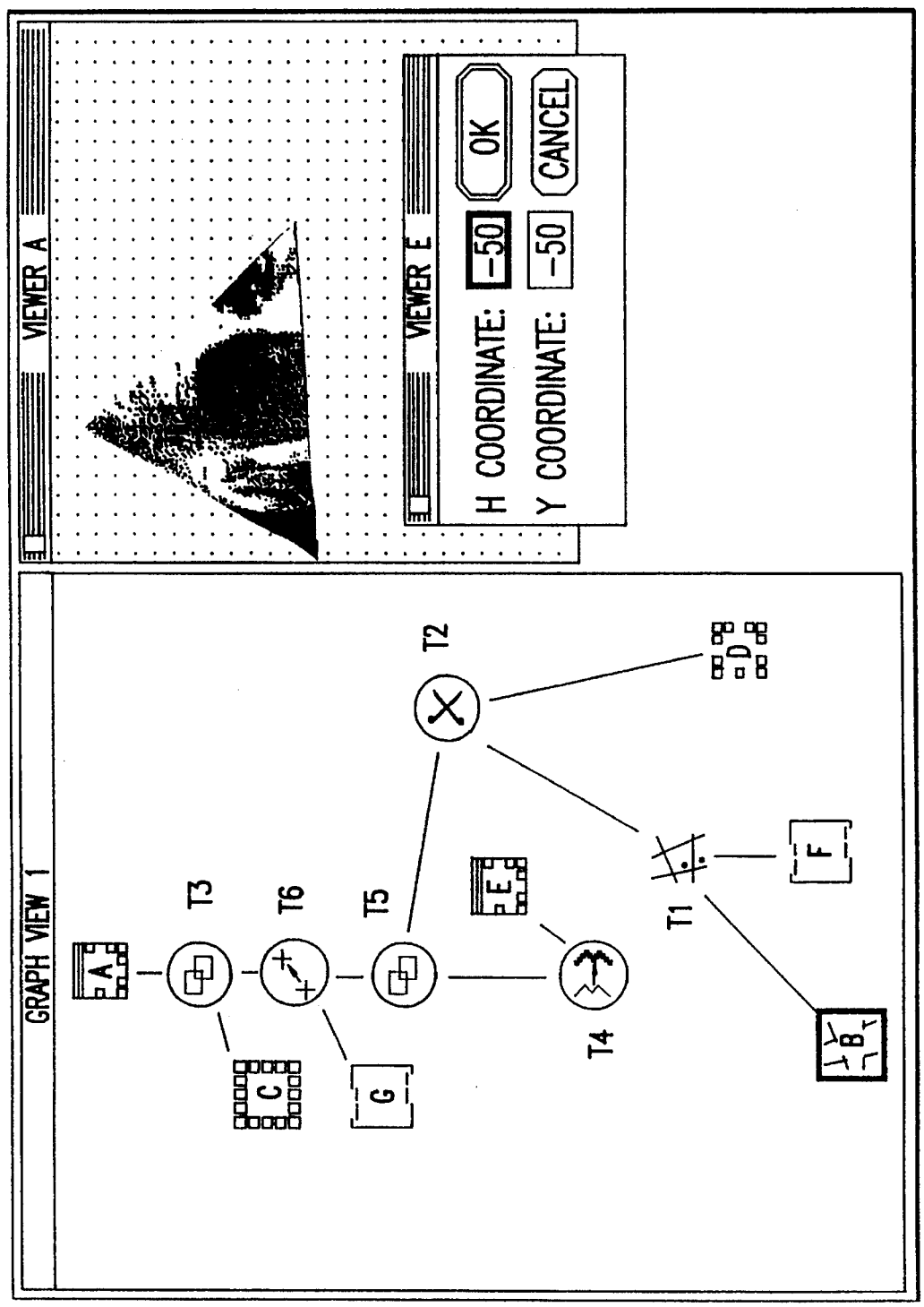
FIG. 5 is a view of a display screen resulting from a further modification of the FIG. 4 ACG.
Figure 6:
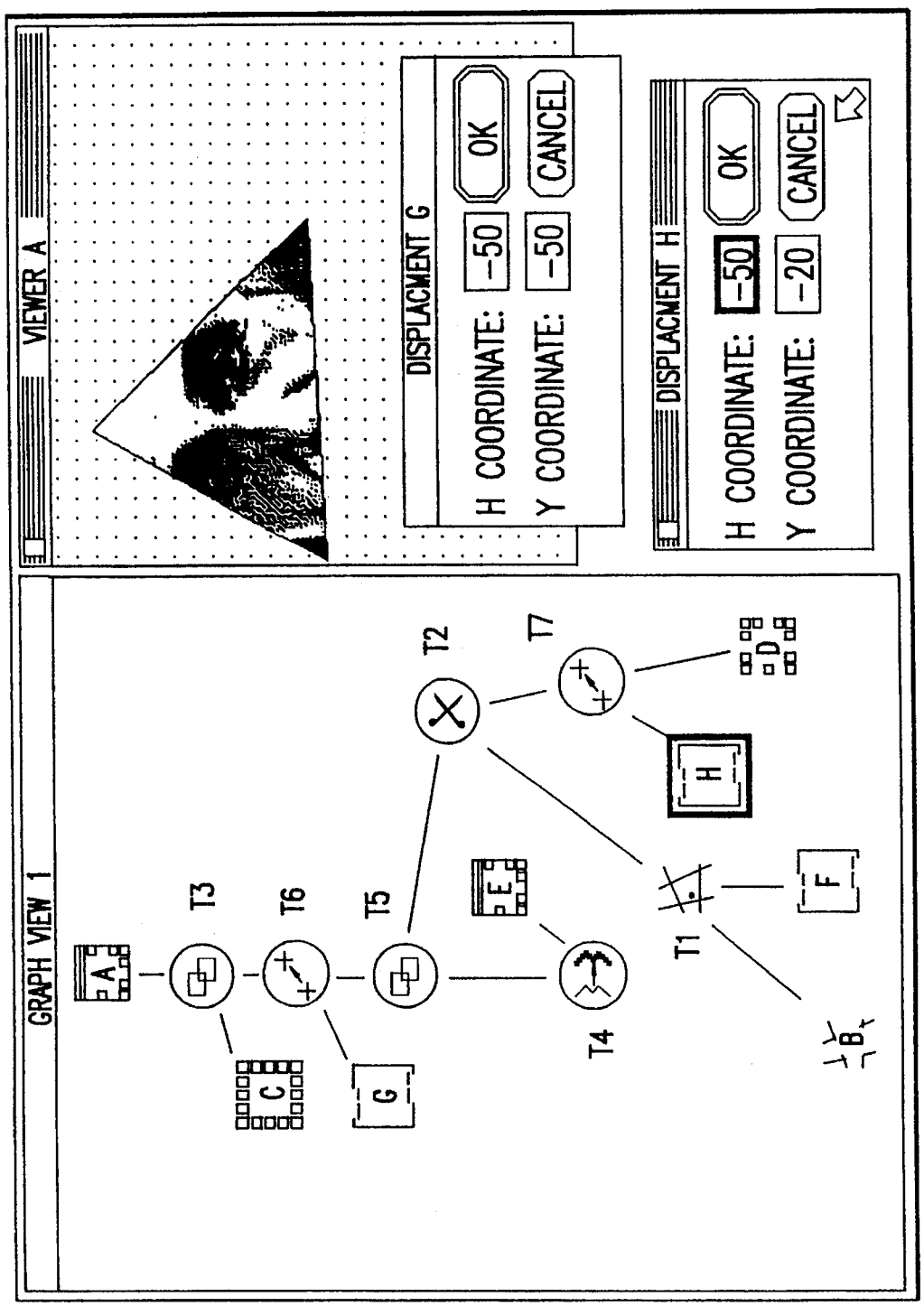
FIG. 6 is a view of a display screen resulting from a modification of the FIG. 5 ACG.

Viewer A in FIG. 4 now displays a window, i.e, a picture of Einstein viewed through a polygon (shaped window) displayed against a textured background. In FIGS. 5 and 6, the window metaphor is further extended. These extensions make use of two additional nodes of the same type: a translation transform (T6 and T7 in FIGS. 5 and 6) translates or displaces an image on the display surface. The inputs for the translation transform are a raster image to be displaced and an amount (delta x, delta y) of displacement. The displacement nodes are source nodes G and H.

In FIG. 5, the superposition of Einstein's border and background has been regrouped so a translation operator can be attached to the superposition of Einstein and border. As a result, the displacement node G acts as a "window mover". By changing the x and y values in displacement G (in the editor window for the content of node G) and re-executing the ACG, Einstein plus border can be displaced (moved) by delta x and delta y.

In FIG. 6, the same basic move, the addition of translation and displacement nodes in the appropriate places creates yet another effect, i.e., displacement node H acts as a scroll bar. Entering x and y values in displacement H (attached to transform T7) and re-executing the ACG causes just the Einstein raster image to be displaced (scrolled) by delta x and delta y.

Figure 7:
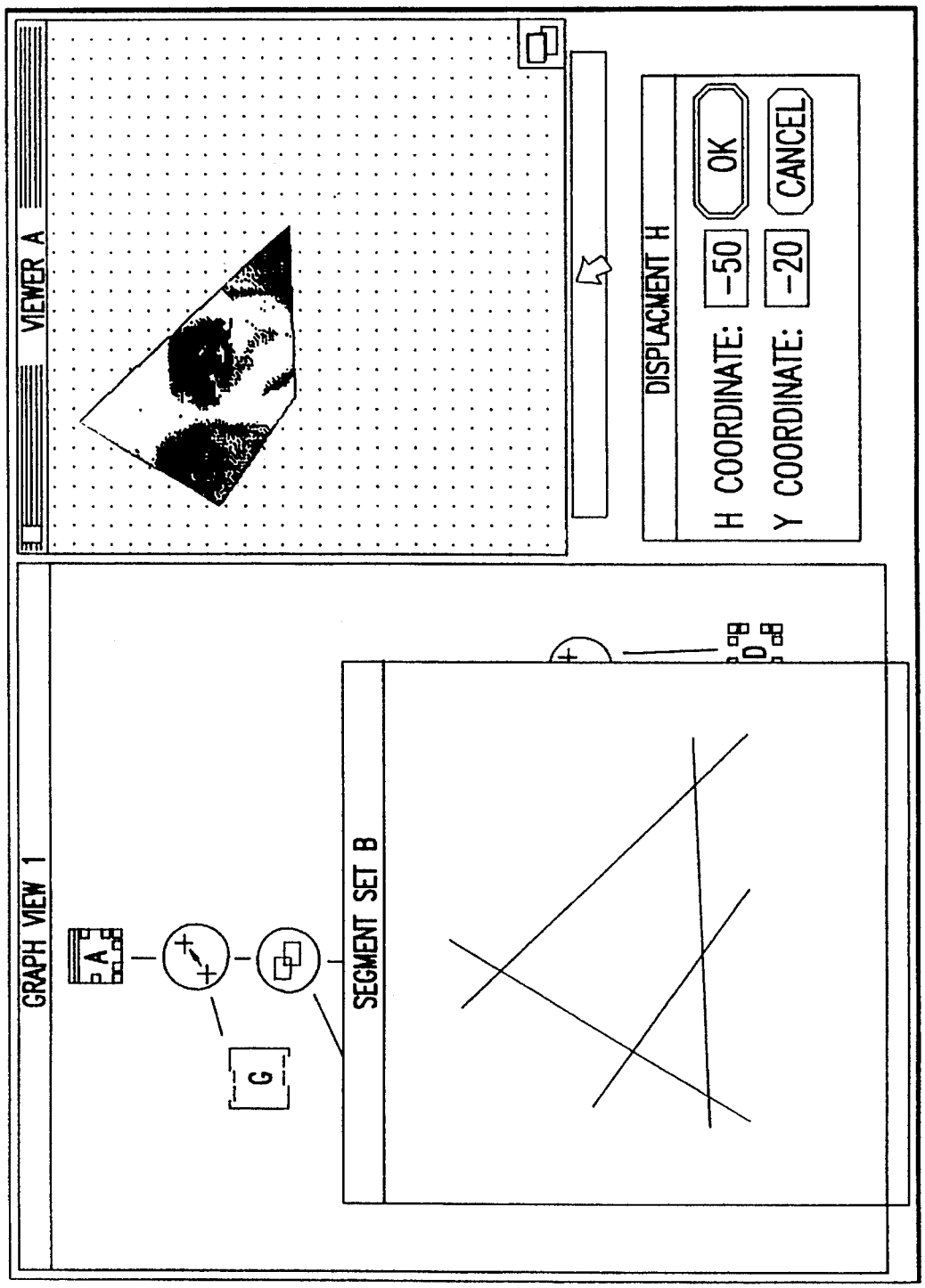
FIG. 7 is a view of a display screen illustrating the modification of a polygon defined by Euclidean line segments.

FIG. 7 illustrates how the shape of the window can be changed by simply editing the vectors from which the window was originally formed and rerunning the ACG. The structure of the ACG in FIG. 7 covered by the Segment Set B Window is the same as the FIG. 6 ACG.

B2. Example Two

Figure 8:
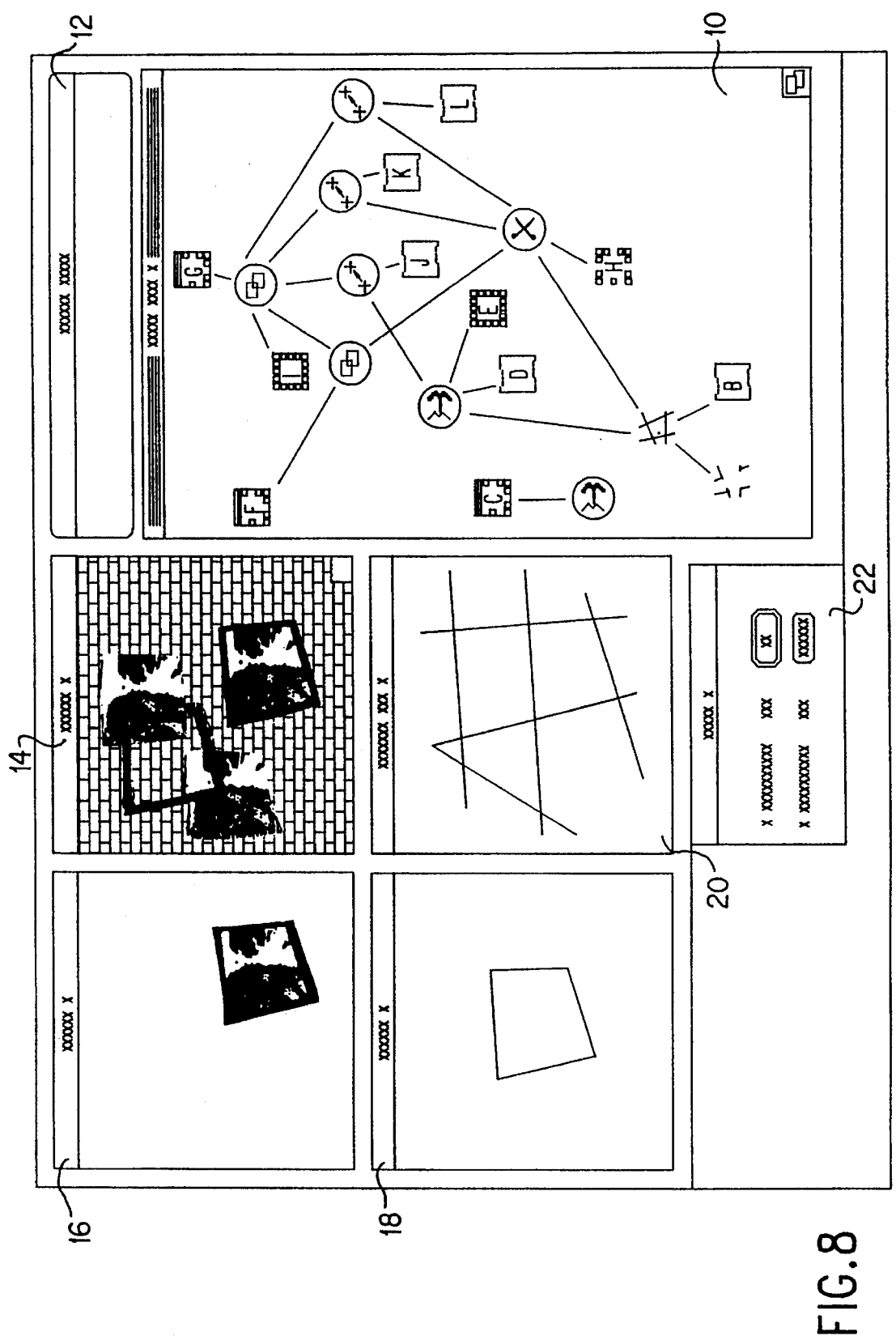
FIG. 8 is a view of a display screen containing a seconding and Viewer windows as well as a Prompt Window.

FIG. 8 illustrates what an editor screen might look like when an operator has finished constructing a more complex appearance. As in the example of FIGS. 2–7, the center piece of the user interface provided by the present invention is the large graph view window 10 which is where an operator pieces together the desired appearance by combining image fragments and transforms in a desired way.

The icons used to depict nodes in the ACG are based on the type of the node, rather than its contents. For instance, two nodes containing raster image fragments will be depicted with identical icons even though the image fragments they contain might be different (although they will be labeled with a different letter). Similarly, the nodes for two different applications of a masking operation will be depicted with identical icons because they are both masks. It is important, when viewing an ACG not to confuse the appearance of the icon for a node (which indicates its type) with the appearance output by the node.

FIG. 9 shows some different icons which can be used and the types of nodes they represent. Icon 20a is a viewer node. Icon 20b is a background node. Icon 20c is a raster appearance. Icon 20d is a line segment appearance. Icon 20e is a displacement icon. Icon 20f is a point icon. Icon 20g is a superposition icon. Icon 20h is a translation icon. Icon 20i is a scan conversion and parameterized scan conversion icon. Icon 20j is a polygon finder icon. Icon 20k is a mask icon.

Note that square nodes which denote input source images and output constructed images, are labeled with single letters from "A" to "Z". These labels are used for identification. Whenever an operator requests, by inputting a command, such as with the operation of a cursor and the stroking of keys, via a mouse and/or a keyboard, the graphics editor of the present invention will display a special window which shows the contents of any square node. This window's title will contain that node's letter. In the case of input source images, these windows are editors which can be used to alter the node's image data content. In the case of output images, these windows are viewers only, as the image is completely determined by the ACG itself. For this reason, output nodes are referred to as "viewer" nodes. FIG. 8 contains a number of viewer and editor windows to the left of the graph view window 10.

The present invention can be used in a conventional way, i.e., by mousing in windows, and by invoking commands from menus. Additionally, a prompt window 12 can be provided to give feedback on the course of operations invoked.

Figures 10A, 10B:
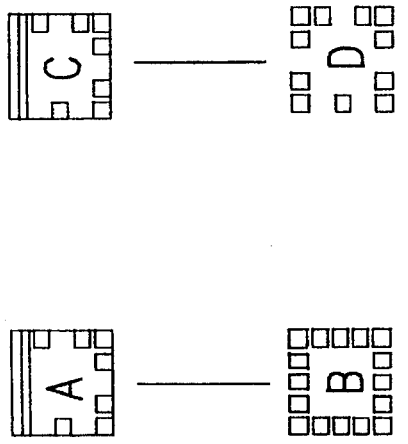
FIGS. 10A and 10B are ACGs of source nodes attached to sink nodes.

In order to provide a better understanding of the manner of which the ACG 10 of FIG. 8 produces the contents of the viewers in FIG. 8, more simplified ACG's will first be described. FIGS. 10A and 10B are the simplest possible ACG's, since each simply connects an image fragment to a viewer. The ACG of FIG. 10A is a viewer connected directly to a "background" i.e., an image fragment containing a raster pattern which is repeated horizontally and vertically to fill its allotted space in the final appearance. The ACG of FIG. 10B is a viewer connected directly to a raster appearance, i.e., an image fragment containing a previously-prepared bitmap. Raster appearances can comprise previously scanned images which are stored in a file (library). FIGS. 10A and 10B illustrate that the present invention can be utilized to output the contents of image sources directly, without any transformation operations being performed thereon.

To construct ACG's in the graph view window, commands are issued (e.g., with mouse clicks) to indicate where nodes are desired. Similarly, a command can be issued to indicate that two nodes should be connected. This can be accomplished, for example, by dragging a cursor between two nodes while pressing a button on a mouse and a key on the keyboard to form an edge between the two nodes. When two nodes are connected by an edge, the one on top is considered the parent and the one below the child. Parent nodes work by taking the outputs of their children as inputs and then producing outputs themselves. Thus, each of the ACG's in FIGS. 10A and 10B would require simply two clicks and a drag to construct. The viewers would take the outputs of the image fragments as inputs and display them on separate windows.

Thus, the viewed nodes can have their contents displayed directly on the screen (in viewer windows). Since the screen uses a raster imaging model, the viewer nodes must always have a raster appearance (a bitmap) as their input.

Figure 11:
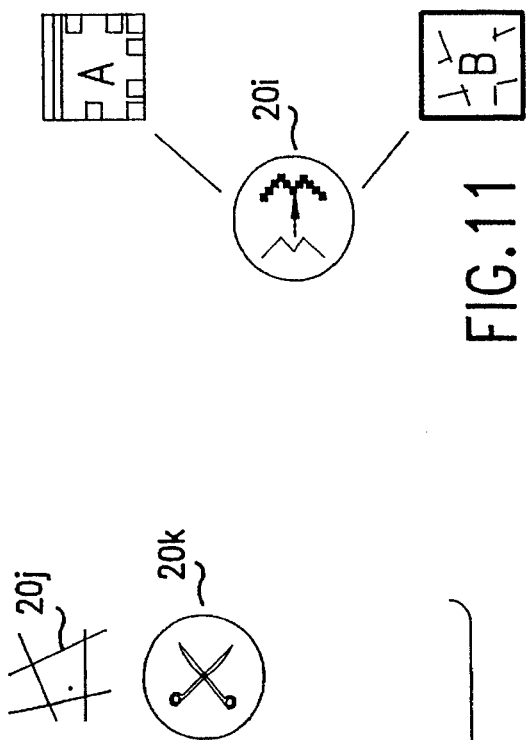
FIG. 11 is an ACG of a Euclidean line segment source node attached to a Viewer node by a scan-conversion transform.

This restriction leads to FIG. 11, which shows a viewer connected so as to display a "line segment appearance", i.e., an image fragment containing some Euclidean line segments. Since viewers can only display raster appearances, the connection between the viewer and line segment appearance must be mediated by a "scan conversion" (the circular node 20i) which produces a raster appearance corresponding to the line segment appearance.

The ACG of FIG. 11 is particularly interesting since it contains a transform node. Transforms are functional image-transforms which are used in the graph whenever it is desired to alter or combine various image fragments (or transformed image fragments). In the example of FIG. 11, the operator desired to view line segments. However, the line segments are drawn using a Euclidean figural model, and in the present example, the viewers can only display appearances drawn using a raster figural model. Accordingly, transform 20i, which transforms Euclidean images into raster images (a scan converter) is placed between the viewer node and the source image node to produce an ACG which views the desired appearance.

Transforms can be used to perform many functions. They are used to transform images within a single figural model, to convert images from one figural model to another, to extract features from images for use in other images, and to combine images from the same or different figural models. Transforms serve both as the tools used to cut images apart and the glue used to put them back together. The scan converter 20i of FIG. 11 is conceptually (and computationally) a simple transform. However, the present invention permits arbitrarily complicated transforms which embed arbitrarily complex computations to be incorporated. The only requirement on transforms is that they be functional in the programmatic sense, i.e., their output must be determined solely by their inputs without respect to any internal state. The extensibility of the present invention comes from the ability to add new transforms.

Figure 12B:
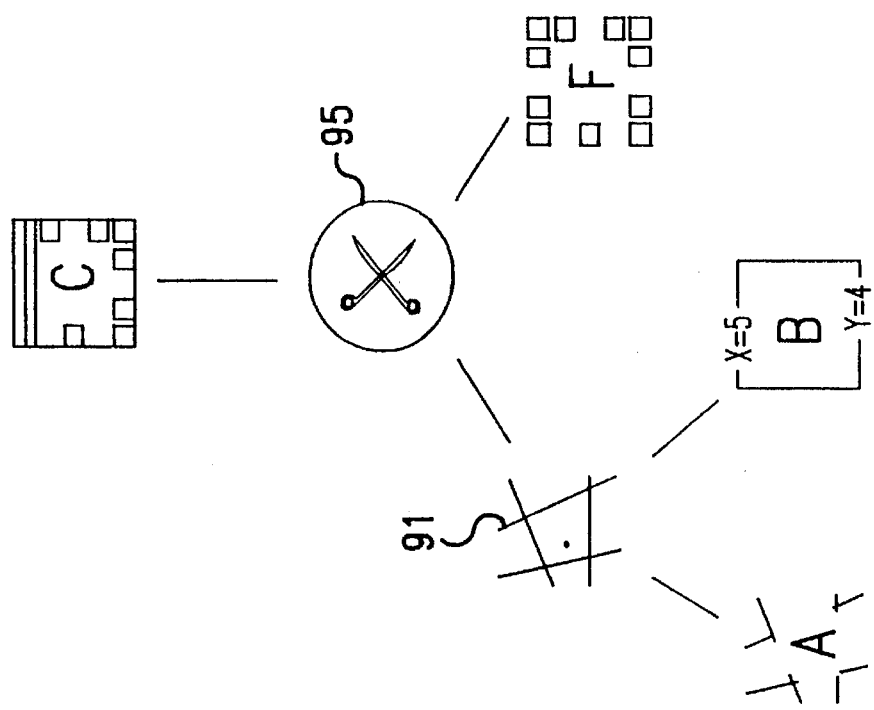
FIG. 12B is an ACG of a clipping transform attached to a Viewer node.
Figure 12A:
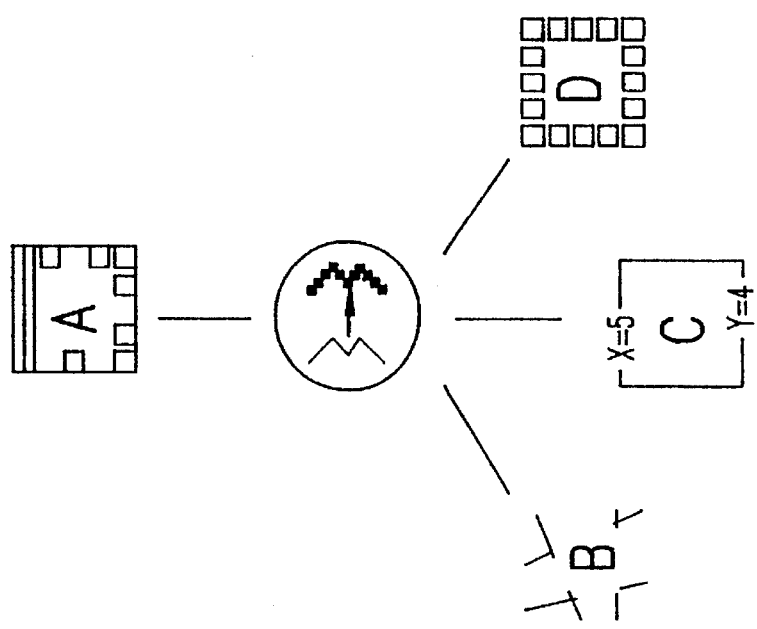
FIG. 12A is an ACG of a parameterized scan-conversion node attached to a Viewer node.

To further illustrate the function of some simple transforms, reference is made to FIGS. 12A and 12B. FIG. 12A illustrates a line segment appearance which is scan converted and then viewed. However, this time the scan converter is parameterized, i.e., it takes additional inputs which determine the size of the scan converted lines and the background pattern that they are drawn with. Thus, the scan conversion node has three children: the line segments to be converted, the background pattern to use when drawing the rasterized lines, and a point (i.e., an x,y pair) which determines the size of the rasterized lines.

The ACG of FIG. 12B illustrates a network where one transform's output is the input of another. In this network, a polygon is extracted (registered) from an arrangement of line segments and then is used to mask a background pattern. The ACG of FIG. 12B is similar to a portion of the FIG. 8 ACG in that a polygon is found using image sources A and B, the found polygon is scan-converted, and then input to viewer node C. The transform 91 is the "polygon finder". It takes a line segment input (from the source labeled A) and a point input (from the point source B), searches outwards from the point in the line segments to find an enclosing polygon, and then outputs that polygon (in this case, the polygon found is a quadrilateral). Transform 95 is a "mask" (or "clipper"). It takes polygon input (from transform 91) and a raster appearance image (from the source labeled F) and produces as its raster appearance output the result of clipping the raster appearance to the interior of the polygon. The output is then displayed by viewer node C.

Any number of different types of image sources can be provided. Some examples include raster appearances, line segment appearances, background patterns, points (whose x- and y-components are always positive), and displacements (points whose components can be negative). Once an image fragment is created—by selecting an image and (optionally) editing, the image fragments can be combined and altered any number of ways, depending on the types of transducers available.

Figure 13:
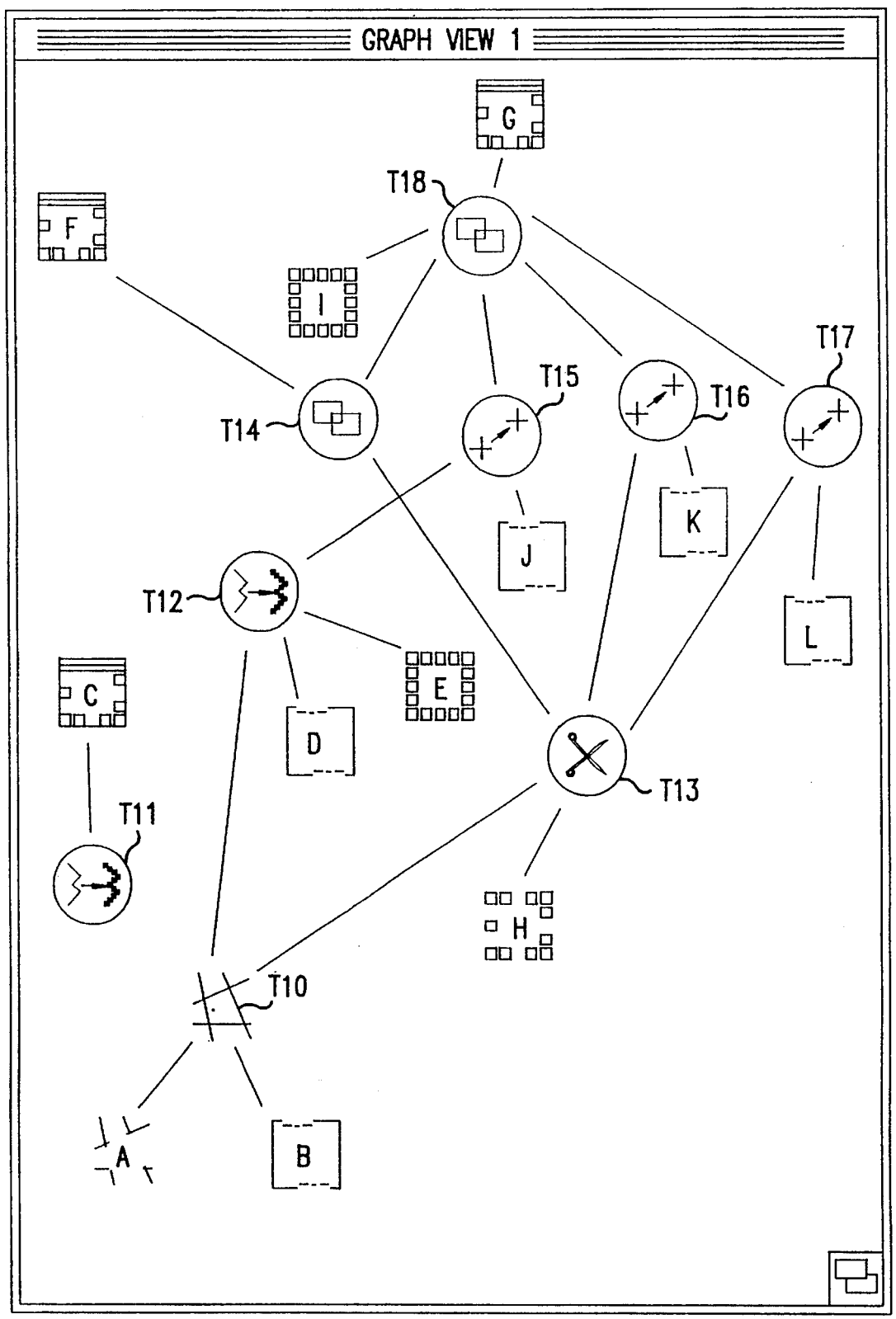
FIG. 13 is an enlarged view of the FIG. 8 ACG.

Now, with reference to FIG. 13 (which is an enlarged view of the FIG. 8 ACG), the ACG illustrated therein and its constructed appearance will be described. The graph will be considered section by section to see how it builds the final appearance. At the lower-left of the ACG is a polygon-producing cluster, similar to the one shown in FIG. 12B, consisting of line segment appearance A, point B and a polygon finder transform T10. The output of this cluster is used in a variety of places, so to make it clear what the found polygon looks like, a simple scan-conversion transform T11 is inserted to render the polygon onto viewer C (see FIG. 8). The editor windows 20 and 22 are illustrated to the left of the graph view window 10 in FIG. 8. Editor windows for segments A (window 20) and point B (window 22) as well as viewer C are illustrated. Above and to the right of the polygon producing cluster (see FIG. 13), its output is used both by a parameterized scan-conversion T12 and by a mask T13, similar to the one shown in the examples of FIGS. 12A and 12B. The outputs of these two transforms are then superimposed one on the other (by a superposition transform T14) to produce a combined output which is both shown in Viewer F and used again as a piece of the final, constructed appearance in Viewer G.

The outputs of the parameterized scan-conversion T12 and the mask T13 are also used separately as the inputs to translation transforms T15, T16, T17 which each use a displacement input to determine how far to translate their source appearance. Finally, the output of these translations are then recombined with an underlying background and the superposition discussed via superposition transform T18 above to produce the complete appearance of viewer G.

As can be seen from the above-described example, the present invention, through the use of an ACG-based interface, provides numerous advantages over previous graphics editing systems. It is easy to use multiple image sources without their interfering with one another. Image fragments can be drawn from a variety of figural models. Transformations between models are explicit and consistent. Image components can be reused several times in the same image, both directly and after transformation, without copying or confusion as to which is the original. Transformed images are no different in status from original image fragments—both can be used in exactly the same way. Any collection of component images used in the construction of another image can be viewed separately in order to further clarify their contribution to the image as a whole.

There is nothing particularly interesting about ACGs by themselves—they are simply expression graphs such as those found in the abstract syntax trees provided by standard parsers. However, the use of ACGs as a tool (user interface) for constructing and editing images overcomes the problems, discussed above, which persist in existing graphics editors. ACGs are directed, acyclic graphs (DAGs) whose nodes are called transducers. There are three basic types of transducers: sources, transforms, and sinks. Sources are image generators: they take no children. Transforms are image functions: they take the outputs of their children as inputs and produce a single output which results from combining and transforming these inputs. Sinks are image consumers: they can only appear as roots of the ACG.

ACG's typically consist of one or more source nodes, which could appear as children of one or more transform nodes, which could be children of one or more sink nodes. The sink node in this example, i.e., the viewer, consumes an image formed in the ACG and automatically displays the image in a window whenever the ACG is evaluated. Thus, viewer nodes are used to specify exactly which of the source or transform nodes in the graph are desired to be viewed. Since the ACGs are DAGs, not trees, an operator can both view the output of a node and use that node as the input of other (transform) nodes.

The typical construction process for an ACG interleaves the construction and connection of nodes with the editing of source nodes and the evaluation of the graph to produce output images. Feedback from the evaluation process is then used as a basis for structural alterations in the graph and further editing of the source images. Thus, the process of ACG construction and revision is analogous to that of program construction and revision, which is natural since ACG's can be thought of as programs (or expressions) which produce images.

The edges in an ACG run from named, typed output ports on one node to named, typed input ports on another. Only one edge can run between any two given ports. The type of an ACG node determines the number, names and types of its ports. The type of an input port determines the allowable types of output ports it can be connected to. Additionally, input port type determines whether the port is unary (can accept only one incoming edge) or n-ary (can accept any number of incoming edges ordered in some sequence). Output ports can always be connected to any number of outgoing edges; their type is used only to determine which input ports those edges can be connected to. A well-formed ACG is a DAG all of whose ports have at least one edge connected to them and all of whose edges obey the type restrictions of their ports.

In the present embodiment, the ACG framework is a single mechanism which provides both a user interface that makes complex appearance construction precise and convenient and an implementation model that makes figural model extensibility and integration precise and convenient.

The user interface presents a simple "erector set" view of images. Images are readily seen to be constructed from small, reusable image fragments and operators. This scheme has three important features. First, it allows for the precise specification, modification, and viewing of the structure of complex images. Second, it allows underlying commonalities across domains (figural models) to be easily captured and reused. Third, it provides a simple and convenient interface to extensibility.

Current WYSIWYG graphics editors have developed a number of features aimed at allowing the user to navigate through and manipulate components of complex images. Grouping and ungrouping of image elements, locking figures in place on the surface, the use of multiple layers (or planes) on which figures can be distributed, the ability to hide figures (make them temporarily invisible) or to magnify them. Mechanisms such as these have been developed, in part, because the WYSIWYG discipline makes it hard to see, and therefore to manipulate, the structure of complex images. By providing a view in which the structure of an image is readily apparent, the present invention makes it easy for the user to see and refer to the elements of the image.

Even though previous techniques such as grouping, locking and layering are of some use in manipulating images with many elements, they provide no help to the user in getting at the relations among elements. For example, none of these techniques provides any help if an image has shared elements (as in FIG. 4, where the polygon both serves as a clipping region and a border). For another example, consider creating a "bitmap polygon" by scan-converting a vector polygon (as can be done in some commercial graphics editors, such as SuperPaint®). Once the scan-conversion is through, the relationship between the figures is lost: changes made to the vector polygon have no effect on the bitmap. Contrast this behavior with that of FIG. 7.

The display of ACGs is not biased toward particular figural models: it works equally well for raster graphics as for vector graphics—and for text, video, or 3D graphics. Nor is it biased toward the details of particular models—to the presence or absence of particular operators. It therefore provides a convenient interface to the editor's extensible graphics engine. Thus, the same basic mechanism (ACGs) that allows for extensibility suggests a simple and powerful interface to that extensibility.

C. Window and Menu Overview

For purposes of illustration, windows and menus for an exemplitive editor will now be provided.

An operator provides commands, for example, by using screen displayed menus and a mouse. The graph view window is displayed at all times. Additionally, a prompt window can be displayed to provide the operator with feedback. The first menu, the Ops menu—which is always enabled—contains commands which apply to the system operation as a whole. The Graph Ops menu—which is enabled only when the graph view window is active—contains commands which apply to the graph view window. The exact content of the menus and the use of the graph view window are briefly described below.

C.1. The Prompt Window

The prompt window is used by all system commands whenever they wish to prompt the operator, inform an operator of their progress, or warn an operator of an error. The prompt window cannot be selected since it is intended for output only.

C.2. Viewer and Editor Windows

Two other types of windows can be created and destroyed by user request. Viewer windows show the images input to viewer nodes. The contents of these windows cannot be edited directly, rather an operator must edit and re-execute the ACG to cause the viewer windows to be filled with the desired contents. Viewer windows are created automatically whenever the ACG is executed. One viewer window is created for each viewer node, and preferably, the title of the window (which matches the title of the node) is associated with that window. These windows can be closed, however, they will reappear the next time the ACG is evaluated. To cause a viewer window to be deleted permanently, the viewer node is merely deleted from the ACG.

Editor windows are created when an operator issues a command to edit a source node. Each source node has its own type of editor. Editor windows are titled to match their sources (as with viewers). Editor windows are closed when the editing functions are completed. Some editor window types can have special menus which get added to the menu bar when an editor window of that type is created. These menus will only be enabled when an editor window of that type is active, and will go away if all the editor windows of that type are closed. The specific editors can be implemented using techniques in the prior art. Since all the sources can be imported, commercial, existing editors can be used. All that is required is to provide a means for translating the user input commands to commands which can be understood by the software. This can be accomplished in a conventional manner.

C.3. The Ops Menu

The Ops menu permits an operator to select, for example, the following (and other) commands which effect the state of the editor as a whole:

"Edit Graph" makes the graph view window the active window. The editing operations available in this window are described below.

"Execute Graph" evaluates the ACG in the graph view window, and updates all viewer windows appropriately. Progress of the command is shown, for example, in the Prompt Window, as are reports of any errors encountered while executing the graph.

"Save ACG" prompts for a file in a directory (or in a disc file) and saves the current ACG to that file for later reuse.

C.4. The Graph View Window

The graph view window is used to construct and edit the ACG. In this window, commands can be issued to create, remove, connect, and disconnect transducer nodes. These commands can be issued, for example, using mouse clicks and drags.

D. Node Types

FIG. 9 is a list of the icons used in the graph view window for the various types of nodes. The input/output protocols for these nodes will now be described.

D.1. Sink Nodes

As mentioned above, one type of sink node is the type viewer 20a. Viewer nodes can have only one child, and their function is to display the output of that child, which, in the present examples, must be a raster image. Viewer nodes have no outputs, and so cannot be the children of other nodes. Whenever an ACG is executed, a viewer window is created for each viewer node in the ACG.

This viewer window displays the input of the viewer node. Both the node icon and the viewer window are labeled with, for example, a letter from A to Z so it is clear which viewer node's inputs is being displayed in each view window. Other types of sink nodes could, for example, send images to files for storage, or to a printer (or plotter) for printing.

D.2. Transforms

Each transform type is characterized by its input (their type and cardinality) and how its output is generated from its input. A first type of transform is the superposition transform 20g. This transform takes any number of children. The output of each child must be a raster image. The output of the superposition (a raster image) is obtained by superposing (layering) the outputs of the children in order', so that the inputs of latter children obscure (are layered on top of) the inputs from earlier children. The order of the children is determined by the order in which the superposition is connected to its inputs, however, other ordering techniques can be used. In this example, the child which is connected first gets layered first and is covered by the child connected second, which is covered by the child connected third, and so on.

A second type of transform is the scan conversion transform 20i. This transform takes a single child, which must be a line-segment vector image, and produces as its output a raster image obtained by scan-converting the line segments with a width of one pixel and a black pen pattern.

Another type of scan converter is a parameterized scan converter. This transform takes three children. One must be a line-segment vector image, another must be a point source, and the third must be a background source. The order of the children does not matter. The output of the transform is a raster image obtained by scan converting the line segments with a pen whose width is the x-value of the point source, whose height is the y-value of the point source, and whose pattern is the background pattern. The default values for the x and y components can be, for example, 1, while the default background pattern can be black.

These two types of scan converters could be offered as separate choices, or as a single choice (with the default values for background and pen-size operating as the non-parameterized scan converter).

A third type of transform is the polygon-finder 20j. This transform takes two children, a line segment image and a point source, in any order. Its output is a line segment image whose line segments form a polygon. The output polygon is the smallest polygon which can be registered in the line segment image that contains the point whose coordinates are given in the point source. If there is no such polygon, then evaluating the polygon-finder node will produce an error.

A fourth type of transform is a mask 20k. This transform takes two children, a raster image and a line segment image (whose segments should form a polygon), in any order. The output of the mask is a raster image consisting of the input raster clipped to the interior of the polygon.

A fifth type of transform is a translation transform 20h. This transform takes two children, a displacement source and an image (either a raster image or a line-segment image), in either order. Its output is the input image translated by the displacement.

D.3. Source Nodes

Source nodes, as mentioned above, produce an output but take no inputs. Thus, source nodes have no children. Each source node, when first created, for example, can be given a default output value (contents) based on its type. The source node can then be edited in order to change its contents. Similarly, source images can be imported from external files (e.g. discs) to produce the content of a source node.

The display icon for each source node in an ACG is labeled with, for example, a letter from "A" to "Z", so that source nodes can be distinguished easily. If an operator asks to edit a source node, an editor window is created and labeled with that node's letter, so it is always clear which editor window goes with which node.

Different source types use different types of editor windows. The editor window for each source type is described with the source type.

A first source type is a point 20f. A point is an ordered pair (x,y) of non-negative, integer coordinates. The default value for a newly created point node can be (0,0). Points are edited using a dialogue window that has a text item for each of the coordinates, an OK button, and a cancel button. The window labeled Point F in FIG. 3 is a point source editor window. The x and y coordinate values can be edited by entering new values and buttoning OK.

A second type of source is a displacement node 20e. A displacement is an ordered pair (x,y) of integers (either negative or positive). The default value for a newly created displacement node can be, for example, (0,0). Displacements are edited exactly as points are.

A third type of source is a background source 20b. A background is a raster image of indefinite size filled with, for example, an 8 pixel square repeating image called a pattern. Backgrounds are taken to extend infinitely in all directions, i.e., they will completely fill any size pen (when used for scan conversion) or mask. The default pattern for a newly-created background node can be, for example, all white. Backgrounds are edited in a special dialogue window which permits an operator to choose from a variety of predefined patterns. The window labelled Background C in FIG. 3 illustrates a window displaying some illustrative patterns. The selected background pattern is indicated by enclosing it in a black square. The background pattern can be changed by buttoning a different pattern and then buttoning OK. Buttoning cancel will move the black square back to the original background pattern.

A fourth type of source node is a raster appearance 20c. A raster appearance is a previously prepared raster image, i.e., a bitmap. Raster appearances are edited using a special dialogue window which allows an operator to choose from a variety of prepared raster images. The window labeled Raster Constant D in FIG. 3 is an example of the special dialogue window for raster appearances. The selected raster image is highlighted by, for example, placing a box around it. The images are described rather than shown, although a display which shows the images could also be used. An operator can change the raster appearance's bitmap by buttoning a different name and buttoning OK.

A fifth type of source is a line segment appearance 20d. A line segment appearance is a set of Euclidean line segments, i.e., a set of infinitely thin line segments whose end points have real coordinates. Editing a line segment appearance will now be described.

As described earlier, line segment appearances cannot be viewed directly, rather they must always be scan converted and the results viewed. Accordingly, the operating system has an editor window for a line segment appearance node display of the result of applying a scan-conversion transform to the node segments. The window labeled Viewer C in FIG. 8 illustrates such a conversion. The editing operations in line segment appearance editor windows are invoked from a menu that is enabled whenever such an editor is active. When an operator creates a line segment appearance node in the graph view window, that node is automatically connected to a scan conversion node and a viewer node, and the editing window for that viewer node is then displayed so that the operator can edit the line segment appearance. The line segment appearance can be edited any number of ways which are conventional in the art. New segments can be created, existing segments can be deleted, and any segments can be moved.

E. Implementation

The present invention is implemented in a manner which allows for flexible, precise, simple integration of new figural operations and figural models (graphical domains) into existing operations and models. Programmers can add new operations for use with existing models (e.g., affine transformation over vector art), new operations between existing figural models (e.g., raster-to-vector recognition operators, vector-to-raster scan-conversion operations), and entirely new figural models (e.g., text, 3D, video) both with their own operations and with existing-model inter-conversion operations.

The extensibility of implementation, just like the precision of the user interface, is rooted directly in ACGs. The key to this is the observation that ACGs are basically data flow diagrams. The basis of the implementation of the present graphics editor is the direct representation of ACGs in an object-oriented graph representation language. For example, Common Lisp Object System (CLOS) graph representation language can be used. Nodes in the graph are objects which keep track of their connections to neighbors and which respond to a standard set of graph traversal messages. The graphic functionality of transducers is implemented by making their objects inherit functionality not only from the node class (i.e., the type of input/output-source, transforms, sink) but also from a graphics operator class (i.e., perform specific function based on input) which responds to standard operation messages such as reading inputs and providing outputs. Transducer node types (all node types are illustrated in FIG. 9) correspond to subclasses of the generic operator class which implement functionality appropriate to the node type.

As a user uses the graph-construction interface to build an ACG, the editor is in fact building this ACG in the underlying object model. When the operator asks that the ACG be executed, a graph traversal algorithm is run which, as it walks the graph from the bottom up (from leaf nodes to root nodes), invokes the graphics operations associated with each source, operator, and sink. This has the effect of constructing and displaying the appropriate appearance. In other words, the present invention executes ACGs by propagating graphics information along the data flow arcs which connect the ACG nodes.

This very simple, direct implementation model has two great advantages. First, as mentioned early, it allows for the easy integration both of new operators and of new figural models. Second, it allows traditional compiler optimization technology, already adapted for use with abstract syntax graphs, to be employed directly so as to reduce both the time and space requirements for graph execution.

If a programmer wished to integrate some new figural functionality, expressed perhaps as a library of routines and some associated data structures, two aspects must be addressed. Appropriate access must be provided to the operation library, and appropriate typing information must be provided to the ACG construction interface. However, since in the present invention, both operation invocation and graph construction are handled via the same mechanism, one achieves both simply by writing some object-oriented "glue" interfaces to the library. (And, possibly if one is greatly concerned with efficiency, some optimization advice to the graph walker.)

Figure 14:
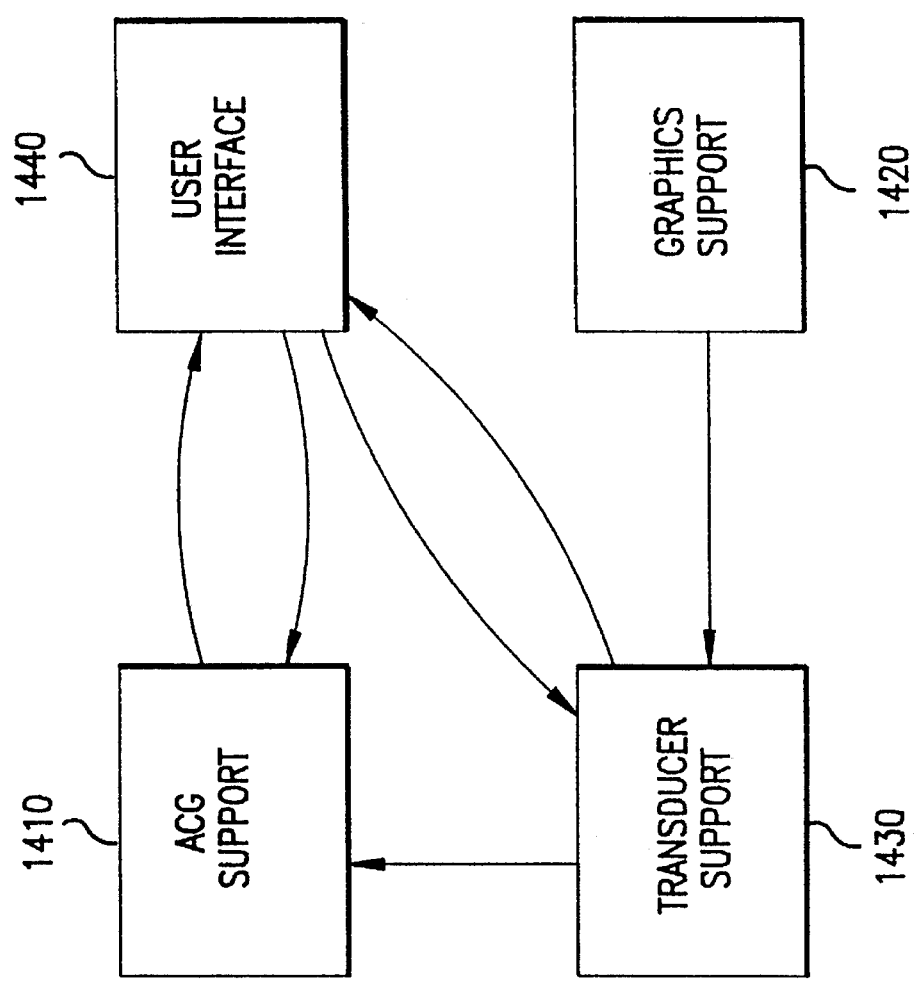
FIG. 14 is a block diagram of the modules forming the graphics editor of the present invention.

The implementation of the present invention is best understood as being broken into four interconnected modules represented by a block diagram in FIG. 14:

1) ACG support module 1410. This module provides a representation of the ACG graphs, specifies the input/output protocols for the transducers embedded in ACGs, and implements execution of ACGs.
2) Graphics support module 1420. This module implements the figural models which are supported by the graphics editor.
3) Transducer module 1430. This module provides the implementations of the particular transducers used in the graphics editor.
4) User interface module 1440. This module provides for the editing of ACGs and image fragments, and for the display of generated images.

Reference can be made to the associated source code for an example of a specific implementation of the present invention.

E.1 ACG support

The ACG module supports two related views of ACGs: one—crucial to the user interface, as directed acyclic graphs whose nodes are transducers; another—crucial to image generation—as expressions in a functional imaging language whose operators are transducers. Thus, an ACG can be manipulated as a directed, acyclic graph (DAG)—creating and destroying transducer nodes, adding and removing edges between nodes—and then asking the editor to produce one or more appearances from that graph by evaluating the expression it represents—running each transducer in the graph in the proper sequence over the proper inputs.

The ACG support module represents ACGs directly as DAGs. The expression view is supported by a graph traversal (evaluation) algorithm which recursively descends an ACG from the roots to the fringes; each node in the ACG is evaluated by applying its transformation to the inputs obtained by evaluating its children. As an operator manipulates the graph view in the user interface, that module constructs an appropriate ACG using the tools provided by this module. Then, when an operator asks to see the image produced by the ACG, the user-interface module uses the evaluation traversal to produce an output image at each of the roots of the prepared graph, and then displays those images.

The representation of ACG DAGs makes use of a special metaclass (i.e., "graphic-operator") Instances with metaclass "graphic-operator" act as nodes of ACGs. The nodes can have an arbitrary number of named ports each of which can contain children, and they keep back pointers to all their parents. All the standard graph operations are defined over nodes by defining methods over the special class "operator" which is automatically made a super class (i.e., raster, vector, etc.) of any instance with metaclass "graphic-operator". These operations include both queries (How many children does this node have? What are its port names? etc. (see the code)) and manipulations (add this child to this port of this node, etc. (see the code)).

The evaluation traversal for ACGs works by invoking an evaluation method (i.e., "perform-draw-actions") on the roots of the ACG. This method is specialized on each class of transducer so as to perform the operations appropriate to that class. Any transducer which takes inputs (has children in the graph) will invoke "perform-draw-actions" recursively on its inputs. This evaluation proceeds post-order from the roots to the fringes in an ACG. Thus, a parent will not be evaluated until all of its children are evaluated.

This evaluation algorithm invokes "perform-draw-actions" on a node at least once for each parent that the node has. Since ACGs are DAGs, rather than trees, this may lead to nodes being evaluated more than once during a single evaluation pass. Since transducers are required not to have side effects, however, this repetitive evaluation cannot affect the output produced by the evaluation process, only the efficiency of evaluation. Since efficiency must be of concern in any real-time editor, ACG evaluation can be optimized.

One class of optimizations is suggested by the observation that while the present invention evaluates the graphic-language expression represented by an ACG, it would be possible instead to compile such an expression into a more efficient form, and then execute that. If the additional cost of compilation were sufficiently small, then the combined cost of the compilation and successive execution would be smaller than that of the original evaluation. Three natural optimizations suggested by this approach are:

1) Repeated-expression removal. As observed above, repeated evaluations of the same subgraph of an ACG must produce identical results. In fact, repeated evaluations of isomorphic subgraphs must also produce the same results (where two fringe nodes are considered equivalent if they contain the same image fragments). After analyzing the expression graph and picking out isomorphic subgraphs, evaluation of the subgraphs could be done just once and their output cached for reuse as necessary.

2) Unreachable-expression removal. Not all the output of a node (or subgraph) is always used by the parent of that node. Pre-analysis of the ACG can reveal such situations, allowing the removal of unused subexpressions and a consequent savings of execution time.

3) Idempotent-expression removal. Sometimes the output of a transducer is identical to its input. Pre-analysis of the ACG can reveal such situations, allowing the removal of such transducers and a subsequent saving of execution time.

Implementation of these three optimizations can be achieved by augmenting ACGs so that they are attribute-graphs (such as those discussed in the standard compiler-theory literature) and then doing specialized attribute propagation as a precursor to the evaluation traversal.

One more optimization-incremental reevaluation-could be added to the ACG module in order to improve the response to changes made in an existing ACG. Since an ACG is often reevaluated by a user after making changes in small pieces of that ACG, and since unchanged subgraphs will always produce the same output on subsequent evaluations, reevaluations could often be sped up by not re-evaluating unchanged portions of the ACG.

E.2. Graphics support

In the present embodiment, in order to support the Euclidean models, the software must provide rudimentary support for the finding of segment-point distances and segment-segment intersections. The raster model, and conversions from the Euclidean to the raster models can be supported, for example, by QuickDraw®, a proprietary set of routines made available for general use on the Macintosh by Apple Computer. Documentation for QuickDraw® may be found in volumes 1–5 of Inside Macintosh, written by the technical staff of Apple Computer and published by Addison-Wesley.

E.3. Transducers

Transducers have two types of functionality. They are the nodes in ACGs, thus they have a graph functionality which involves keeping track of their children and their parents. They are also appearance transformers, thus they have a graphics functionality which involves manipulating the appearances of their children so as to produce an output appearance.

As explained above, the graph functionality of transform instances is implemented by making them have a metaclass operator-class. This gives each transform instance one slot for each of its named ports: these slots keep track of the instance's children, and graph operations on the instance work by making changes in the slots.

Also as explained above, the graphic functionality of transform instances is implemented by defining special evaluation methods over them. That is, for each class of node, a method definition for "perform-draw-actions" is defined which performs a specified function on a specific class (or classes) of input to create a specific type of output.

A distinction is made between transducers that implement fringe nodes of ACGs (which are image fragments) and those that implement internal nodes (transforms). Since the graphic functionality of transducers is determined by method definitions, and since method definitions are class-based, the class of a transducer is the primary determiner of its behavior. What differentiates the behavior of instances of the same transducer class is the local state of that instance, namely its slot contents. We have already seen that each transducer stores its children in its slots, thus, the behavior of internal nodes (transforms) can be made dependent on their children. In fact, the implementation of internal transducers (transforms) are consistently dependent only on their class and their children. Thus, they are functionally defined.

Fringe nodes (image sources), on the other hand, have no children, and so instances of the same class cannot be differentiated thereby. Instead, each fringe transducer is given an internal state which can be thought of as an image fragment in one of the figural models, and the graphic functionality of the transducer is determined by that image fragment. This is why the user interface provides editors for fringe nodes, but not for internal nodes. Internal nodes have no state to edit other than their children, while fringe nodes do.

The important thing about the transducer frame work is that it makes building extensions very modular. The graphic functionality desired can simply be couched as methods attached to a particular class. The input and output of this functionality are then automatically attended to by the ACG module.

E.3. User Interface

The user interface breaks into three parts: ACG editing, image-fragment (or source) editing, and viewers. Each part is extremely straightforward.

The ACG editing mechanism works by interpreting signals input by a user (for example, by using mouse clicks and drags) as step-by-step instruction for building a DAG. (Other means for interpreting operator input commands, of course, can be provided.) It then follows these instructions two-fold: it builds a special interface DAG whose nodes and edges keep information about the graph window's display, and it also uses the ACG module to build the appropriate ACG. This strategy of keeping a separate interface DAG (rather than annotating the DAG with display information) was adopted to increase the implementation's modularity. Major changes can be made in both the user interface DAG representation and the ACG DAG representation without any interference between the two.

The source editing mechanism consists of unrelated, dedicated editors, one for each type of source (line segments, prepared bit-maps, backgrounds, points, and displacements). Four of the five editors can be, for example, Macintosh-style dialogues which allow a user to choose from a variety of pre-known possibilities.

The line-segment editor, however, recursively uses the transducer mechanism of the present invention. The basic problem in building an editor for line segment appearances which are defined using a Euclidean model, is that the editing interface—the display screen—uses a raster model. This problem must be faced by all editors whose input and output device models differ from the figural models of the appearances they edit. Thus, there is no way to directly display the appearance being edited, nor is there any way to use mouse pointing to directly specify end points for segments. Both the input and output of segments must make use of some raster representation.

The line-segment editor of the present invention handles this problem by recursively using the transducer network. When a user wishes to edit a line segment image source, a small ACG consisting of that source node, a single scan-conversion transducer, and a viewer as described above, is created. The viewer of this ACG is used as the viewer of the segment editor, thus the user sees the same representation of the segments as they would if they used a scan-converter transducer in the ACG. For purposes of referring to segments, the coordinate system of the line segment domain and the coordinate system of the raster domain are kept synchronized, so that mouse clicks appearing in the raster domain can be interpreted directly as mouse clicks in the vector domain.

Figure 15:
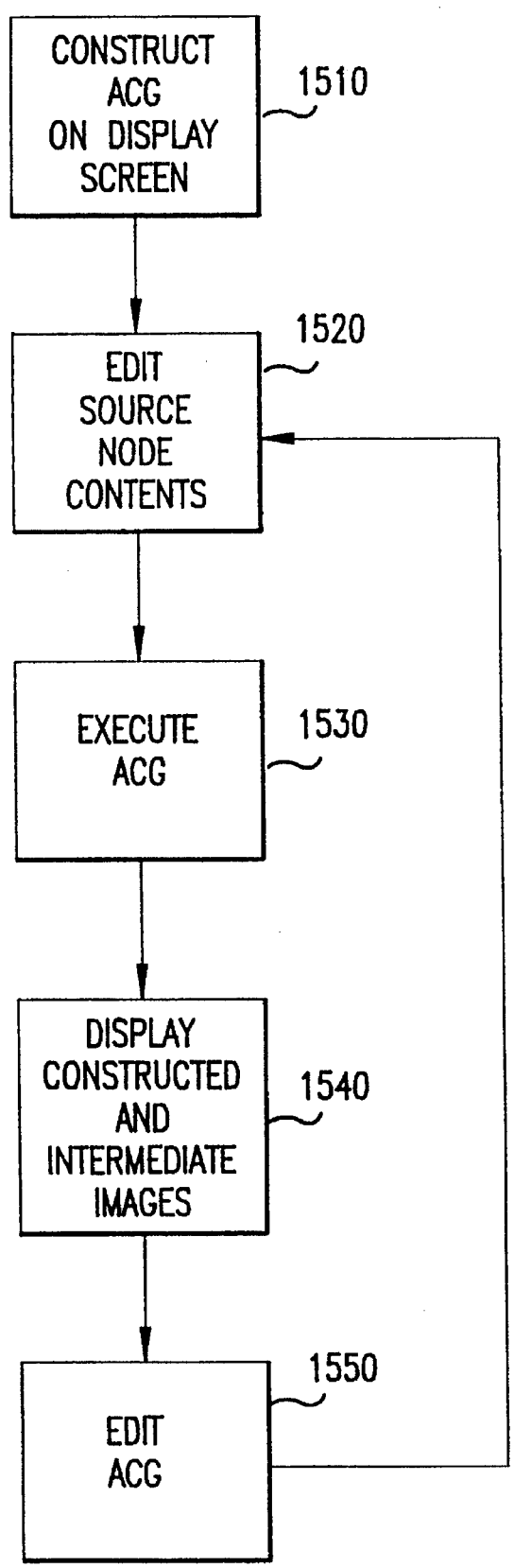
FIG. 15 is a flow diagram of an image formation process according to the present invention.

FIG. 15 is a flowchart illustrating the steps performed to create and display a complex image using the present invention. Images are created by constructing the ACG on the display screen in step 1510, editing the source node contents in step 1520, and executing the ACG in step 1530. After ACG execution, the constructed and any intermediate images indicated in the ACG can be displayed, for example, on the display screen in step 1540. Should any changes in the constructed image be desired after execution of the ACG, the ACG can be edited in step 1550, the source node contents can be edited, and then the ACG can be re-executed. While an entire ACG can be constructed before editing any of the source nodes, it is understood that an operator will preferably edit the source nodes as they are created. Additionally, the ACG and source nodes can be modified and remodified prior to execution of the ACG.

Figure 16:
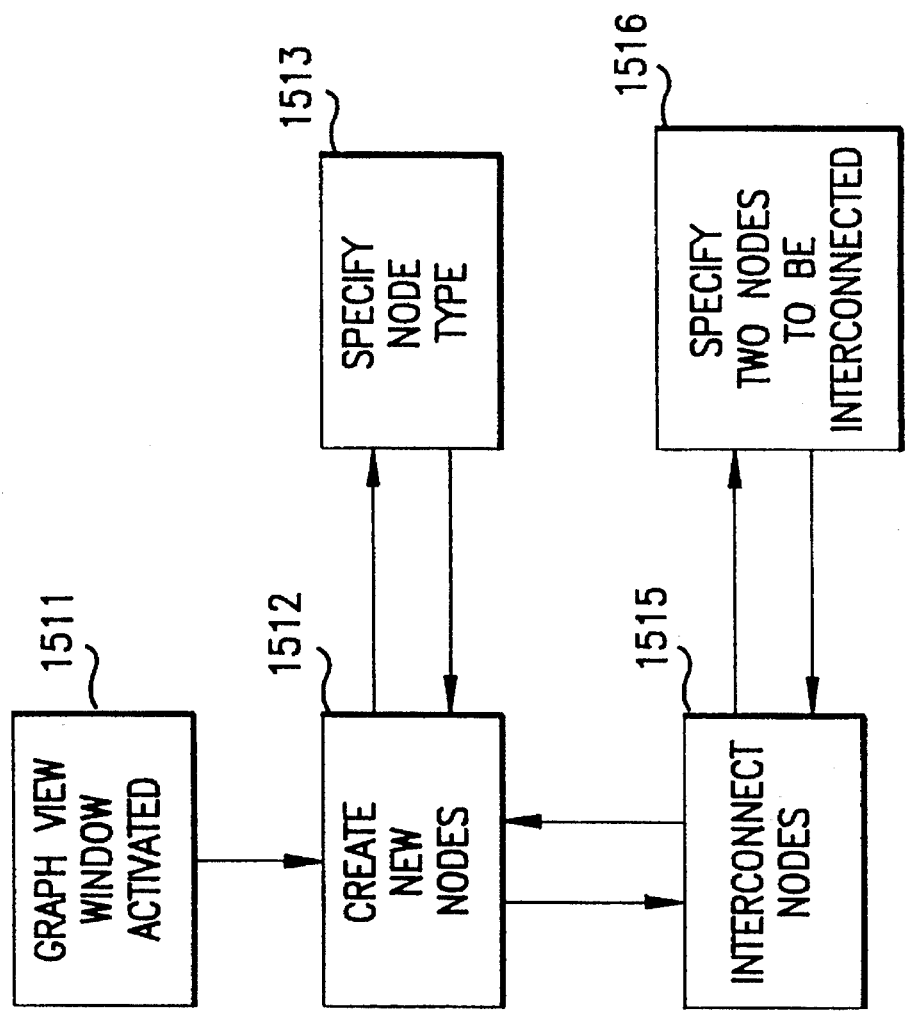
FIG. 16 is a flow diagram of the ACG construction process of the present invention.

FIG. 16 illustrates the steps performed to construct an ACG on a display screen. As described earlier, the graph view window is activated in step 1511, by, for example, the user providing the appropriate signal (called up from the Graph Ops menu). The user then inputs a signal (e.g., by manipulating a mouse in the graph view window and inputting mouse clicks where nodes are desired in the window) to indicate where a node is desired. The operator is then prompted to specify the node type in step 1513. If the node type is a source node, the operator may choose to edit the contents of the source node's image fragment at this time. The nodes are interconnected in step 1515. Interconnecting nodes requires that the operator input signals which specify the two nodes to be interconnected in step 1516. This can be done, for example, by positioning the cursor over one node, depressing a key on the keyboard, depressing the button on the mouse, and dragging the cursor to the desired node. When the cursor is released (completing the drag) by releasing the keyboard and cursor buttons, the two nodes are connected. This is displayed on the screen as a line interconnecting the two nodes. Additionally, the underlying data structure takes the output of the child node and uses it as an input to the parent node. Prompts can be provided to indicate that the specified child is not of the proper type input for the parent. These prompts are issued based upon evaluations of the previously described protocols for each node type. It is understood that the specific user manipulations for creating nodes, specifying node types, and interconnecting nodes can vary based upon the software used to implement the present invention. Additionally, the operator can connect newly created nodes to existing nodes as they are created, and does not have to wait until all nodes in the ACG are formed before connecting any of the nodes.

Figure 17:
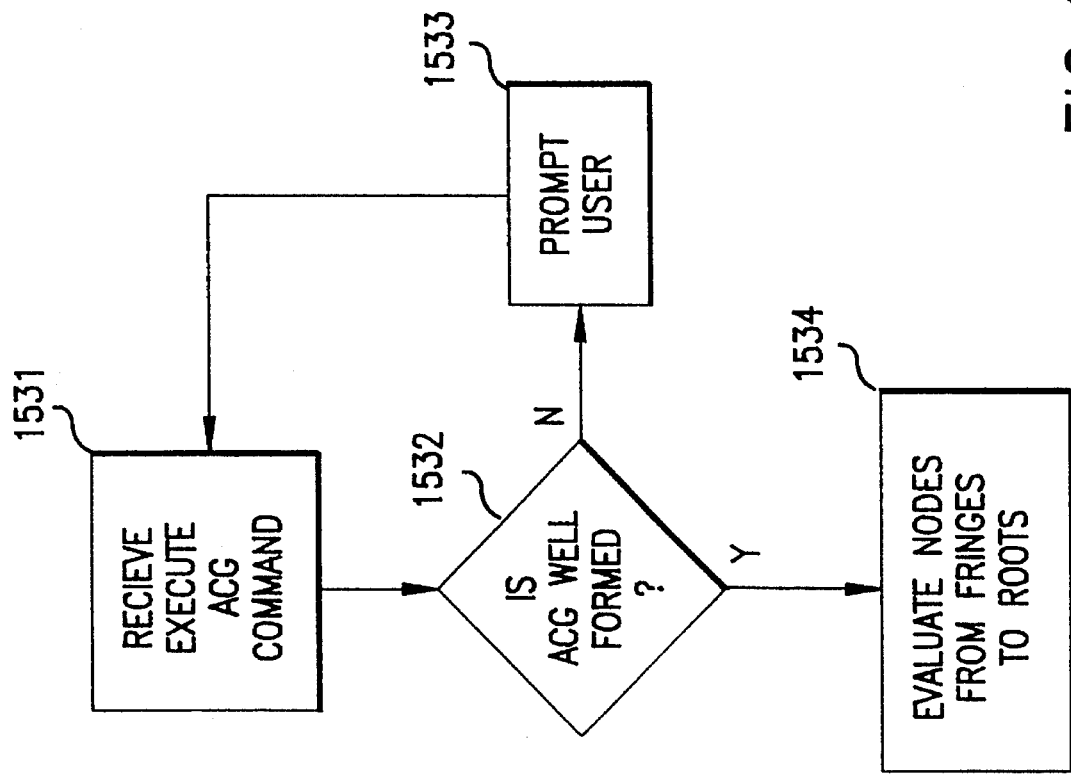
FIG. 17 is a flow diagram of the ACG execution process of the present invention.

FIG. 17 is a flow diagram of the process for executing the image formation process defined by an ACG. In step 1531, an operator inputs an "execute ACG" command. At this time, the structure walker can determine whether the ACG is well formed in step 1532. A well formed ACG is a DAG all of whose ports have at least one edge connected to them and all of whose edges obey the type restrictions of their ports. If the ACG is not well formed, the user is prompted in step 1533 so that they can edit the ACG prior to re-execution. If the ACG is well formed, operation proceeds to step 1534 where the nodes of the ACG are evaluated from the fringes (leafs) to the roots, as discussed above.

FIGS. 18A and 18B illustrate the processes for adding new nodes and deleting nodes, respectively, from an existing ACG. Referring to FIG. 18A, when an operator provides a control signal for adding a new node in step 1551, the operator is prompted to specify the node type in step 1552. If the node type is a source node, the operator may specify the contents of the source node at this time. Once a new node is defined, the operator then interconnects that node to one or more existing nodes in the ACG in step 1554. This is performed by specifying the nodes for interconnection to the newly defined node in step 1555. It is understood that the process of interconnecting two nodes can be performed at any time in order to edit an ACG. That is, an already existing node can be connected to another existing node by performing step 1555.

When it is desired to delete nodes, the operator provides a control signal in step 1557 to delete the specified node. This can be done, for example by positioning a cursor over a node and inputting an appropriate signal (e.g., hold down a keyboard key and mouse click over the node) indicating that this node should be deleted. Once the node is deleted, the interconnections which existed between that node and other nodes must be deleted in step 1558. This can be performed automatically when nodes are deleted. Additionally, interconnections (edges) between existing nodes can be deleted by providing the appropriate signals to delete a specified edge.

The following source code, contained in the attached APPENDIX, which is incorporated herein by reference, performs the functions of: interpreting operator input clicks and drags to form and display an ACG; actually creating the ACG; and executing the ACG (the graph walker). This source code is written in version 1.2.2 of Macintosh Allegro Common Lisp and can be executed on the hardware system described above.

While the present invention is described with reference to a preferred embodiment, this particular embodiment is intended to be illustrative, not limiting. Various modifications may be made without departing from the spirit and scope of the invention as defined in the appended claims.

APPENDIX

Copyright 1991, Xerox Corporation
```
;;; -*- Package: Y3 -*-

(in-package 'Y3)

;;;;;;;;;;;;;;;;;;;;;;;;;;;;;;;;;;;;;;;;;;;;;;;;;;;;;;;;;;;;;;;;;;;;;;;;;-
;;;;;;;;;;;;;

;;;; Operators
;;;;  This file implements a class which is intended as a mixin for classes ;;;;  which are to be thought of as operators in some language, with their ;;;;  instances acting as terms.

;;;;;;;;;;;;;;;;;;;;;;;;;;;;;;;;;;;;;;;;;;;;;;;;;;;;;;;;;;;;;;;;;;;;;;;;;-
;;;;;;;;;;;;;

;;; Class Operator
(defclass operator ()

((parents :initform '() :accessor parents)
   (reference-count :initform 0 :accessor reference-count)))

;;;;;;;;;;;;;;;;;;;;;;;;;;;;;;;;;;;;;;;;;;;;;;;;;;;;;;;;;;;;;;;;;;;;;;;;;-
;;;;;;;;;;;;;

;;; Metaclass Operator-class

;;; [] Could specialize argument-spec classes to support run-time type-checks.

(defclass operator-class (pcl::standard-class compatible-metaclass-
-mixin)

((argument-specs :reader argument-specs)
   (local-argument-specs :reader local-argument-specs)))

(defmethod operator-class-p ((op-class operator-class))
  't)

(defmethod operator-class-p ((anything t))
  'nil)
```

```
(defmethod find-arg-spec ((arg-name symbol) (op-class operator-class))
  (find arg-name (argument-specs op-class)
        :key #'name))

(defmethod find-arg-spec ((arg-name symbol) (op operator))
  (find-arg-spec arg-name (class-of op)))

(defmethod find-arg-spec-strict ((arg-name symbol) (op operator))
  (or (find-arg-spec arg-name op)
      (error "There is no argument named ~S on the operator class ~S."
             arg-name
             (class-of op))))

;;; This should be combined with OR method combination, but that doesn't
;;; exist yet, so we do it ourselves...
(defmethod pcl::legal-class-option-p ((op-class operator-class) option)
  (or (eq option :arguments)
      (call-next-method op-class option)))

(defmethod pcl::update-class ((class operator-class)
                              &rest key-arguments
                              &key (direct-superclasses () new-supers-p)
                                   (direct-slots () new-slots-p)
                                   (options () new-options-p)
                              &allow-other-keys)
  (let ((argument-specs-option (find :arguments options :key #'first)))
    (when (null argument-specs-option)
      (error "The :arguments class-option did not appear ~
              in the definition of operator class ~A"
             class))
    (let* ((argument-specs-text (rest argument-specs-option))
           (argument-specs-objects
             (parse-operator-argument-specs argument-specs-text))
           (argument-slots (mapcar #'slot-spec
                                   argument-specs-objects))
           (new-direct-slots
             (append direct-slots
                     (mapcar #'(lambda (slot-spec)
                                 (pcl::parse-class-slot class slot-spec))
                             argument-slots)))
```

```
                    (new-supers
                     (append direct-superclasses (list (find-class 'operato-
      r)))))
                (setf (slot-value class 'local-argument-specs) argument-spec-
        s-objects)
                #|(break "~&Operator-class Update-class:~
                        ~&Class: ~S~
                        ~&new-supers: ~S~
                        ~&new-direct-slots: ~S~
                        ~&argument-slots: ~S."
                    class
                    new-supers
                    new-direct-slots
                    argument-slots)|#
                (apply #'call-next-method
                    class
                    :direct-slots new-direct-slots
                    :direct-superclasses new-supers
                    key-arguments))))

        (defmethod collect-argument-specs ((op-class operator-class))
            (let* ((all-superclasses (pcl::class-precedence-list op-class))
                   (all-operator-superclasses
                    (remove-if-not #'operator-class-p all-superclasses))
                   (all-argument-specs
                    (apply #'append
                        (mapcar #'local-argument-specs
                                all-operator-superclasses)))
                   (result
                    (remove-duplicates all-argument-specs :key #'name)))
                #|(break "~&Collect-argument-specs. ~
                        ~&Result: ~S~
                        ~&All-superclasses: ~S~
                        ~&All-operator-superclasses: ~S~
                        ~&All-argument-specs: ~S."
                    result
                    all-superclasses
                    all-operator-superclasses
                    all-argument-specs)|#;debugg
            result))

        ;;; This method enforces the requirement that the set of arguments to
        an
        ;;; operator class be the union of its local arguments and the local
        arguments
```

```
;;; of all of its operator superclasses.
(defmethod pcl::propagate-class-update :after
  ((op-class operator-class)
   new-fully-defined-p
   old-fully-defined-p
   changed-class
   &rest key-arguments  ;hidden argument
   &key (its-direct-superclasses () supers-p)
   (its-options () options-p)
   (its-direct-slots  () slots-p))
  (setf (slot-value op-class 'argument-specs)
        (collect-argument-specs op-class)))

(defmethod pcl::describe-class :after ((op-class operator-class)
                                       &optional (stream *standard-
-output*))
  (format stream "~&Arguments: ~23T~S"
          (pcl::slot-value-or-default op-class 'argument-specs)))

;;;;;;;;;;;;;;;;;;;;;;;;;;;;;;;;;;;;;;;;;;;;;;;;;;;;;;;;;;;;;;;;;;;;;;-
;;;;;;;;;;;;;;;;
;;;; Operator-argument-specs
;;;; This is a class internal to the implementation of the metaclass
;;;; Operator-class. Its instances represent formal arguments to the operator-
;;;; class to which they are attached; they come in two separate flavors for
;;;; single arguments and list-valued arguments.

(defclass operator-argument-spec ()
  ((name :reader name
         :initarg :name)))

(defclass single-argument-spec (operator-argument-spec)
  ())

(defclass multiple-argument-spec (operator-argument-spec)
  ())

(defun parse-operator-argument-specs (spec-list)
  (flet ((parse-one (spec)
           (typecase spec
             (symbol
              (make-instance 'single-argument-spec :name spec))
             (cons
```

```
                          (make-instance   'multiple-argument-spec   :name   (first
        spec)))
                    (otherwise
                      (error "Invalid operator argument-spec: ~S" spec)))))
          (mapcar #'parse-one spec-list)))

(defmethod slot-spec ((arg operator-argument-spec))
          (let* ((name (slot-value arg 'name))
                 (initform (empty-arg-value arg))
                 (initfunction #'(lambda ()
                                   initform)))
            `(:name ,name
              :initarg ,name
              :initform ',initform
              :initfunction ,initfunction
              :reader ,name)))

(defmethod signature-spec ((arg single-argument-spec))
          `(,(name arg) :single))

(defmethod signature-spec ((arg multiple-argument-spec))
          `(,(name arg) :multiple))

(defmethod apply-to-arg (fn (op operator) (arg single-argument-spec))
          (funcall fn
                   (name arg)
                   (slot-value op (name arg))))

(defmethod apply-to-arg (fn (op operator) (arg multiple-argument-s-
        pec))
          (mapc #'(lambda (x)
                    (funcall fn (name arg) x))
                (slot-value op (name arg))))

(defmethod apply-to-arg-yielding-list (fn
                                               (op operator)
                                               (arg single-argument-spec))
          (list (funcall fn
                         (name arg)
                         (slot-value op (name arg)))))

(defmethod apply-to-arg-yielding-list (fn
                                               (op operator)
                                               (arg multiple-argument-spec))
          (mapcar #'(lambda (child)
```

```
                    (funcall fn (name arg) child))
              (slot-value op (name arg))))

(defmethod print-object ((spec single-argument-spec) stream)
         (format stream "#<single-arg ~S>" (name spec)))

       (defmethod print-object ((spec multiple-argument-spec) stream)
         (format stream "#<multiple-arg ~S>" (name spec)))

;;;;;;;;;;;;;;;;;;;;;;;;;;;;;;;;;;;;;;;;;;;;;;;;;;;;;;;;;;;;;;;;;;-
       ;;;;;;;;;;;;;;;
       ;;;; Backpointers
       ;;;; All nodes in our operator-graphs keep track of their parents and
       in what
       ;;;;   argument of the parent they are present.
       ;;;; [] This implementation is a candidate for efficiency-tuning: the
       searches
       ;;;;      for parents via a particular arg-spec could probably be
       indexed.

;;;;;;;;;;;;;;;;;;;;;;;;;;;;;;;;;;;;;;;;;;;;;;;;;;;;;;;;;;;;;;;;;;-
       ;;;;;;;;;;;;;;;
       ;;; Class Backpointer
       ;;; These live in the "parents" slot on an operator: they indicate a
       node
       ;;; and the arg-spec for the slot on that node, of which the operator
       is
       ;;; a value.
       (defclass backpointer ()
         ((parent :reader parent)
          (arg-spec :reader arg-spec)))

(defun make-backpointer (parent arg-spec)
         (let ((backpointer (make-instance 'backpointer)))
           (setf (slot-value backpointer 'parent) parent)
           (setf (slot-value backpointer 'arg-spec) arg-spec)
           backpointer))

(defmethod parentp ((parent operator)
                            (child operator)
                            (arg-spec operator-argument-spec))
         (find-if #'(lambda (backpointer)
                      (parent-filter parent arg-spec backpointer))
                   (parents child)))
```

```
(defun parent-filter (parent arg-spec backpointer)
  (and (eq (parent backpointer)
           parent)
       ;; [] This will lose if the operator-class has been
       ;;    redefined since one of the operator-instances was
       ;;    creating, which makes it possible for arg-specs
       ;;    which denote the same slot to be non-eq, since they
       ;;    are created by the class-definition process.
       (eq (arg-spec backpointer)
           arg-spec)))

(defmethod ensure-parent ((parent operator)
                          (child operator)
                          (arg-spec operator-argument-spec))
  (let ((existing-backpointer (parentp parent child arg-spec)))
    (when (null existing-backpointer)
      (increment-reference-count child)
      (push (make-backpointer parent arg-spec) (parents child)))))

(defmethod ensure-not-parent ((parent operator)
                              (child operator)
                              (arg-spec operator-argument-spec))
  (let ((existing-backpointer (parentp parent child arg-spec)))
    (unless (null existing-backpointer)
      (decrement-reference-count child)
      (setf (parents child) (remove-if #'(lambda (backpointer)
                                           (parent-filter parent
                                                          arg-spec
                                                          backpointer))
                                       (parents child))))))

;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;
;;;; Reference-counting stuff
;;;; Reference-counting is implemented here so that the backpointers don't
;;;; point to nodes that the application no longer regards as part of the
;;;; graph.  We may decide to piggy-back storage reclamation later, but the
;;;; issue now is one of correctness, not of performance.
;;;; Note that this scheme only disconnects all children when a reference
```

```
;;;;    count *becomes* zero, not when the node begins life with
reference count
;;;;    zero. Thus the nodes that application regards as the roots have
count
;;;;    zero for their whole lives, and de-allocating them or forgetting
about
;;;;    them is the responsibility of the application.

(defmethod increment-reference-count ((op operator))
    (incf (reference-count op)))

(defmethod decrement-reference-count ((op operator))
    (decf (reference-count op))
    (when (zerop (reference-count op))
        (zero-reference-action op)))

;;; This generic function is a hook for any actions that should be
carried out
;;; on nodes of a given class when their reference counts become zero.
(defmethod zero-reference-action ((op operator))
    (disconnect-all-children op))

;;;;;;;;;;;;;;;;;;;;;;;;;;;;;;;;;;;;;;;;;;;;;;;;;;;;;;;;;;;;;;;;;;;;;;-
;;;;;;;;;;;;;;
;;; Initialization method for operator instances.
;;; Ensures that backpointers to parents exist.
(defmethod initialize-instance :after ((op operator) &rest initargs)
    (declare (ignore initargs))
    (dolist (arg-spec (argument-specs (class-of op)))
        (apply-to-arg #'(lambda (arg-name child)
                            (ensure-parent op child arg-spec))
                      op
                      arg-spec)))

;;;;;;;;;;;;;;;;;;;;;;;;;;;;;;;;;;;;;;;;;;;;;;;;;;;;;;;;;;;;;;;;;;;;;;-
;;;;;;;;;;;;;;
;;;; Operator Signature Queries ;;; Produces a list of the names of all the arguments to the
;;; given operator.  Multple-arguments show up a a singleton list
;;; containing the name of the argument.
(defmethod signature ((op operator))
    (signature (class-of op)))

(defmethod signature ((op-class operator-class))
```

```
          (mapcar #'signature-spec (argument-specs op-class))))

;;; -*- Package: Y3 -*-
       (in-package 'Y3)

;;;;;;;;;;;;;;;;;;;;;;;;;;;;;;;;;;;;;;;;;;;;;;;;;;;;;;;;;;;;;;;;;;;;;;;;;;;-
       ;;;;;;;;;;;;;;;
       ;;;; Graphic-operators
       ;;;;  This file contains the definitions of operator-classes to be
       used in the
       ;;;;  graphic portion of the trees that Yetidor maintains.
       ;;;;  The functions for making the tree consistent and for drawing the
       graphics
       ;;;;  are grouped separately from the operator definitions.
       ;;;;   !! All the stuff that used to be in Figures.lisp in Y-II
       concerning
       ;;;;   . relationships between figures and their dynamics and the like
       has been
       ;;;;        supplanted by generic operator-graph operations.  What a
       relief.

;;;;;;;;;;;;;;;;;;;;;;;;;;;;;;;;;;;;;;;;;;;;;;;;;;;;;;;;;;;;;;;;;;;;;;;;;;;-
       ;;;;;;;;;;;;;;
       ;;; Class Graphic-operator
       ;;;  This class brings together the slots and behavior that all
       operators in
       ;;;. the edited dag are expected to have.
       ;;;   [] Get rid of the draw-specs slot: they are now passed as
       arguments during
       ;;;     the drawing process.
       (defclass graphic-operator ()
         ((view-region :accessor view-region)
          (marked-region :accessor marked-region)))

;;;;;;;;;;;;;;;;;;;;;;;;;;;;;;;;;;;;;;;;;;;;;;;;;;;;;;;;;;;;;;;;;;;;;;;;;;;-
       ;;;;;;;;;;;;;;;
       ;;; Class Local-Grafport
       ;;;  This class implements the behavior of operators that might or
       ;;;   might not have a local grafport allocated in a particular
       instance.
       ;;; By convention, the value in the slot Offscreen-grafport is either
       nil
       ;;; or a draw-spec referring to the offscreen-grafport.
       (defclass local-grafport ()
         ((offscreen-grafport :initform '() :accessor offscreen-grafport)))
```

```
;;; -*- Package:Y3; mode:LISP; -*-

(in-package 'Y3)

;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;
;;;; Operator Graphs
;;;
;;; This file implements graphs as expressions over operators.
;;; The expressions can share subterms and so form directed acyclic
;;; graphs.

;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;
;;; Class Unspecified-operator
;;;    The value of a single-argument in a newly-created operator defaults to
;;;    this.
(defclass unspecified-operator ()
   ()
   (:metaclass operator-class)
   (:arguments))

(defvar *unspecified-operator* (make-instance 'unspecified-operator))

(defmethod make-arg-empty ((op operator) (arg operator-argument-spec))
   (setf (slot-value op (name arg)) (empty-arg-value arg)))

(defmethod empty-arg-value ((arg single-argument-spec))
   *unspecified-operator*)

(defmethod empty-arg-value ((arg multiple-argument-spec))
   '())

(defmethod empty-arg-p ((op operator)
                        (arg-name symbol))
  (empty-arg-p op (find-arg-spec-strict arg-name op)))

(defmethod empty-arg-p ((op operator)
                        (arg-spec operator-argument-spec))
   (eq (slot-value op (name arg-spec)) (empty-arg-value arg-spec)))

;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;
;;;; Graph connection queries.
```

```
     (defmethod children ((op operator) (arg-name symbol))
       (children op (find-arg-spec-strict arg-name op)))

(defmethod children ((op operator) (arg-spec multiple-argument-spec))
       (slot-value op (name arg-spec)))

     (defmethod children ((op operator) (arg-spec operator-argument-spec))
       (error "Children was asked for operator ~S argument ~S,~
               which is not a multiple-value argument."
              op
              (name arg-spec)))

     (defmethod child ((op operator) (arg-name symbol))
       (child op (find-arg-spec-strict arg-name op)))

(defmethod child ((op operator) (arg-spec single-argument-spec))
       (slot-value op (name arg-spec)))

(defmethod child ((op operator) (arg-spec operator-argument-spec))
       (error "Child was asked for operator ~S argument ~S,~
               which is not a single-value argument."
              op
              (name arg-spec)))

;;;;;;;;;;;;;;;;;;;;;;;;;;;;;;;;;;;;;;;;;;;;;;;;;;;;;;;;;;;;;;;;;;;;;;;;;-
     ;;;;;;;;;;;;;;;
     ;;;; Graph manipulation operations.
     ;;;;    [] Some of these need to check that they are dealing with slots of the
     ;;;;       right type (list or single).
     ;;;;    [done] Can't just maintain a parents-list, because when we remove an
     ;;;;       argument we should only remove from the list of parents along
     ;;;;          the slot from which we removed the argument. We want explicit
     ;;;;       relations here, I'm afraid.
     ;;;;    [] Could have another flavor of replace that replaces a node
     ;;;;       everywhere it appears, rather than replacing something within
     ;;;;       a slot. This would have to be based on a graph-walk or an indexed-
     ;;;;       graph, I think.
     ;;;;    [] Need to pay attention to the issue of repeating values in multiple-
     ;;;;       argument slots. We'll probably eventually distinguish among several
```

```
;;;;     kinds of multiple-argument slot: set, ordered-set, multiset, ordered-
;;;;     list, vector...

;;; Removes the subgraph in a single-argument slot.
(defmethod delete-subgraph ((op operator) slot-name)
  (break "Delete-subgraph is obsolete: use Disconnect-child.")
  (let ((old-subgraph (slot-value op slot-name))
        (arg-spec (find-arg-spec slot-name op)))
    (make-arg-empty op arg-spec)
    (ensure-not-parent op old-subgraph arg-spec)))

(defmethod disconnect-child ((op operator) (arg-name symbol))
  (disconnect-child op (find-arg-spec-strict arg-name op)))

(defmethod disconnect-child ((op operator) (arg-spec single-argument-spec))
  (let* ((slot-name (name arg-spec))
         (child (slot-value op slot-name)))
    (make-arg-empty op arg-spec)
    (ensure-not-parent op child arg-spec)))

(defmethod disconnect-child ((op operator) (arg-spec operator-argument-spec))
  (error "Disconnect-child was called on operator ~S, argument ~S, ~
          which is not a single-valued argument."
         op
         (name arg-spec)))

;;; Replaces the subgraph in single-argument-slot.
;;; [] Need to introduce checking for single/multiple argument slot.
(defmethod replace-subgraph ((op operator) slot-name new-subgraph)
  (break "Replace-subgraph is obsolete: use Replace-child.")
  (let ((old-subgraph (slot-value op slot-name))
        (arg-spec (find-arg-spec slot-name op)))
    (setf (slot-value op slot-name) new-subgraph)
    (ensure-not-parent op old-subgraph arg-spec)
    (ensure-parent op new-subgraph arg-spec)))

(defmethod replace-child ((op operator)
                          (arg-name symbol)
                          (new-child operator))
  (replace-child op (find-arg-spec-strict arg-name op) new-child))
```

```
(defmethod replace-child ((op operator)
                          (arg-spec single-argument-spec)
                          (new-child operator))
  (let* ((slot-name (name arg-spec))
         (old-child (slot-value op slot-name)))
    (setf (slot-value op slot-name) new-child)
    (ensure-not-parent op old-child arg-spec)
    (ensure-parent op new-child arg-spec)))

(defmethod replace-child ((op operator)
                          (arg-spec operator-argument-spec)
                          (new-child operator))
  (error "Replace-child was called on operator ~S, argument ~S, ~
          which is not a single-valued argument."
         op
         (name arg-spec)))

(defmethod disconnect-all-children ((op operator))
  (mapc-argument-slots #'(lambda (op arg-spec)
                           (disconnect-children-in-argument op arg-spec))
                       op))

(defmethod disconnect-children-in-argument ((op operator)
                                            (arg-name symbol))
  (disconnect-children-in-argument op (find-arg-spec-strict arg-name op)))

(defmethod disconnect-children-in-argument ((op operator)
                                            (arg-spec operator-argument-spec))
  (apply-to-arg #'(lambda (arg-name child)
                    (ensure-not-parent op child arg-spec))
                op
                arg-spec)
  (make-arg-empty op arg-spec))
(defmethod replace-subgraph-list ((op operator) slot-name new-subgraph-list)
  (check-type new-subgraph-list list)
  (break "Replace-subgraph-list is obsolete: use Replace-children.")
  (let ((arg-spec (find-arg-spec slot-name op)))
    (setf (slot-value op slot-name) new-subgraph-list)
    (mapc #'(lambda (new-subgraph)
              (ensure-parent op new-subgraph arg-spec))
          new-subgraph-list)))
```

```
(defmethod replace-children ((op operator)
                             (arg-name symbol)
                             (new-children list))
    (replace-children op (find-arg-spec-strict arg-name op) new-chil-
dren))

(defmethod replace-children ((op operator)
                             (arg-spec multiple-argument-spec)
                             (new-children list))
    (let* ((slot-name (name arg-spec))
           (old-children (slot-value op slot-name)))
      (mapc #'(lambda (old-child)
                (ensure-not-parent op old-child arg-spec))
            old-children)
      (setf (slot-value op slot-name) new-children)
      (mapc #'(lambda (new-child)
                (ensure-parent op new-child arg-spec))
            new-children)))

(defmethod replace-children ((op operator)
                             (arg-spec operator-argument-spec)
                             (new-children list))
    (error "Replace-children was called on operator ~S, argument ~S, ~
            which is not a multiple-valued argument."))

;;; [] Assumes that the lists are used like sets (no duplication of
elements).
(defmethod remove-subgraph ((op operator) slot-name subgraph)
    (break "Remove-subgraph is obsolete: use Disconnect-one-child. ")
    (let ((existing-subgraphs (slot-value op slot-name))
          (arg-spec (find-arg-spec slot-name arg)))
      (setf (slot-value op slot-name)
            (remove subgraph existing-subgraphs))
      (ensure-not-parent op subgraph arg-spec)))

(defmethod disconnect-one-child ((op operator)
                                 (arg-name symbol)
                                 (child operator))
    (disconnect-one-child op (find-arg-spec-strict arg-name op) child))

(defmethod disconnect-one-child ((op operator)
                                 (arg-spec multiple-argument-spec)
                                 (child operator))
    (let* ((slot-name (name arg-spec))
           (existing-children (slot-value op slot-name)))
```

```
        (when (find child existing-children)
            (setf (slot-value op slot-name) (remove child existing-child-
    ren))
            (ensure-not-parent op child arg-spec))))

(defmethod disconnect-one-child ((op operator)
                                        (arg-spec operator-argument-spec)
                                        (child operator))
        (error "Disconnect-one-child was called on operator ~S, argument ~S
    ~
            which is not a multiple-valued argument."
            op
            (name arg-spec)))

(defmethod insert-subgraph-last ((op operator) slot-name new-subgraph)
        (break "Insert-subgraph-last is obsolete: Use Insert-child-last.")
        (let ((arg-spec (find-arg-spec slot-name op)))
            (setf (slot-value op slot-name)
                (append (slot-value op slot-name) (list new-subgraph)))
            (ensure-parent op new-subgraph arg-spec)))

(defmethod insert-child-last ((op operator)
                                    (arg-name symbol)
                                    (new-child operator))
        (insert-child-last op (find-arg-spec-strict arg-name op) new-child))

(defmethod insert-child-last ((op operator)
                                    (arg-spec multiple-argument-spec)
                                    (new-child operator))
        (let* ((slot-name (name arg-spec))
                (existing-children (slot-value op slot-name)))
            (setf (slot-value op slot-name) `(,@existing-children ,new-child))
            (ensure-parent op new-child arg-spec)))

(defmethod insert-child-last ((op operator)
                                    (arg-spec operator-argument-spec)
                                    (new-child operator))
        (error "Insert-child-last was called on operator ~S, argument ~S ~
            which is not a multiple-valued argument."
            op
            (name arg-spec)))
    (defmethod insert-child-nth-from-last ((op operator)
                                            (arg-name symbol)
                                            (n integer)
                                            (new-child operator))
```

```
        (insert-child-nth-from-last op (find-arg-spec-strict arg-name op) n
    new-child))

(defmethod insert-child-nth-from-last ((op operator)
                                               (arg-spec   multiple-argu-
    ment-spec)
                                               (n integer)
                                               (new-child operator))
          (let ((children (children op arg-spec)))
            (let ((bottom-part (butlast children n))
                  (top-part (nthcdr (- (length children) n) children)))
              (setf (slot-value op (name arg-spec))
                    `(,@bottom-part ,new-child ,@top-part))
              (ensure-parent op new-child arg-spec))))

(defmethod insert-child-nth-from-last ((op operator)
                                               (arg-spec   operator-argu-
    ment-spec)
                                               (n integer)
                                               (new-child operator))
          (error "Insert-child-nth-from-last was called on operator ~S,
     argument ~S ~
                  which is not a multiple-valued argument."
                 op
                 (name arg-spec)))

(defmethod insert-child-nth ((op operator)
                                     (arg-name symbol)
                                     (n integer)
                                     (new-child operator))
          (insert-child-nth op (find-arg-spec-strict arg-name op) n
    new-child))

        (defmethod insert-child-nth ((op operator)
                                     (arg-spec multiple-argument-spec)
                                     (n integer)
                                     (new-child operator))
          (let ((children (children op arg-spec)))
            (let ((head-part (subseq children 0 n))
                  (tail-part (butlast children n (length children))))
              (setf (slot-value op (name arg-spec))
                    `(,@head-part ,new-child ,@tail-part))
              (ensure-parent op new-child arg-spec))))
```

```
(defmethod insert-child-nth ((op operator)
                              (arg-spec multiple-argument-spec)
                              (n integer)
                              (new-child operator))
  (error "Insert-child-nth was called on operator ~S, argument ~S ~
          which is not a multiple-valued argument."
         op
         (name arg-spec)))

(defmethod insert-subgraph-first ((op operator) slot-name new-subg-
raph)
  (break "Insert-subgraph-first is obsolete: use Insert-child-first.")
  (let ((arg-spec (find-arg-spec slot-name op)))
    (push new-subgraph (slot-value op slot-name))
    (ensure-parent op new-subgraph arg-spec)))

(defmethod insert-child-first ((op operator)
                                (arg-name symbol)
                                (new-child operator))
  (insert-child-first   op   (find-arg-spec-strict   arg-name   op)
new-child))

(defmethod insert-child-first ((op operator)
                                (arg-spec multiple-argument-spec)
                                (new-child operator))
  (let* ((slot-name (name arg-spec))
         (existing-children (slot-value op slot-name)))
    (setf (slot-value op slot-name) `(,new-child ,@existing-children))
    (ensure-parent op new-child arg-spec)))

(defmethod insert-child-first ((op operator)
                                (arg-spec operator-argument-spec)
                                (new-child operator))
  (error "Insert-child-first was called on operator ~S, argument ~S ~
          which is not a multiple-valued argument."
         op
         (name arg-spec)))

;;;;;;;;;;;;;;;;;;;;;;;;;;;;;;;;;;;;;;;;;;;;;;;;;;;;;;;;;;;;;;;;;;-
;;;;;;;;;;;;;;
;;; Connect-nodes
;;;  This is an easier-to-use interface to the above
;;; graph-editing functions. It carries out the argument-type
;;; dispatch inside, rather than requiring the user to know the
;;; multiplicity of the argument in advance. Handy for user
```

```
;;; interfaces and a multitude of household uses.
;;; The argument "position" should only be given when "arg-name"
;;; denotes a multiple-argument.  It can be 0 through the length
;;; of the list of children in the multiple-argument, or it can
;;; be the keyword :last.

(defmethod connect-nodes ((parent operator)
                          (arg-name symbol)
                          (child operator)
                          &optional position)
  (let ((arg-spec (find-arg-spec-strict arg-name parent)))
    (connect-nodes-internal parent arg-spec child position)))

(defmethod connect-nodes-internal ((parent operator)
                                   (arg-spec single-argument-spec)
                                   (child operator)
                                   position)
  (unless (null position)
    (error "Connect-nodes was called for parent ~S, argument ~S, ~
            which is a single argument, but the position parameter ~
            was supplied."
           parent
           (name arg-spec)))
  (replace-child parent arg-spec child))

(defmethod connect-nodes-internal ((parent operator)
                                   (arg-spec multiple-argument-spec)
                                   (child operator)
                                   position)
  (when (null position)
    (error "Connect-nodes was called for parent ~S, argument ~S, ~
            which is a multiple argument, but the position parameter was ~
            not supplied or is nil."
           parent
           (name arg-spec)))
  (cond
    ((and (integerp position) (not (minusp position)))
     (insert-child-nth parent arg-spec position child))
    ((eq position :last)
     (insert-child-last parent arg-spec child))
    (t
     (error "Connect-nodes was called with position argument ~S, ~
             which is neither a non-negative integer nor the keyword
:last."
```

```
                              position))))

;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;;; Node connectivity predicates (defmethod leafp ((op operator))
  (zerop (number-of-children op)))

(defmethod multiple-parents-p ((op operator))
  (> (reference-count op) 1))

(defmethod single-parent-p ((op operator))
  (= (reference-count op) 1))

;;; Sometimes I feel like a motherless child...
(defmethod no-parents-p ((op operator))
  (zerop (reference-count op)))

;;; check a parent-child relationship
(defmethod parent-child-p ((parent operator)
                           (child operator)
                           (arg-name symbol))
  (parent-child-p parent child (find-arg-spec-strict arg-name parent)))

(defmethod parent-child-p ((parent operator)
                           (child operator)
                           (arg-spec single-argument-spec))
  (eq child (slot-value parent (name arg-spec))))

(defmethod parent-child-p ((parent operator)
                           (child operator)
                           (arg-spec multiple-argument-spec))
  (member child (slot-value parent (name arg-spec))))

;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;;; Node connectivity enumeration functions (defmethod number-of-parents ((op operator))
  (reference-count op))

(defmethod number-of-children ((op operator))
  (reduce #'+ (mapcar-argument-slots #'number-of-occupants op)))
```

```
;;; find the number of occupants of a port
(defmethod number-of-occupants ((op operator)
                                (arg-name symbol))
  (number-of-occupants op (find-arg-spec-strict arg-name op)))

;;; [] Assumes that arg-spec specifies an argument to operator op.
(defmethod number-of-occupants ((op operator)
                                (arg-spec single-argument-spec))
  1)

(defmethod number-of-occupants ((op operator)
                                (arg-spec multiple-argument-spec))
  (let* ((slot-name (slot-value arg-spec 'name))
         (slot-value (slot-value op slot-name)))
    (length slot-value)))

;;;;;;;;;;;;;;;;;;;;;;;;;;;;;;;;;;;;;;;;;;;;;;;;;;;;;;;;;;;;;;;;;;;;;-
;;;;;;;;;;;;;;
;;;; Graph traversal operations.

;;;;;;;;;;;;;;;;;;;;;;;;;;;;;;;;;;;;;;;;;;;;;;;;;;;;;;;;;;;;;;;;;;;;;-
;;;;;;;;;;;;;;
;;; Mapc-arguments
;;; Mapcar-arguments
;;;   These apply a function to all the children of an node, en masse.
;;;   The function is supplied with one argument: the child node.
(defmethod mapc-arguments (fn (op operator))
  (let ((argument-specs (argument-specs (class-of op))))
    (dolist (argument-spec argument-specs)
      (apply-to-arg #'(lambda (name val)
                        (declare (ignore name))
                        (funcall fn val))
                    op
                    argument-spec))))

(defmethod mapcar-arguments (fn (op operator))
  (let ((result-list '()))
    (mapc-arguments #'(lambda (val)
                        (push (funcall fn val)
                              result-list))
                    op)
    (nreverse result-list)))

;;;;;;;;;;;;;;;;;;;;;;;;;;;;;;;;;;;;;;;;;;;;;;;;;;;;;;;;;;;;;;;;;;;;;-
;;;;;;;;;;;;;;
```

```
;;; Mapc-arguments-with-name
;;; Mapcar-arguments-with-name
;;;   fn takes (parent arg-name child) here.
(defmethod mapc-arguments-with-name (fn (op operator))
  (mapc-argument-slots #'(lambda (parent arg-spec)
                            (apply-to-arg #'(lambda (name child)
                                              (funcall fn parent name child))
                                          op
                                          arg-spec))
                       op))

(defmethod mapcar-arguments-with-name (fn (op operator))
  (mapcan-argument-slots #'(lambda (parent arg-spec)
                             (apply-to-arg-yielding-list
                              #'(lambda (name child)
                                  (funcall fn parent name child))
                              op
                              arg-spec))
                         op))

;;;;;;;;;;;;;;;;;;;;;;;;;;;;;;;;;;;;;;;;;;;;;;;;;;;;;;;;;;;;;;;;;;;;;;;;;;;;;;
;;; Mapc-argument-slots
;;; Mapcar-argument-slots
;;; Mapcan-argument-slots
;;;   These apply a function to all the arg-specs that are applicable to a node
;;;   instance.  The function is supplied with two arguments: the parent node
;;;   and the arg-spec.
(defmethod mapc-argument-slots (fn (op operator))
  (map-argument-slots-common fn op #'mapc))

(defmethod mapcar-argument-slots (fn (op operator))
  (map-argument-slots-common fn op #'mapcar))

(defmethod mapcan-argument-slots (fn (op operator))
  (map-argument-slots-common fn op #'mapcan))

(defun map-argument-slots-common (fn op map-fn)
  (funcall map-fn #'(lambda (arg-spec)
                      (funcall fn op arg-spec))
           (argument-specs (class-of op))))
```

```
;;;;;;;;;;;;;;;;;;;;;;;;;;;;;;;;;;;;;;;;;;;;;;;;;;;;;;;;;;;;;;;;;-
;;;;;;;;;;;;;;;
;;; Mapc-parents
;;; Mapcar-parents
;;; These apply a function to all the parents of an operator node.
;;; The function is supplied with one argument: the parent node.
(defmethod mapc-parents (fn (op operator))
  (mapc #'(lambda (backpointer)
            (funcall fn (parent backpointer)))
        (parents op)))

(defmethod mapcar-parents (fn (op operator))
  (mapcar #'(lambda (backpointer)
              (funcall fn (parent backpointer)))
          (parents op)))

;;;;;;;;;;;;;;;;;;;;;;;;;;;;;;;;;;;;;;;;;;;;;;;;;;;;;;;;;;;;;;;;;-
;;;;;;;;;;;;;;;
;;; Walk-graph-nodes
;;; Walk-graph-nodes-from-roots
(defmethod walk-graph-nodes (fn (op operator))
  (walk-graph-common-internal #'(lambda (walk-internal-fn)
                                  (funcall walk-internal-fn op))
                              fn))

(defun walk-graph-from-roots (fn roots)
  (walk-graph-common-internal #'(lambda (walk-internal-fn)
                                  (mapc walk-internal-fn roots))
                              fn))

(defun walk-graph-common-internal (top-level-fn fn)
  (let ((visitation-table (make-hash-table)))
    (labels ((walk-internal (node)
               (unless (visitedp node)
                 (funcall fn node)
                 (note-visited node)
                 (mapc-arguments #'(lambda (next-node)
                                     (walk-internal next-node))
                                 node)))
             (note-visited (node)
               (setf (gethash node visitation-table) 't))
             (visitedp (node)
               (gethash node visitation-table)))
      (funcall top-level-fn #'walk-internal))))
```

```
;;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;; Walk-graph-edges
;;; Walk-graph-edges-from-roots
;;;   fn is called on (parent arg-name child)
(defmethod walk-graph-edges (fn (op operator))
   (walk-graph-edges-common-internal #'(lambda (walk-internal-fn)
                                          (funcall walk-internal-fn op))
                                     fn))

(defun walk-graph-edges-from-roots (fn roots)
   (walk-graph-edges-common-internal #'(lambda (walk-internal-fn)
                                          (mapc walk-internal-fn roots))
                                     fn))

(defun walk-graph-edges-common-internal (top-level-fn fn)
   (let ((visitation-table (make-hash-table)))
      (flet ((visitedp (node)
                 (gethash node visitation-table))
             (note-visited (node)
                 (setf (gethash node visitation-table) 't)))
         (labels ((walk-1 (root)
                     (note-visited root)
                     (walk-internal root))
                  (walk-internal (node)
                     (mapc-arguments-with-name
                        #'(lambda (parent arg-name child)
                             (funcall fn parent arg-name child)
                             (unless (visitedp child)
                                (note-visited child)
                                (walk-internal child)))
                        node)))
            (funcall top-level-fn #'walk-1)))))

;;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;; Accumulate-downward
;;; Annotates a dag with values that propagate from the roots toward
the leaves
;;;   according to a specified calculation.
;;;
;;;   accumulate-fn is a function to apply to the values of the
attribute for
;;;                    the parents of a node in order to calculate and
store the
```

```
;;;             value for the node itself and return that value.
;;; fetch-fn takes a node as its argument and returns the value of the
;;;             attribute for that node.
;;;
;;; This function essentially performs a dynamic topological sort according
;;; to the parent-child relation.  All parents of a node must have a value
;;; for the attribute before the node's value can be computed.  The roots are
;;; assumed to have been assigned their attribute values before the call to
;;; accumulate-downward.
;;;
;;; This is much easier to think about in terms of pulling demand for the
;;; computation from the leaves, rather than trying to push values from the
;;; roots, so that's the way it's implemented in this initial attempt.
(defun accumulate-downward (accumulate-fn fetch-fn roots)
  (let ((computedp (make-hash-table))
        (leaves (find-leaves-from-roots roots)))
    (labels ((note-computed (node)
               (setf (gethash node computedp) 't))
             (computedp (node)
               (gethash node computedp))
             (compute-one (node)
               (if (computedp node)
                   (funcall fetch-fn node)
                   (prog1
                     (apply accumulate-fn
                            node
                            (mapcar-parents #'compute-one node))
                     (note-computed node)))))
      (mapc #'note-computed roots)
      (mapc #'compute-one leaves))))

;;; [] Document select-args-fn argument.
(defun accumulate-upward (accumulate-fn fetch-fn select-args-fn roots)
  (let ((computedp (make-hash-table))
        (leaves (find-leaves-from-roots roots)))
    (labels ((note-computed (node)
               (setf (gethash node computedp) 't))
```

```
                    (computedp (node)
                      (gethash node computedp))
                    (compute-one (node)
                      (if (computedp node)
                        (funcall fetch-fn node)
                        (prog1
                          (apply accumulate-fn
                                 node
                                 (mapcar #'compute-one (funcall select-ar-
       gs-fn node)))
                          (note-computed node)))))
              (mapc #'note-computed leaves)
              (mapc #'compute-one roots))))

(defun find-leaves-from-roots (roots)
         (let ((leaf-list '()))
           (labels ((note-if-leaf (node)
                      (when (leafp node)
                        (pushnew node leaf-list))))
             (walk-graph-from-roots #'note-if-leaf roots)
             leaf-list)))

;;;;;;;;;;;;;;;;;;;;;;;;;;;;;;;;;;;;;;;;;;;;;;;;;;;;;;;;;;;;;;;;;;;;;-
       ;;;;;;;;;;;;;;;
       ;;;; Copying operator graphs.

(defmethod copy-one-term ((op operator))
         (copy-term-common op #'identity))

(defmethod copy-term-tree ((op operator))
         (copy-term-common op #'copy-term-tree))

(defmethod copy-term-tree ((non-op t))
         non-op)

       (defmethod copy-term-common ((op operator) subterm-fn)
         (let ((op-copy (make-instance (class-of op))))
           (flet ((copy-argument (argument-name actual)
                    (setf (slot-value op-copy argument-name)
                          (funcall subterm-fn actual))))
           (mapc-arguments #'copy-argument op))
         op-copy))

(defmethod termp ((op operator))
         (with-slots (argument-names) op
```

```
         (every #'(lambda (argument-name)
                   (slot-boundp op argument-name))
                argument-names)))

;;;;;;;;;;;;;;;;;;;;;;;;;;;;;;;;;;;;;;;;;;;;;;;;;;;;;;;;;;;;;;;;;;;;;;;;;;;;-
    ;;;;;;;;;;;;;;
    ;;;; Conversions between operator-graphs and Lisp expressions.

(defmethod ->expression ((op operator))
      '(,(class-name (class-of op))
        ,@(apply #'append
                (mapcar-argument-slots
                  #'->expression-one-arg
                  op))))

(defmethod <-expression ((op operator) expr)
      op)

    (defmethod ->expression-one-arg ((op operator)
                                     (arg-spec single-argument-spec))
      '(,(name arg-spec) ,(->expression (child op arg-spec))) )

(defmethod ->expression-one-arg ((op operator)
                                     (arg-spec multiple-argument-spec))
      '(,(name arg-spec) ,(mapcar #'->expression (children op arg-spec))))

(defmethod ->expression ((non-op t))
      non-op)

(defmethod <-expression ((non-op t) expr)
      non-op)

    ;;;;;;;;;;;;;;;;;;;;;;;;;;;;;;;;;;;;;;;;;;;;;;;;;;;;;;;;;;;;;;;;;;;;;;;;;;;;-
    ;;;;;;;;;;;;;;
    ;;; Class YGraph
    ;;; Instances of this class represent an entire operator graph.
    ;;; This class could be specialized to provide extra services
    ;;; such as indexing nodes.

(defclass ygraph ()
      ((roots :accessor roots :initarg roots)))

(defmethod walk-graph-nodes (fn (yg ygraph))
      (walk-graph-from-roots fn (roots yg)))
```

```
(defmethod walk-graph-edges (fn (yg ygraph))
  (walk-graph-edges-from-roots fn (roots yg)))

(defmethod leaves ((yg ygraph))
  (find-leaves-from-roots (roots yg)))

;;; Analogous to the sequence function "position".
(defmethod ygraph-position ((node operator) (yg ygraph))
  (let ((ygraph-address '()))
    (walk-graph-edges
      #'(lambda (parent arg-name child)
          ())
      yg)))

(defclass ygraph-region ()
  ())

(defun make-empty-ygraph-region ()
  (make-instance 'ygraph-region))

(defmethod extend-to-node! ((node operator) (ygr ygraph-region))
  )

;;; -*- Package: Y3 -*-
(in-package 'y3)

;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;;
;;;; Attribute graphs.
;;;;    This facility implements the functionality of having named attributes with
;;;;    values that depend on attributes of neighboring nodes in some graph.

;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;;
;;; Class Attribute-mixin
;;;    Instances of this class can participate in attribute graphs. This class
;;;    expects to be mixed into subclasses of Operators.
;;;    [] The intial implementation is in terms of property-lists, which I
;;;       don't particularly like.
;;;    [] Might prefer to implement via a metaclass.  Until then I need to use
```

```
;;;     either a prototype instance or a separate table to store the
attribute-
;;;     specs.
(defclass attribute-mixin ()
  ((attribute-specs :allocation :class)
   (attribute-values :initform '())))

;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;; Metaclass Attribute-class-mixin
(defclass attribute-class-mixin (pcl::standard-class)
  ((attribute-specs)))

;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;; Metaclass Attributed-operator-class
(defclass   attributed-operator-class   (attribute-class-mixin
operator-class)
  ())

;;; This should be combined with OR method combination, but that
doesn't
;;; exist yet, so we do it ourselves...
(defmethod pcl::legal-class-option-p   ((attr-class attribute-class-
-mixin)
                                        option)
  (or (eq option :attributes)
      (call-next-method attr-class option)))

(defmethod pcl::add-named-class :around ((proto attribute-class-mixin)
                                         name   superclasses   slots
options)
  (let ((attribute-specs-option (find :attributes options :key
#'first)))
    (when (null attribute-specs-option)
      (error "The :attributes class-option did not appear ~
              in the definition of attributed operator class -A"
             name))
    (let* ((attribute-specs-text (rest attribute-specs-option))
           (attribute-specs-objects
             (parse-attribute-specs name attribute-specs-text))
           (attribute-slots (mapcar #'(lambda (spec)
                                        `(:name ,(slot-value spec
'name)))
                                    attribute-specs-objects)))
```

```
        (progl
          (call-next-method proto
                            name
                            superclasses
                            (append slots attribute-slots)
                            options)
          (setf (slot-value (find-class name) 'attribute-specs)
                attribute-specs-objects)))))

(defmethod pcl::describe-class :after ((attr-class attribute-class-
-mixin)
                                        &optional (stream *standard-
-output*))
  (format stream "~&Attributes: ~23T~S"
          (pcl::slot-value-or-default attr-class 'attribute-specs)))

;;;;;;;;;;;;;;;;;;;;;;;;;;;;;;;;;;;;;;;;;;;;;;;;;;;;;;;;;;;;;;;;;;;-
;;;;;;;;;;;;;;
;;; Class Attribute-spec
;;;    These live on a class having Attribute-mixin mixed in.  They include the
;;;    information associated with an operator class that is used when the
;;;    dependency graph among attribute instances is constructed and when the
;;;    attribute values are subsequently computed in accord with the dependency
;;;    graph and the update-functions.
(defclass attribute-spec ()
  ((name :initarg :name)
   (dependencies :initarg :dependencies)
   (update-fn :initarg :update-fn)))

(defun parse-attribute-specs (operator-name attribute-specs-text)
  (flet ((parse-one-attribute-spec (attribute-spec)
           (unless (and (listp attribute-spec)
                        (= (length attribute-spec) 2))
             (error "~S, which was passed as an attribute specifier to the ~
                     definition of an attributed operator class, was not a ~
                     list of two elements: an attribute name followed by a ~
                     calculation-form."
                    attribute-spec))
```

```
            (let ((attribute-name (first attribute-spec))
                  (calculation-form (second attribute-spec))
                  (operator-var (gensym (symbol-name operator-name))))
              (multiple-value-bind (calculation-lambda dependencies)
                  (if (eq calculation-form :given)
                      (make-non-dependent-accessor operator-var
                                                   attribute-name)
                      (make-dependent-updater operator-var
                                              calculation-form))
                (make-instance 'attribute-spec
                               :name attribute-name
                               :dependencies dependencies
                               :update-fn (compile nil
                                                    calculation-lamb-
da))))))
      (mapcar #'parse-one-attribute-spec attribute-specs-text)))

(defun make-non-dependent-accessor (operator-var attribute-name)
  (values
    `(lambda (,operator-var)
        (slot-value ,operator-var ',attribute-name))
    '()))
(defun make-dependent-updater (operator-var form)
  (let ((dependencies '()))
    (flet ((note-dependency (argument-name attribute-name)
              (push `(,argument-name ,attribute-name)
dependencies)))
      (values
        `(lambda (,operator-var)
           ,(walker:walk-form
              form
              nil
              #'(lambda (subform context env)
                  (cond
                    ((and (consp subform)
                          (eq (first subform) 'get-attribute))
                     (let ((argument-name (second subform))
                           (attribute-name (third subform)))
                       (note-dependency argument-name attribute-name)
                       `(slot-value (slot-value ,operator-var
',argument-name)
                                    ',attribute-name)))
                    (t
                     subform)))))
        dependencies))))
```

```
(defmethod print-object ((spec attribute-spec) stream)
  (format stream "#<attribute ~S>" (slot-value spec 'name)))

(defmethod attribute-value ((node attribute-mixin) (name symbol))
  (with-slots (attribute-values) node
    (getf attribute-values name)))

(defmethod (setf attribute-value) (new-value
                                    (node attribute-mixin)
                                    (name symbol))
  (with-slots (attribute-values) node
    (setf (getf attribute-values name) new-value)))

(defvar *operator->attribute-spec-table* (make-hash-table))

(defun find-attribute-spec (operator-class name)
  (let ((entry (gethash operator-class *operator->attribute-spec-table*)))
    (find name entry
          :key #'(lambda (a-spec)
                   (slot-value a-spec 'name)))))

;;; Assumes that the attribute-spec has all its slots correctly filled out.
(defmethod add-attribute-spec (operator-class attribute-spec)
  (let ((entry (gethash operator-class *operator->attribute-spec-table*))
        (name (slot-value attribute-spec 'name)))
    (if (null entry)
        (setf (gethash operator-class *operator->attribute-spec-table*)
              attribute-spec)
        (push attribute-spec (gethash operator-class
                                       *operator->attribute-spec-table*)))))

;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;
;;; Class Attribute-instance
;;;     These maintain information pertaining to one occurrence of an attribute.
(defclass attribute-instance ()
  ((attribute-node)
   (attribute-name)
   (validp)))
```

```
        (defmethod fetch ((a attribute-instance))
          (with-slots (attribute-node attribute-name) a
            (attribute-value attribute-node attribute-name)))

(defmethod (setf fetch) (new-value (a attribute-instance))
          (store a new-value))

(defmethod store ((a attribute-instance) new-value)
          (with-slots (attribute-node attribute-name) a
            (setf (attribute-value attribute-node attribute-name) new-value)))

;;;;;;;;;;;;;;;;;;;;;;;;;;;;;;;;;;;;;;;;;;;;;;;;;;;;;;;;;;;;;;;;;;;-
        ;;;;;;;;;;;;;;;
        ;;;; Class Attribute-graph
        ;;;; An instance of this class represents an attributed graph and its evolution
        ;;;; over time.

        (defclass attribute-graph ()
          ((root :accessor root :initarg :root)
           (dependency-graph)))

(defmethod calculate-dependencies ((ag attribute-graph))
          ())

        (defmethod update-attributes ((ag attribute-graph))
          ())

(defclass dependency-node ()
          ())

#|
        Test example (arithmetic expressions):

(defclass sum ()
          ()
          (:metaclass attributed-operator-class)
          (:arguments (terms))
          (:attributes
           (value
             (reduce #'+ (mapcar #'(lambda (term)
                                     (get-attribute term value)))))))

(defclass negation ()
          ()
```

```
       (:metaclass attributed-operator-class)
       (:arguments operand)
       (:attributes
         (value (- (get-attribute operand value)))))

(defclass product ()
    ()
    (:metaclass attributed-operator-class)
    (:arguments (factors))
    (:attributes
      (value
        (reduce #'* (mapcar #'(lambda (factor)
                                (get-attribute factor value)))))))

(defclass constant ()
    ()
    (:metaclass attributed-operator-class)
    (:arguments)
    (:attributes
      (value :given)))

(defun test-expressions-example ()
    (let ((test-tree (->operator-tree
                       '(sum :terms ((product ((constant :value 5)
                                               (constant :value 3)))
                                     (constant :value 4))))))
      ()))

|#

;;; -*- Package: Y3 -*-
  (in-package 'Y3)

;;;;;;;;;;;;;;;;;;;;;;;;;;;;;;;;;;;;;;;;;;;;;;;;;;;;;;;;;;;;;;;;;;;;;-
  ;;;;;;;;;;;;;;;
  ;;;; Compiler.lisp
  ;;;;    This is the code for the processing necessary to make an appearance
  ;;;;    expressed in the graphics language draw on the screen in the context
  ;;;;    of an editor.

;;;;;;;;;;;;;;;;;;;;;;;;;;;;;;;;;;;;;;;;;;;;;;;;;;;;;;;;;;;;;;;;;;;;;-
  ;;;;;;;;;;;;;;;
  ;;; Recompute-graph
```

```
;;;   This method propagates drawing information after an editor-op-
eration has
;;;   changed it, but before it gets redrawn.
;;;   Designing the propagation order has proved tricky.
;;;   The main idea in this incarnation is to satisfy several goals:
;;;   1) push information needed for drawing that is available at the
sinks
;;;      (viewers in this case) down to the source-nodes.
;;;   2) allow nodes one modest optimization: nodes whose outputs are
used in
;;;      more than one place can arrange to cache their computed values
locally
;;;      the first time computed for later reuse.
;;;
;;;   Satisfying these goals requires care.
;;;
;;;   [] Need to have exclusion between this code and the code for
;;;            refresh-screen-from-offscreen-grafport, because a screen
refresh could
;;;      conceivably be demanded between the time the editor-operation
starts
;;;      changing the graph and the time the re-attribution is finished.
;;;   [] needs layer that goes through a given list of viewers,
;;;   rather than always all of them.
(defun recompute-graph (roots)
   (propagate-view-regions-downward roots)
   (allocate-intermediate-storage roots)
   (perform-all-draw-actions roots))

;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;;;  Phase 1: Propagating the view-region downward.

(defun propagate-view-regions-downward (viewers)
   (accumulate-downward #'coalesce-view-regions
                        #'view-region
                        viewers))

(defmethod coalesce-view-regions ((node graphic-operator) &rest
view-regions)
   (setf (view-region node) (multiple-union-rect view-regions)))
(defmethod coalesce-view-regions ((pf polygon-finder) &rest
view-regions)
   (setf (cache pf) t)
   (call-next-method))
```

```
;;;;;;;;;;;;;;;;;;;;;;;;;;;;;;;;;;;;;;;;;;;;;;;;;;;;;;;;;;;;;;;;-
;;;;;;;;;;;;;;;
;;;; Phase 2 (not currently used): Propagating the marked-regions
upward.

#|

;;; Propagating upward in these graphs has the added twist that values

;;; may not be demanded from all the children.  The propagation
routine
;;; should  provide  the  marking-and-traversing  service,  but  the
client-supplied
;;; functions should decide which values to extract and combine.
(defmethod propagate-marked-regions-upward ((ed graphics-editor))
   (accumulate-upward #'coalesce-marked-regions
                      #'marked-region
                      #'marked-region-sources
                      (viewers ed)))

;;; [] Put this on hold: the background of the superposition always
marks
;;;     everywhere.
(defmethod coalesce-marked-regions ((node graphic-operator)
                                    &rest marked-regions)
   (setf (marked-region node) (rect-region-join marked-regions)))

(defmethod marked-region-sources ((v viewer))
   '(,(superposition v)))

(defmethod marked-region-sources ((node raster-constant))
   '())

(defmethod marked-region-sources ((node superposition))
   (components node))

(defmethod marked-region-sources ((node superposition-with-backgro-
und))
   '(,(background node) ,@(components node)))
|#

;;;;;;;;;;;;;;;;;;;;;;;;;;;;;;;;;;;;;;;;;;;;;;;;;;;;;;;;;;;;;;;;;-
;;;;;;;;;;;;;;
;;;; Phase 3: Allocating intermediate bitmaps where desired.
```

```
(defun allocate-intermediate-storage (viewers)
  (walk-graph-from-roots #'maybe-allocate-intermediate-storage
                         viewers))

;;; This is the default: not to allocate any intermediate bitmap.
(defmethod maybe-allocate-intermediate-storage ((g graphic-operator))
  'nil)

;;;

;;; [] Really needs to check for multiple *graphic-operator* parents.
;;; [] For now, no intermediate grafports are allocated.
(defmethod maybe-allocate-intermediate-storage ((s superposition))
  #|(when (multiple-parents-p s)
    (let ((box (bounding-box (view-region s)
                             ;; Alternate version...
                             #|(region-intersection (view-region s)
                                                  (marked-region s))|#)))
      #|(setf (offscreen-grafport s) (make-offscreen-grafport (width box)
                                                            (height box)))|#
      (print-rect (rect box))))|#)

;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;;;;;
;;;; Phase 4 (not being used): Communicate remaining portions of complete draw-
;;;;                           specifications around the dag.

#|
(defmethod compute-draw-actions ((ed graphics-editor))
  (accumulate-upward #'propagate-draw-source
                     #'draw-source
                     #'select-source-sources
                     (viewers ed)))

(defmethod propagate-draw-source ((v viewer) &rest parent-draw-specs)
  (error "Propagate-draw-source was called on viewer ~S"
         v))

;;; Superpositions merely instruct their components to draw on all the grafports
;;; on which the superposition draws.
```

```
       (defmethod propagate-draw-source ((s superposition) &rest parents--
       draw-specs)
          (setf (draw-specs s) (reduce #'union parents-draw-specs)))

(defmethod  propagate-draw-target   ((r   raster-constant)    &rest
       parents-draw-specs)
          (setf (draw-specs r) (reduce #'union parents-draw-specs)))

(defmethod propagate-draw-target ((ur uniform-raster-constant)
                                         &rest parents-draw-specs)
          (setf (draw-specs ur) (reduce #'union parents-draw-specs)))

       ;;; Viewers are never sources for a drawing.
       (defmethod draw-source ((v viewer))
          (error "Draw-source was called on viewer ~S"
                 v))

(defmethod draw-source ((s superposition))
          (if (offscreen-grafport s)
             (list (offscreen-grafport s))
             (draw-specs s)))

(defmethod draw-source ((r raster-constant))
          r)

       (defmethod draw-source ((ur uniform-raster-constant))
          ur)
       |#

;;;;;;;;;;;;;;;;;;;;;;;;;;;;;;;;;;;;;;;;;;;;;;;;;;;;;;;;;;;;;;;;;;;;-
       ;;;;;;;;;;;;;;
       ;;;; Phase 5: Carry out the drawing.

;;; Need to be careful of order.
       ;;;
       ;;; It is the responsibility of every graphic-operator to invoke
       ;;; perform-draw-actions recursively on components whose draw-actions
       ;;; must be executed before its own can be completed.  This works by
       ;;; passing a target down through the recursive calls.  If a node is
       ;;; a source, it draws to the target.  If it has a local bitmap, it
       ;;; becomes a source by passing its bitmap down as a target, then
       ;;; drawing to its own target and marking itself to be a source.
       ;;;
       ;;; This pass essentially acts as an iteration over all paths
       ;;; from appearance- sources to appearance-sinks.  Certain data
```

```
;;; relevant to the draw-action that finally takes place are
;;; accumulated along the path by the recursive calls to
;;; perform-draw-actions.  Examples of such data are coordinate
;;; transformations and clipping-regions.
;;;
;;; Roughly, it is the responsibility of perform-draw-actions to
;;; set up path information, and that of draw to consume it and put
;;; the graphics thus specified into effect.  It is intended that the
;;; caching of results be an independent part of the implementation
;;; that can be grafted in later by altering some methods on
;;; perform-draw-actions.

(defun perform-all-draw-actions (canvasses)
   (mapc #'(lambda (canvas)
             (perform-draw-actions canvas 'nil))
         canvasses))

#|
(defmethod perform-draw-actions ((node viewer) target-info)
   (declare (ignore target-info))
   (perform-draw-actions (superposition node)
                         (make-raster-surface-target  (offscreen-grafport node)
                                                     (view-rect-region node))))
|#

;;; Since raster-canvases are a subclass of superpositions, we
;;; just have to make our new raster-surface-target and pass it
;;; to the method for superpositions.
(defmethod perform-draw-actions ((node raster-canvas) target-info)
   (declare (ignore target-info))
   (let ((new-target (make-raster-surface-target (offscreen-grafport node)
                                                 (view-rect-region node))))
      (call-next-method node new-target)))

(defmethod perform-draw-actions ((node superposition) target-info)
   (perform-draw-actions-on-components node target-info))
(defmethod perform-draw-actions-on-components ((s superposition) target-info)
   (mapc #'(lambda (component)
             (perform-draw-actions component target-info))
         (components s)))
```

```
(defmethod perform-draw-actions-on-components
  :before ((s superposition-with-background) target-info)
  (perform-draw-actions (background s) target-info))

(defmethod perform-draw-actions ((ss segment-set) target-info)
  (draw ss target-info))

(defmethod perform-draw-actions ((p polygon) target-info)
  (draw p target-info))

(defmethod perform-draw-actions ((rp raster-point) target-info)
  (draw rp target-info))

(defmethod perform-draw-actions ((rd raster-displacement) target-info)
  (draw rd target-info))

(defmethod perform-draw-actions ((r raster-constant) target-info)
  (draw r target-info))

(defmethod   perform-draw-actions   ((ur   uniform-raster-constant)
target-info)
  (draw ur target-info))

(defmethod   perform-draw-actions   ((pr   pattern-raster-constant)
target-info)
  (draw pr target-info))

(defmethod perform-draw-actions ((s->r segment->raster) target-info)
  (perform-draw-actions (segment-set s->r)
                        (raster-surface->scan-conversion-target
target-info)))

(defmethod perform-draw-actions ((s->r segment->raster-parameterized)
                                 target-info)
  (let ((target (raster-surface->scan-conversion-target target-info)))
    (perform-draw-actions (pen-pattern s->r) target)
    (perform-draw-actions (pen-size s->r) target)
    (perform-draw-actions (segment-set s->r) target)))
(defmethod perform-draw-actions ((pf polygon-finder) target-info)
  (cond ((null (cache pf))
         (reregister-polygon pf target-info))
        ((eq (cache pf) t)
         (setf (cache pf) (reregister-polygon pf target-info)))
        (t
         (perform-draw-actions (cache pf) target-info))))
```

```
(defmethod reregister-polygon ((pf polygon-finder) target-info)
  (let ((target (make-instance 'polygon-finder-target)))
    (perform-draw-actions (interior-point pf) target)
    (perform-draw-actions (segment-set pf) target)
    (perform-draw-actions (polygon-set target) target-info)
    (polygon-set target)))

(defmethod perform-draw-actions ((clipper raster-clipper) target-info)
  (let ((clip-polygon (make-polygon-clip-region-target target-info)))
    (perform-draw-actions (clip-polygon clipper) clip-polygon)
    (perform-draw-actions (source-raster clipper)
                          (new-clip-region target-info
                                           (first (region clip-polygon))))))

(defmethod perform-draw-actions ((tr translation) target-info)
  (let ((displacement (make-instance 'point-target)))
    (perform-draw-actions (displacement tr) displacement)
    (perform-draw-actions (input tr)
                          (new-displacement-xy target-info
                                               (x displacement)
                                               (y displacement)))))

(defmethod perform-draw-actions ((tr coordinate-transformer) target-info)
  (perform-draw-actions (input tr)
                        (new-transformation target-info
                                            (transformation tr))))

;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;;;
;;;; Capture-appearance
;;;; This facility allows editor-operations to capture the output of any
;;;; graphic-operator as a constant of the appropriate type.
;;;;
;;;; [] Requires that size of grafport either be specified by user or
;;;;    deduced from the sizes of the sources.

(defmethod capture-appearance ((op superposition))
  (capture-raster-appearance op))

(defmethod capture-appearance ((op segment->raster))
  (capture-raster-appearance op))
```

```
(defmethod capture-appearance ((op raster-clipper))
   (capture-raster-appearance op))

(defmethod capture-appearance ((op raster-constant))
   op)

(defmethod capture-appearance ((op uniform-raster-constant))
   op)

(defun capture-raster-appearance (op width height &key transparentp)
   (let* ((offscreen-grafport (make-offscreen-grafport width height))
          (target (make-raster-surface-target
                      offscreen-grafport
                      (rect->region (bitmap-bounds (port-bits offscreen-grafport))
                                    offscreen-grafport))))
      (perform-draw-actions op target)
      (make-raster-constant (port-bits offscreen-grafport)
                     :transparentp transparentp
                     :name "User Defined")))

(defmethod capture-appearance ((op segment-set))
   (capture-segment-set-appearance op))

(defun capture-segment-set-appearance (op)
   (declare (ignore op))
   ())

;;; -*- Package: Y3 -*-
(in-package 'Y3)

;;;;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;;; Intermediate-graphics.lisp
;;;;   This is the language that implements the user-level graphics language;
;;;;   it is still higher-level than Quickdraw itself.
;;;;
;;;;   Note: our use of Quickdraw makes extensive use of the convention that all
;;;;   grafports have their upper-left corner at the origin of the coordinate
;;;;   system; changes of coordinate system are maintained by our code.
```

```
;;;;;;;;;;;;;;;;;;;;;;;;;;;;;;;;;;;;;;;;;;;;;;;;;;;;;;;;;;;;;;;;;;;;;;;;;;;;;;;
;;;;;;;;;;;;;;
;;;; Raster-surface targets (defclass raster-surface-target ()
  ((grafport :accessor grafport
             :initarg :grafport)
   (clip-region :accessor clip-region
                :initarg :clip-region)
   (transformation :accessor transformation
                   :initarg :transformation
                   :initform *identity-transformation*)
   (x-offset :accessor x-offset
             :initarg :x-offset
             :initform 0)
   (y-offset :accessor y-offset
             :initarg :y-offset
             :initform 0)))

(defun make-raster-surface-target (grafport view-region)
  (make-instance 'raster-surface-target
                 :grafport grafport
                 :clip-region view-region))

;;; Creates a new raster-surface-target whose clip-region is the intersection
;;; of a given raster-surfaces-target's clip-region with a newly supplied
;;; region.
;;; [] The function region-intersection implicitly creates a new region, whose
;;;     storage we will want to reclaim someday.
(defmethod new-clip-region ((r raster-surface-target) new-region)
  (make-instance 'raster-surface-target
                 :grafport (grafport r)
                 :clip-region (region-intersection (clip-region r)
                                                   new-region)
                 :x-offset (x-offset r)
                 :y-offset (y-offset r)))

(defmethod new-displacement-xy ((r raster-surface-target)
                                new-x-offset
                                new-y-offset)
  (make-instance 'raster-surface-target
                 :grafport (grafport r)
```

```
                       :clip-region (clip-region r)
                                  #|(make-offset-region (clip-region r)
                                                         new-x-offset
                                                         new-y-offset)|#
                       :x-offset (+ (x-offset r) new-x-offset)
                       :y-offset (+ (y-offset r) new-y-offset)))

(defmethod new-transformation ((r raster-surface-target)
                                     (tr coordinate-transformation))
        (make-instance 'raster-surface-target
                       :grafport (grafport r)
                       :clip-region (clip-region r)
                       :x-offset (x-offset r)
                       :y-offset (y-offset r)
                       :transformation (compose (transformation r) tr)))

      (defmethod draw ((raster uniform-raster-constant)
                       (target raster-surface-target))
        (with-slots (color-pixel) raster
          (with-slots (grafport clip-region) target
            (ccl:with-port grafport
               (ccl::copy-bits color-pixel (port-bits grafport)
                               (bitmap-bounds  color-pixel)    (port-rect
   grafport)
                               :srcCopy
                               clip-region)))))

      (defmethod draw ((raster pattern-raster-constant)
                       (target raster-surface-target))
        (with-slots (patno) raster
          (with-slots (grafport clip-region) target
            (ccl:with-port grafport
               (ccl:rlet ((pat :pattern))
                 (ccl:get-ind-pattern patno pat)
                 (ccl:_PenNormal)
                 (ccl:_FillRgn :ptr clip-region
                               :ptr pat
                               :novalue))))))

(defmethod draw ((raster raster-constant) (target raster-surface-t-
   arget))
        (with-slots ((source-grafport grafport) mask) raster
          (with-slots ((target-grafport grafport) clip-region) target
           (let* ((source-bits (port-bits source-grafport))
                  (source-rect (bitmap-bounds source-bits))
```

```
              (mask-bits (port-bits mask))
              (target-bits (port-bits target-grafport)))
         (ccl:with-port target-grafport
           #|(with-offset-region (new-clip (clip-region target)
                                           (x-offset target)
                                           (y-offset target))|#
             (with-clip-region (clip-region target) #|new-clip|#
               (with-translated-rect (translated-rect source-rect
                                                      (x-offset target)
                                                      (y-offset target))
                 (ccl:_CopyMask :ptr source-bits
                                :ptr mask-bits
                                :ptr target-bits
                                :ptr source-rect
                                :ptr source-rect
                                :ptr translated-rect
                                :novalue)))))))

;;;;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;;; Scan-conversion targets ;;; This is just a subclass of raster surface targets used by
;;; segment->raster to pass the raster surface target down to
;;; a segment set to draw on.  This way segment sets can be
;;; prevented from drawing directly on raster surface targets.
;;; Also, we can specify a pen-width for the raster surface
;;; conversion.
(defclass scan-conversion-target (raster-surface-target)
  ((pen-pattern :type integer :accessor pen-pattern
                :initarg :pen-pattern :initform ccl:sysBlackPatID)
   (pen-width :type integer :accessor pen-width
              :initarg :pen-width :initform '1)
   (pen-height :type integer :accessor pen-height
               :initarg :pen-height :initform '1))
  )
;;; make a scan-conversion-target that wraps a segment surface
;;; target
(defmethod raster-surface->scan-conversion-target ((tar raster-sur-
face-target)
                                                    &optional
                                                    (pen-pattern
                                                    ccl:sysBlackPatID)
                                                    (pen-width 1)
                                                    (pen-height 1))
```

```
            (make-instance 'scan-conversion-target
                        :grafport (grafport tar)
                        :clip-region (clip-region tar)
                        :transformation (transformation tar)
                        :x-offset (x-offset tar)
                        :y-offset (y-offset tar)
                        :pen-pattern pen-pattern
                        :pen-width pen-width
                        :pen-height pen-height))

       ;;; translate a scan-conversion-target
        (defmethod new-displacement-xy ((sct scan-conversion-target)
                                    new-x-offset
                                    new-y-offset)
            (make-instance 'scan-conversion-target
                        :grafport (grafport sct)
                        :clip-region (clip-region sct)
                                #|(make-offset-region (clip-region sct)
                                                   new-x-offset
                                                   new-y-offset)|#
                        :x-offset (+ (x-offset sct) new-x-offset)
                        :y-offset (+ (y-offset sct) new-y-offset)
                        :pen-pattern (pen-pattern sct)
                        :pen-width (pen-width sct)
                        :pen-height (pen-height sct)))

       ;;; points draw into scan-conversion targets by setting their pen
        ;;; width and pen height
        (defmethod draw ((rp raster-point) (sct scan-conversion-target))
          (setf (pen-width sct) (x rp)
                (pen-height sct) (y rp)))

       ;;; patterns draw into scan-conversion targets by setting their
        ;;; pen pattern.
        (defmethod draw ((rp pattern-raster-constant) (sct scan-conversion-
        -target))
          (setf (pen-pattern sct) (patno rp)))

       ;;; [] Unlike draw-methods whose source and target are both
        ;;; within the raster surface model, those whose source lies in the
        ;;; segment surface model can undergo arbitrary affine
        ;;; transformations. So we should really be using the call
        ;;; (transform-coordinates td x0 y0) here somewhere.
        (defmethod draw ((ss segment-set) (target scan-conversion-target))
          (let ((xoff (x-offset target))
```

```
                                 (yoff (y-offset target))))
              (flat-map #'(lambda (segment)
                            (with-slots (end0 end1) segment
                              (with-slots ((x0 x) (y0 y)) end0
                                (with-slots ((x1 x) (y1 y)) end1
                                  (multiple-value-bind (raster-x0 raster-y0)
                                                       (values (floor (+ x0
xoff))
                                                               (floor (+ y0
yoff)))
                                    (multiple-value-bind (raster-x1 raster-y1)
                                                         (values (floor (+ x1
xoff))
                                                                 (floor (+ y1
yoff)))
                                      (rlet ((pat :pattern))
                                        (ccl:get-ind-pattern    (pen-pattern
target) pat)
                                        (draw-segment-xy-size-pattern
                                         (grafport target)
                                         (clip-region target)
                                         raster-x0 raster-y0
                                         raster-x1 raster-y1
                                         (pen-width target) (pen-height target)
                                         pat))))))))
                        ss)))

;;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;;; Polygon-region targets ;;; [] gross hack to allow region to be side effected
(defclass polygon-clip-region-target ()
  ((grafport :initarg :grafport :reader grafport)
   (region :accessor region :initform (list nil) :initarg :region)
   (x-offset :accessor x-offset :initform 0 :initarg :x-offset)
   (y-offset :accessor y-offset :initform 0 :initarg :y-offset)))

(defmethod make-polygon-clip-region-target ((rt raster-surface-tar-
get))
  (make-instance 'polygon-clip-region-target
                 :grafport (grafport rt)
                 :x-offset (x-offset rt)
                 :y-offset (y-offset rt)))
```

```
(defmethod new-displacement-xy ((pct polygon-clip-region-target)
                                new-x-offset
                                new-y-offset)
  (make-instance 'polygon-clip-region-target
                 :grafport (grafport pct)
                 :region (region pct)
                 :x-offset (+ (x-offset pct) new-x-offset)
                 :y-offset (+ (y-offset pct) new-y-offset)))

;;; [] This allocates a region, which should be de-allocated sometime.
(defmethod draw ((source segment-set) (target polygon-clip-region--
target))
  (let* ((mac-polygon (build-polygon-with-offset source
                                                 (x-offset target)
                                                 (y-offset target)
                                                 (grafport target))))
    (setf (first (region target))
          (polygon->region mac-polygon (grafport target)))
    (ccl:_KillPoly :ptr mac-polygon
                   :novalue)))

;;; [] The invocations of "floor" should really be invocations of the
;;;    full-blown coordinate transformations.
(defmethod build-polygon-with-offset ((polygon polygon) x-offset
y-offset port)
  (ccl:with-port port
    (let ((poly-handle (ccl:_OpenPoly :ptr)))
      (with-slots (vertices) polygon
        (ccl:_MoveTo :word (floor (x (car (last vertices))))
                     :word (floor (y (car (last vertices))))
                     :novalue)
        (dolist (v vertices)
          (ccl:_LineTo :word (floor (x v))
                       :word (floor (y v))
                       :novalue))
        (ccl:_ClosePgon))
      (ccl:_OffsetPoly :ptr poly-handle
                       :word x-offset
                       :word y-offset
                       :novalue)
      poly-handle)))

;;; Here's a version for segment sets; you'd better have a
;;; polygon in the segment set or you will get something quite
;;; wierd!
```

```
        (defmethod build-polygon-with-offset ((polygon segment-set)
                                              x-offset y-offset port)
          (let ((segs nil))
            ;; accumulate the segments as pairs of points
            (flat-map #'(lambda (s) (push (list (end0 s) (end1 s)) segs))
         polygon)
            ;; order them in polygon order
            (do ((osegs (list (first segs)))
                 (isegs (copy-list (rest segs))))
                ((null isegs)
                 (unless (point= (second (first osegs)) (first (first segs)))
                   (error "Segment set not a polygon."))
                 (setf segs (nreverse osegs)))
              (let* ((vert (second (first osegs)))
                     (next (find-if #'(lambda (seg)
                                        (or (point= vert (first seg))
                                            (point= vert (second seg))))
                                    isegs)))
                (unless next (error "Segment set not a polygon."))
                (setf isegs (delete next isegs))
                (if (point= vert (first next))
                    (push next osegs)
                  (push (nreverse next) osegs))))
            ;; read them off into a polygon
            (ccl:with-port port
              (let ((poly-handle (ccl:_OpenPoly :ptr)))
                (ccl:_MoveTo :word (floor (x (first (first segs))))
                             :word (floor (y (first (first segs))))
                             :novalue)
                (dolist (seg segs)
                  (ccl:_LineTo :word (floor (x (second seg)))
                               :word (floor (y (second seg)))
                               :novalue))
                (ccl:_ClosePgon)
                (ccl:_OffsetPoly :ptr poly-handle
                                 :word x-offset
                                 :word y-offset
                                 :novalue)
                poly-handle))))

        ;;;;;;;;;;;;;;;;;;;;;;;;;;;;;;;;;;;;;;;;;;;;;;;;;;;;;;;;;;;;;;;;;;;;;-
        ;;;;;;;;;;;;;
        ;;;; Point Targets ;;; these just take a point as two coordinates
```

```
(defclass point-target ()
  ((x :accessor x :initarg x)
   (y :accessor y :initarg y)))

;;; draw a raster point into a point target (ha, ha)
(defmethod draw ((rp raster-point) (pt point-target))
  (setf (x pt) (x rp) (y pt) (y rp)))

;;; draw a raster displacement into a point target (ha, ha)
(defmethod draw ((rd raster-displacement) (pt point-target))
  (setf (x pt) (x rd) (y pt) (y rd)))

;;; displace a point target
(defmethod new-displacement-xy ((pt point-target) xoffset yoffset)
  (incf (x pt) xoffset)
  (incf (y pt) yoffset))

;;;;;;;;;;;;;;;;;;;;;;;;;;;;;;;;;;;;;;;;;;;;;;;;;;;;;;;;;;;;;;;;;;;;;;;;;;-
;;;;;;;;;;;;;
;;;; Pattern Targets ;;; these just take a pattern as a pattern number
(defclass pattern-target ()
  ((patno :accessor patno)))

;;; draw a background pattern into a patter target (ha, ha)
(defmethod draw ((prc pattern-raster-constant) (pt pattern-target))
  (setf (patno pt) (patno prc)))

;;;;;;;;;;;;;;;;;;;;;;;;;;;;;;;;;;;;;;;;;;;;;;;;;;;;;;;;;;;;;;;;;;;;;;;;;;-
;;;;;;;;;;;;;
;;;; Find-polygon targets ;;; these collect the point and the segments from their args
(defclass polygon-finder-target ()
  ((point :accessor point)
   (polygon-set :accessor polygon-set)))

;;; points just record themselves in the target
(defmethod draw ((rp raster-point) (pft polygon-finder-target))
  (setf (point pft) (make-point (x rp) (y rp))))

;;; segments find their polygon and put it into the target
(defmethod draw ((ss segment-set) (pft polygon-finder-target))
  (let* ((minced (y3::mince ss))
```

```
              (polygon (y3::find-enclosing-polygon (point pft) minced))
              (polygon-set (make-segment-set nil)))
          (unless polygon
            (error "No polygon found in segment set~%~S~%to enclose point
   ~s."
                   (->expression ss)
                   (->expression (point pft))))
          (when polygon
            (flat-map #'(lambda (segment)
                          (add-to-segment-set segment polygon-set))
                      polygon))
          (setf (polygon-set pft) polygon-set)))

#|
    ;;; ;;;;;;;;;;;;;;;;;;;;;;;;;;;;;;;;;;;;;;;;;;;;;;;;;;;;;;;;;;;;;;;;-
    ;;;;;;;;;;;;;;;
    ;;; Draw-segment-xy
    ;;;  Marks the scan-conversion of the specified segment black, and
    extends
    ;;; the mask by just those points.
    ;;; [] For YIII, factor this into separate draw-methods.
    (defmethod draw-segment-xy ((r raster-appearance)
                                x0 y0
                                x1 y1)
      (with-slots (grafport mask) r
        (ccl:with-port grafport
          (ccl::_PenNormal)
          (ccl::_MoveTo :word x0 :word y0)
          (ccl::_LineTo :word x1 :word y1))
        (ccl:with-port mask
          (ccl::_PenNormal)
          (ccl::_MoveTo :word x0 :word y0)
          (ccl::_LineTo :word x1 :word y1))))

;;; This exists to support use of cached grafports: it takes its
    source
    ;;; material from a random grafport rather than from some Yetidor data
    ;;; structure.
    (defun draw-from-grafport (grafport draw-spec)
      (with-slots (target region) draw-spec
        (ccl:with-port target
          (ccl::copy-bits (port-bits grafport)
                          (port-bits target)
                          (bitmap-bounds (port-bits grafport))
                          (bitmap-bounds (port-bits grafport))))))
```

```
;;;;;;;;;;;;;;;;;;;;;;;;;;;;;;;;;;;;;;;;;;;;;;;;;;;;;;;;;;;;;;;;;;;;;;;;;;-
;;;;;;;;;;;;;
;;; Translating-raster dynamics
;;;  This class provides the simplest kind of viewport transform.  It presents
;;;  a raster from another image at the same scale, but possibly translated,
;;;  in the target figure.
(defclass translating-raster (graphic-operator)
    ((x-offset :accessor x-offset
               :initarg :x-offset
               :initform 0)
     (y-offset :accessor y-offset
               :initarg :y-offset
               :initform 0)))

(defmethod execute ((tr translating-raster))
   (with-slots (source target x-offset y-offset) tr
      (let ((source-raster (appearance source))
            (dest-raster (appearance target)))
         (transfer-raster-offset  source-raster  dest-raster  x-offset y-offset))))

(defmethod ->expression ((tr translating-raster))
   (with-slots (source x-offset y-offset) tr
      '(translating-raster :source ,(->expression source)
                           :offset (,x-offset ,y-offset))))

(defmethod target->source-coords ((tr translating-raster) x y)
   (with-slots (x-offset y-offset) tr
      (values (- x x-offset)
              (- y y-offset))))

(defmethod source->target-coords ((tr translating-raster) x y)
   (with-slots (x-offset y-offset) tr
      (values (+ x x-offset)
              (+ y y-offset))))

;;;;;;;;;;;;;;;;;;;;;;;;;;;;;;;;;;;;;;;;;;;;;;;;;;;;;;;;;;;;;;;;;;;;;;;;;;-
;;;;;;;;;;;;;
;;; Translating-segments dynamics
;;;  This class provides the ability to move the image of a given segment-
;;;  set figure around in the coordinate system of the target figure.
(defclass translating-segment-set (derived)
```

```
            ((x-offset :accessor x-offset
                       :initarg :x-offset
                       :initform 0)
             (y-offset :accessor y-offset
                       :initarg :y-offset
                       :initform 0)))

(defmethod execute ((tr translating-segment-set))
          (with-slots (source target x-offset y-offset) tr
            (let ((source-segment-set (appearance source)))
              (setf (appearance target) (translate source-segment-set
                                                    (make-displacement-xy
    x-offset y-offset))))))

      ;;;;;;;;;;;;;;;;;;;;;;;;;;;;;;;;;;;;;;;;;;;;;;;;;;;;;;;;;;;;;;;;-
      ;;;;;;;;;;;;;
      ;;;; Temporary stuff for polygonal portholes.
      ;;;;   Polygons as defined here don't really make for appearances,
      since the
      ;;;;   superposition of polygons is not a polygon.

(defmethod fill-polygon-on-grafport-with-offset ((polygon polygon)
        grafport
                                                           x-offset y-offset)
          (ccl:with-port grafport
            (let ((poly-handle
                   (build-polygon-with-offset polygon x-offset y-offset)))
              (ccl:_FillPoly :ptr poly-handle
                             :ptr ccl:*black-pattern*)
              (ccl:_KillPoly :ptr poly-handle))))

      ;;;;;;;;;;;;;;;;;;;;;;;;;;;;;;;;;;;;;;;;;;;;;;;;;;;;;;;;;;;;;;;;-
      ;;;;;;;;;;;;
      ;;; Translating-polygon dynamics.
      ;;;   [] obsolete: originally written for first sliding-polygonal-p-
      orthole demo.

        (defclass translating-polygon (derived)
          ((x-offset :accessor x-offset :initarg :x-offset :initform 0)
           (y-offset :accessor y-offset :initarg :y-offset :initform 0)))
```

```
(defmethod execute ((tr translating-polygon))
  (with-slots (source target x-offset y-offset) tr
    (setf (appearance target) (translate-polygon-xy (appearance source)
                                                    x-offset
                                                    y-offset))))

|#

;;; -*- mode:lisp; package:y3ui -*-
;;; Copyright (c) 1989 by the Xerox Corporation.  All rights reserved.

;;;; Views of Graphs for the Yetidor III User Interface.

(in-package 'y3ui)

;;;;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;;
;;;; Views
;;;
;;; A view of a y-graph is a window which renders the graph by
;;; rendering nodes with icons and edges with lines.  The y-graph
;;; can be edited by operating on its depiction in the view.

;;; Views keep their nodes and edges in lists, which means that
;;; graph operations involve a lot of list searching, although we at
;;; least have nodes keep track of their edges.  Each view keeps a
;;; selection (a list of nodes that are selected) and an extent (the
;;; rectangle which contains all its nodes and edges).
;;;
;;; [] Views should really be scrollable windows
(defclass view (viewer heap-user)
  ((vnodes :type list :accessor view-nodes :initform '())
   (vedges :type list :accessor view-edges :initform '())
   (selection :type list :accessor view-selection :initform '())
   (extent :accessor view-extent)                           ;a rect
   )
  (:metaclass matched-object-class))

;;; the extent of a view is a persistent object
(defmethod allocate-heap ((v view) &rest initargs)
  (setf (view-extent v) (make-record :rect)))

;;; each view's extent starts out empty
```

```
    (defmethod initialize-heap ((v view) &rest initargs)
      (let ((rect (view-extent v)))
        (unless (zone-pointerp rect)
          (error "Extent of view is not a rect!"))
        (set-rect (view-extent v) 0 0 0 0)))

;;; view objects only belong to one view, so they go away when
    ;;; the view does.
    (defmethod finalize-instance ((v view) &rest finargs)
      (mapc #'finalize-instance (view-nodes v))
      (mapc #'finalize-instance (view-edges v))
      (call-next-method))

(defmethod dispose-heap ((v view) &rest finargs)
      (when (and (slot-boundp v 'extent)
                 (zone-pointerp (view-extent v)))
        (dispose-record (view-extent v) :rect)
        (setf (slot-value v 'extent) nil)))

;;; views are drawn by drawing their v-objects in their window.
    ;;; Nodes are always drawn after edges so they cover them.  The
    ;;; act of drawing should update the extent of the window.  Nodes
    ;;; are drawn from back to front so they select properly.
    (defmethod window-draw-contents ((v view))
      (erase-window v)
      (unless (zone-pointerp (view-extent v))
        (error "Extent of view is not a rect!"))
      (set-rect (view-extent v) 0 0 0 0)
      (flet ((drawfn (obj) (draw obj v)))
        (mapc #'drawfn (view-edges v))
        (mapc #'drawfn (reverse (view-nodes v)))))

;;;;;;;;;;;;;;;;;;;;;;;;;;;;;;;;;;;;;;;;;;;;;;;;;;;;;;;;;;;;;;;;;;;;;;;;;-
    ;;;;;;;;;;;;;
    ;;;; View Objects
    ;;;
    ;;; View objects are things which can be drawn and selected.
    ;;; Thus they all have an extent and a selection state.  They
    ;;; point back to their view (only one view) so they can always
    ;;; have a grafport in which to calculate their extents and so
    ;;; they can get info about the view if they need it.

;;; The possible selection states^A
    (defparameter *selection-states*
      '(:unselected :selected :primary))
```

```
;;; Pen widths for selected objects
(defparameter *selected-pen*
  2)

;;; The basic view object
(defclass view-object (heap-user)
  ((extent :reader vobj-extent)                              ;a region
   (state :reader vobj-state :initform ':unselected)         ;a keyword
   (view :reader vobj-view :initarg :view)
   ))

;;; The extent of a view object is a region, so we have to
;;; allocate it.
(defmethod allocate-heap ((vo view-object) &rest initargs)
  (setf (slot-value vo 'extent) (new-region)))
(defmethod dispose-heap ((vo view-object) &rest finargs)
  (when (and (slot-boundp vo 'extent) (handlep (slot-value vo
'extent)))
    (dispose-region (slot-value vo 'extent))
    (setf (slot-value vo 'extent) nil)))

;;; We check to see if we've hit a view object by seeing if the
;;; position is in its extent.
(defmethod hit? ((vo view-object) position)
  (point-in-region-p (vobj-extent vo) position))

;;; Selection manipulation
(defmethod selected? ((vo view-object))
  (not (eq (vobj-state vo) :unselected)))
(defmethod primary? ((vo view-object))
  (eq (vobj-state vo) :primary))
(defmethod make-selected ((vo view-object) &optional (select? t))
  (if select?
      (setf (slot-value vo 'state) :selected)
      (setf (slot-value vo 'state) :unselected)))
(defmethod make-primary ((vo view-object))
  (setf (slot-value vo 'state) :primary))

;;; every time we draw an item in a view, we have to update its
;;; extent appropriately
(defmethod draw ((vo view-object) (v view))
  (let* ((v-extent (view-extent v))
         (o-extent (vobj-extent vo)))
    (rlet ((o-rect :rect))
      (union-rect v-extent o-rect v-extent))))
```

```
;;;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;
;;;; View Nodes
;;;
;;; View nodes depict y-nodes. Graphically they are shown as
;;; icons (at standard size). When they're in the selection they're
;;; framed, and when they're the primary selection they're inverted.

;;; view nodes keep track of their position (upper-left corner),
;;; center, depicted ynode and its type, their icon, and their
;;; edges.  View nodes can have names for user interface ease,
;;; and they keep track of any editor open on the node.
(defclass view-node (view-object)
    ((position :reader vnode-position :initform #@(0 0))      ;a point
     (center :reader vnode-center)                             ;a point
     (ynode :accessor vnode-ynode :initarg :ynode)             ;a ynode
     (type :type signature :accessor vnode-type :initarg :type)
     (icon :accessor vnode-icon)                               ;a resource
handle
     (edges :type list :accessor vnode-edges :initform '())
     (name :type (or char null)
            :accessor vnode-name :initarg :name :initform nil)
     (editor #|:type viewer|# :accessor vnode-editor :initform nil)
     ))

;;; nodes are named with characters
(defparameter *node-names*
    (coerce    "ABCDEFGHIJKLMNOPQRSTUVWXYZabcdefghijklmnopqrstuvwzyz"
'list))

;;; nodes are printed according to type, name, and position
(defmethod print-object ((n view-node) s)
    (format s "#<~S ~@[~A ~]~S ~D>"
              (class-name (class-of n))
              (vnode-name n)
              (real-name (vnode-type n))
              (vnode-position n)
              (%ptr-to-int n)))
;;; icon parameters, used for drawing
(defparameter *node-width* 32)
(defparameter *half-node-width* 16)
(defparameter *node-height* 32)
(defparameter *half-node-height* 16)
(defparameter *node-width-height* (make-point 32 32))
(defparameter *half-node-width-height* (make-point 16 16))
```

```
;;; the closest two nodes can be and have a visible edge between
;;; them
(defparameter *node-separation* 8)

;;; setting a node's position also sets its center and extent and
;;; updates the position of its edges.
(defmethod (setf vnode-position) (new-posn (vn view-node))
  (setf (slot-value vn 'position) new-posn)
  (rlet ((r :rect))
    (rset r :rect.topleft new-posn)
    (rset r :rect.bottomright (add-points new-posn *node-width-height*))
    (set-rect-region (vobj-extent vn) r))
  (setf (slot-value vn 'center)
        (add-points (vnode-position vn) *half-node-width-height*))
  (dolist (e (vnode-edges vn))
    (update-endpoints e)))

;;; you can specify the position and type of a node when you
;;; initialize it
(defmethod initialize-instance ((vn view-node)
                                &rest initargs
                                &key (position nil pos-given?))
  (call-next-method)
  (when pos-given?
    (setf (vnode-position vn) position))
  (when (label? (vnode-type vn))
    (setf (vnode-name vn)
          (or (vnode-name vn)
              (flet ((used? (char) (find char (view-nodes (vobj-view vn))
                                         :key #'vnode-name)))
                (or (find-if-not #'used? *node-names*)
                    (error "All the node names have been used."))))))
  (setf (vnode-icon vn)
        (or (ccl:get-icon (icon (vnode-type vn)) t)
            (progn
              (cerror "Use a distinctive icon in its place."
                      "The icon for ~A nodes is not available."
                      (user-name (vnode-type vn)))
              (ccl:get-icon 0)))))

;;; when nodes are finalized, so are their ygraph nodes
(defmethod finalize-instance ((vn view-node) &rest finargs)
  (call-next-method)
```

```
             (when (slot-boundp vn 'ynode)
                (finalize-instance (vnode-ynode vn))))

;;; nodes are drawn onto views by plotting their icon, and making
         ;;; sure that the view's extent is updated.
         (defmethod draw ((n view-node) (v view))
           (call-next-method);update extents
           (with-slots (position icon state) n
              (rlet ((pr :rect))
                 (with-dereferenced-handles ((extent (vobj-extent n)))
                    (copy-record (rref extent :region.rgnBBox :storage :pointer)
         :rect pr))
                 (erase-rect v pr)
                 (with-port (window-record v)
                    (ccl:_PlotIcon :ptr pr :ptr icon :novalue)
                    (when (vnode-name n)
                       (center-char (vnode-name n) (vnode-center n))))
                 (when (selected? n)
                    (with-pen-size (v *selected-pen*) (frame-rect v pr))))))

;;; nodes add and remove edges easily
         (defmethod node-add-edge ((n view-node) e)
            (push e (vnode-edges n)))
         (defmethod node-remove-edge ((n view-node) e)
            (setf (vnode-edges n) (delete e (vnode-edges n))))

;;; return the parents of a node
         (defmethod parents ((n view-node))
            (mapcan #'(lambda (e) (and (eq (vedge-to e) n) (list (vedge-from
         e))))
                   (vnode-edges n)))

;;; return the children of a node
         (defmethod children ((n view-node))
            (mapcan #'(lambda (e) (and (eq (vedge-from e) n) (list (vedge-to
         e))))
                   (vnode-edges n)))
```

```
;;;; Edges

;;; View edges connect two view nodes, and are drawn from the
;;; center of one to the center of the other.  They keep track of
;;; the ygraph port information that connects the yimages of
;;; their two vnodes.  They also cache their endpoints and
;;; extent.
(defclass view-edge (view-object)
  ((from :reader vedge-from :type view-node)
   (to :reader vedge-to :type view-node)
   (yport :reader vedge-yport :initarg :yport)
   (from-point :reader vedge-from-point)
   (to-point :reader vedge-to-point))
)

;;; edges print according to their nodes
(defmethod print-object ((e view-edge) s)
  (format t "#<-S ~S ~S ~D>"
          (class-name (class-of e))
          (vedge-from e)
          (vedge-to e)
          (%ptr-to-int e)))

;;; connect an edge with two new nodes in a view.
(defmethod connect-edge ((e view-edge) (from view-node) (to view-node))
  (when (slot-boundp e 'from)
    (node-remove-edge (vedge-from e) e))
  (when (slot-boundp e 'to)
    (node-remove-edge (vedge-to e)))
  (setf (slot-value e 'from) from
        (slot-value e 'to) to)
  (node-add-edge from e)
  (node-add-edge to e)
  (update-endpoints e))

;;; update the endpoints and extent of an edge without changing
;;; the nodes its connected to.
(defmethod update-endpoints ((e view-edge))
  (setf (slot-value e 'from-point) (vnode-center (vedge-from e))
        (slot-value e 'to-point) (vnode-center (vedge-to e)))
  ;; now to figure the extent, which will be a rectangle rotated so
  ;; it brackets the edge.  Its short sides will be centered on
```

```
;; the two endpoints of the edge, and its long sides will be parallel
;; to the edge. To figure out which way to offset the corners of
;; the rectangle from the endpoints of the edge, we notice that
;; the edge is either one diagonal of a rectangle or the other,
;; and we can figure out which by fitting it with a rectangle.
(multiple-value-bind (top-end bottom-end)
                    (if (< (point-v (vedge-from-point e))
                           (point-v (vedge-to-point e)))
                        (values (vedge-from-point e) (vedge-to--point e))
                        (values (vedge-to-point e) (vedge-from-point e)))
    (let ((width (* 2 *selected-pen*))
          offset1 offset2)
      (rlet ((line-rect :rect))
        (points-to-rect (vedge-from-point e) (vedge-to-point e) line-rect)
        (if (or (= (vedge-from-point e) (rref line-rect :rect.topleft))
                (= (vedge-from-point e) (rref line-rect :rect.bottomright)))
            ;;it's a top-left to bottom-right diagonal
            (setf offset1 (make-point (- width) width)
                  offset2 (make-point width (- width)))
            ;;it's a bottom-left to top-right diagonal
            (setf offset1 (make-point (- width) (- width))
                  offset2 (make-point width width))))
      (with-open-region ((vobj-view e) (vobj-extent e))
        (move-to (vobj-view e) (add-points top-end offset1))
        (line-to (vobj-view e) (add-points top-end offset2))
        (line-to (vobj-view e) (add-points bottom-end offset2))
        (line-to (vobj-view e) (add-points bottom-end offset1))
        (line-to (vobj-view e) (add-points top-end offset1))))))

;;; draw an edge onto a view
(defmethod draw ((e view-edge) (v view))
  (call-next-method) ;update extents
  (move-to v (vedge-from-point e))
  (with-pen-size (v (if (selected? e) *selected-pen* 1))
    (line-to v (vedge-to-point e))))

;;;;;;;;;;;;;;;;;;;;;;;;;;;;;;;;;;;;;;;;;;;;;;;;;;;;;;;;;;;;;;;;;;;;;;;;;;;;;;;;;;;;;;;
;;;; Editor Operations on Views
```

```
;;; Views, "viewed" as displaying source expressions in the
;;; y-language, contain a set of roots from which computation of the
;;; expression should start.  This returns an alist of root
;;; "labels" and the roots themselves.
(defmethod ygraph-roots ((v view))
  (do ((roots nil)
       (nodes (view-nodes v) (rest nodes)))
      ((null nodes)
       (nreverse roots))
    (when (typep (vnode-ynode (first nodes)) 'yl::raster-canvas)
      (push (vnode-ynode (first nodes)) roots))))

;;; make sure all the roots of the view are being edited
(defmethod edit-ygraph-roots ((v view))
  (do ((roots nil)
       (nodes (view-nodes v) (rest nodes)))
      ((null nodes)
       (nreverse roots))
    (let ((n (first nodes)))
      (when (typep (vnode-ynode n) 'yl::raster-canvas)
        (if (and (vnode-editor n) (window-record-boundp (vnode-editor n)))
            (progn
              (invalidate-window (vnode-editor n))
              (make-visible (vnode-editor n)))
            (setf (vnode-editor n)
                  (make-instance 'raster-canvas-viewer
                                 :editor (editor v)
                                 :raster-canvas (vnode-ynode n)
                                 :window-title
                                 (format nil "Viewer ~A"
                                         (or (vnode-name n) #\?)))))))))

;;; return all the ynodes in the view
(defmethod ygraph-nodes ((v view))
  (mapcan #'(lambda (n) (and (slot-boundp n 'ynode) (list (vnode-ynode n))))
          (view-nodes view)))

;;; find the vnode for a particular ynode
(defmethod ynode-vnode ((v view) ynode)
  (find ynode (view-nodes view)
        :key #'(lambda (n) (and (slot-boundp n 'ynode) (vnode-ynode n)))))
```

```
;;; can we edit the node in the selection?
(defmethod can-edit-selection ((v view))
   (and (= (length (view-selection v)) 1)
        (let ((ynode (vnode-ynode (first (view-selection v)))))
          (or (typep ynode 'yl::segment-set)
              (typep ynode 'yl::raster-point)
              (typep ynode 'yl::raster-displacement)
              (typep ynode 'yl::raster-constant)
              (typep ynode 'yl::pattern-raster-constant)
              ))))

;;; edit the source in the selection
(defmethod edit-selection ((v view))
   (unless (= 1 (length (view-selection v)))
     (op-cancel "There is more than one node in the selection."))
   (let* ((sel-node (first (view-selection v)))
          (sel-edit (vnode-editor sel-node))
          (sel-ynode (vnode-ynode sel-node)))
     (cond ((and sel-edit (window-record-boundp sel-edit))
            (window-select sel-edit))
           ((typep sel-ynode 'yl::segment-set)
            (setf (vnode-editor sel-node)
                  (edit-segment-set
                    (editor v) sel-ynode (vnode-name sel-node))))
           ((typep sel-ynode 'yl::raster-point)
            (setf (vnode-editor sel-node)
                  (edit-point
                    (editor v) sel-ynode (vnode-name sel-node))))
           ((typep sel-ynode 'yl::raster-displacement)
            (setf (vnode-editor sel-node)
                  (edit-displacement
                    (editor v) sel-ynode (vnode-name sel-node))))
           ((typep sel-ynode 'yl::raster-constant)
            (setf (vnode-editor sel-node)
                  (edit-raster
                    (editor v) sel-ynode (vnode-name sel-node))))
           ((typep sel-ynode 'yl::pattern-raster-constant)
            (setf (vnode-editor sel-node)
                  (edit-pattern
                    (editor v) sel-ynode (vnode-name sel-node))))
           (t
            (op-cancel "Sorry, can't edit ~A nodes."
                       (user-name (vnode-type sel-node)))))))

;;; squash the graph vertically as much as possible
```

```
     (defmethod squash-view ((v view))
       (let ((nodes (view-nodes v))
             (edges (view-edges v))
             (ntable (make-hash-table :test #'eq)))
         ;; start all nodes off at level 0, no children
         (dolist (n nodes)
           (setf (gethash n ntable) (list 0)))
         ;; now map through all the edges incrementing levels
         (labels ((set-level (node level)
                    (let ((info (gethash node ntable)))
                      (setf (first info) (max (first info) level))
                      (dolist (child (rest info))
                        (set-level child (1+ (first info)))))))
           (dolist (e edges)
             (let* ((parent (vedge-from e))
                    (parent-info (gethash parent ntable)))
               (push (vedge-to e) (rest parent-info))
               (set-level parent 0))))
         ;; now assign heights to nodes based on their level
         (dolist (n nodes)
           (setf (vnode-position n)
                 (make-point (point-h (vnode-position n))
                             (+ 2 (* (+ *node-height* *node-separation*)
                                     (first (gethash n ntable)))))))
         ;; now reassign edge positions
         (dolist (e edges)
           (update-endpoints e))
         ;; now redraw
         (invalidate-window v)))

    ;;;;;;;;;;;;;;;;;;;;;;;;;;;;;;;;;;;;;;;;;;;;;;;;;;;;;;;;;;;;;;;;;;;-
    ;;;;;;;;;;;;;
    ;;;; Operations on Extent Regions ;;; a wrapper for redrawing cumulatively that allows nesting
    (defmacro with-redraw-accumulation (window &body forms)
      (let ((outer? (gensym "DO-REDRAW-P-")))
        `(let* ((,outer? (open-redraw-region (window-record ,window))))
           (unwind-protect
               (progn ,@forms)
             (when ,outer? (close-redraw-region))))))
    ;;; invalidate regions immediately or cumulatively, allowing
    ;;; nesting of the cumulative setup
    (let ((redraw-region nil)
          (redraw-port nil))
```

```
(defun open-redraw-region (grafport)
  (cond ((not (zone-pointerp grafport))
         (error "Accumulating redraw to a non-port: ~S" grafport))
        ((null redraw-region)
         (setf redraw-region (new-region)
               redraw-port grafport))
        ((not (handlep redraw-region))
         (error "Accumulating redraw to a non-region: ~S"
                redraw-region))
        ((not (eq grafport redraw-port))
         (error "Accumulationg redraw to both port ~S and port ~S."
                redraw-port grafport))
        (t nil)))
(defun close-redraw-region ()
  (unless (and (handlep redraw-region) (zone-pointerp redraw-port))
    (error "Redraw-accumulated a non-region: ~S" redraw-region))
  (with-port redraw-port (ccl:_InvalRgn :ptr redraw-region
:novalue))
  (dispose-region redraw-region)
  (setf redraw-region nil redraw-port nil))
(defmethod redraw (rgn (v view))
  (let ((port (window-record v)))
    (cond ((not (handlep rgn))
           (error "Redrawing a non-region: ~S" rgn))
          ((not (zone-pointerp port))
           (error "Redrawing into a non-grafport: ~S" port))
          ((null redraw-region)
           (with-port port (ccl:_InvalRgn :ptr rgn :novalue)))
          ((not (handlep redraw-region))
           (error "Accumulating redraw to a non-region: ~S"
                  redraw-region))
          ((not (eq port redraw-port))
           (error "Accumulating redraw into port ~S but redrawing
port ~S."
                  redraw-port port))
          (t
           (union-region redraw-region rgn redraw-region))))
    rgn)
  ) ;let ;;; invalidate the extent of a view-object
(defmethod redraw ((vo view-object) (v view))
  (redraw (vobj-extent vo) v))

;;; add the extent of a node and some its edges to a region
```

```
(defmethod add-node-extent ((n view-node) region
                            &optional (edge-filter #'(lambda (e) t)))
  (unless (handlep region)
    (error "Non-region to add extent to: ~S" region))
  (flet ((add-one-extent (obj)
           (union-region region (vobj-extent obj) region)))
    (add-one-extent n)
    (mapc #'(lambda (e) (and (funcall edge-filter e) (add-one-extent e)))
          (vnode-edges n)))
  region)

;;; add the extent of the selection to a region
(defmethod add-selection-extent ((v view) region)
  (flet ((add-one-extent (node)
           (add-node-extent node region #'selected?)))
    (mapc #'add-one-extent (view-selection v)))
  region)

;;;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;;; Operations on Selections ;;; add a node to the selection or remove one
(defmethod view-select-node ((v view) (n view-node) &optional (select? t))
  (cond ((and select? (not (selected? n)))
         (make-selected n)
         (push n (view-selection v))
         (mapc #'maybe-select (vnode-edges n))
         (with-region extent
           (add-node-extent n extent #'selected?)
           (redraw extent v)))
        ((and (not select?) (selected? n))
         (make-selected n nil)
         (setf (view-selection v) (delete n (view-selection v)))
         (with-region extent
           (add-node-extent n extent #'selected?)
           (mapc #'(lambda (e) (make-selected e nil)) (vnode-edges n))
           (redraw extent v)))))

;;; select this edge if both its endpoints are selected
(defmethod maybe-select ((e view-edge))
  (make-selected e (and (selected? (vedge-from e))
                        (selected? (vedge-to e)))))
```

```
;;; clear the selection
(defmethod view-clear-selection ((v view))
  (with-region extent
    (dotimes (i (length (view-selection v)))
      (let ((n (pop (view-selection v))))
        (make-selected n nil)
        (add-node-extent n extent #'selected?)
        (mapc #'(lambda (e) (make-selected e nil)) (vnode-edges n))))
    (redraw extent v)))

;;; move all the selected nodes
(defmethod view-move-selection ((v view) offset)
  (with-redraw-accumulation v
    (dolist (n (view-selection v))
      (view-move-node v n (add-points (vnode-position n) offset)))))

;;; find the max the selection can move up and down before nodes
;;; start bumping against their children
(defmethod view-selection-bracket ((v view))
  (flet ((bracket-one (node)
           (let* ((top (point-v (vnode-position node)))
                  (bottom (+ top *node-height*))
                  (maxup nil)
                  (maxdown nil))
             (dolist (parent (remove-if #'selected? (parents node)))
               (let ((bot (+ (point-v (vnode-position parent))
                             *node-height*
                             *node-separation*)))
                 (cond ((null maxup) (setf maxup (- top bot)))
                       (t (setf maxup (min maxup (- top bot))))))) 
             (dolist (child (remove-if #'selected? (children node)))
               (let ((top (- (point-v (vnode-position child))
                             *node-separation*)))
                 (cond ((null maxdown) (setf maxdown (- top bottom)))
                       (t (setf maxdown (min maxdown (- top bottom)))))))
             (values maxup maxdown))))
    (let ((maxup nil)
          (maxdown nil))
      (dolist (node (view-selection v))
        (multiple-value-bind (nup ndown) (bracket-one node)
          (cond ((null nup))
                ((null maxup) (setf maxup nup))
                (t (setf maxup (min maxup nup))))
          (cond ((null ndown))
```

```
                           ((null maxdown) (setf maxdown ndown))
                           (t (setf maxdown (min maxdown ndown))))))
                 (values maxup maxdown))))

;;; select all the nodes
        (defmethod select-all ((v view))
          (with-redraw-accumulation v
            (mapc #'(lambda (n) (view-select-node v n t)) (view-nodes v))))

;;; see if there is a selection to describe
        (defmethod can-describe-selection ((v view))
          (view-selection v))

;;; describe the selection
        (defmethod describe-selection ((v view))
          (mapc    #'(lambda    (n)    (print-description    (yl::->expression
        (vnode-ynode n))))
               (view-selection v)))

;;;;;;;;;;;;;;;;;;;;;;;;;;;;;;;;;;;;;;;;;;;;;;;;;;;;;;;;;;;;;;;;;;;;;-
        ;;;;;;;;;;;;;;
        ;;;; Graph Operations on Views ;;; are these two nodes connected?  if so, return the edge that
        ;;; connects them.
        (defmethod connected? ((n1 view-node) (n2 view-node))
          (dolist (e (vnode-edges n1) nil)
            (when (member e (vnode-edges n2))
              (return e))))

        ;;; does this edge connect with this node?
        (defmethod connected? ((e view-edge) (n view-node))
          (member e (vnode-edges n)))
        (defmethod connected? ((n view-node) (e view-edge))
          (member e (vnode-edges n)))
        ;;; add a node to the front of a view, return the node
        (defmethod view-add-node ((v view) posn)
          (let ((type (select-node-type "Type for this node:")))
            (op-prompt "~&Adding a ~A node..." (user-name type))
            (let* ((ynode (make-instance (real-name type)))
                   (vnode (make-instance 'view-node
                                         :position posn
                                         :type type
                                         :ynode ynode
                                         :view v)))
```

```
            (push vnode (view-nodes v))
            (redraw vnode v)
            (op-prompt "done.")
            vnode)))

       ;;; delete a node and any edges
        (defmethod view-delete-node ((v view) (n view-node))
          (with-redraw-accumulation v
            (mapc #'(lambda (e) (view-delete-edge v e)) (vnode-edges n))
            (op-prompt "~&Removing a ~A node..." (user-name (vnode-type n)))
            (when (vnode-editor n)
              (when (window-record-boundp (vnode-editor n))
                (window-close (vnode-editor n)))
              (setf (vnode-editor n) nil))
            (view-select-node v n nil)
            (setf (view-nodes v) (delete n (view-nodes v)))
            (redraw n v))
          (op-prompt "done.")
          (finalize-instance n))

;;; add an edge between two nodes in a view, return the edge
        (defmethod  view-add-edge  ((v  view)  (parent  view-node)  (child
        view-node))
          (let* ((pspec (or (select-port (vnode-ynode parent)
                                         (vnode-ynode child))
                            (op-cancel "~|No edge can be drawn between~@
                                        that ~A node and~@
                                        that ~A node."
                                       (user-name (vnode-type parent))
                                       (user-name (vnode-type child)))))
                 (edge (make-instance 'view-edge :view v :yport pspec)))
            (op-prompt "~&Adding an edge between nodes:~@
                        parent: ~A (port ~A),~%child: ~A..."
                       (user-name (vnode-type parent))
                       (user-name (signature pspec))
                       (user-name (vnode-type child)))
            (ygraph-add-edge (vnode-ynode parent)
                             (vnode-ynode child)
                             pspec)
            (connect-edge edge parent child)
            (push edge (view-edges v))
            (maybe-select edge)
            (redraw edge v)
            (op-prompt "done.")
            edge))
```

```
     ;;; remove an edge between two nodes
     (defmethod view-delete-edge ((v view) (e view-edge))
       (let ((parent (vedge-from e))
             (child (vedge-to e)))
         (setf (view-edges v) (delete e (view-edges v)))
         (node-remove-edge parent e)
         (node-remove-edge child e)
         (op-prompt "~&Removing an edge between nodes:~@
                        parent: ~A (port ~A),~%child: ~A..."
                    (user-name (vnode-type parent))
                    (user-name (signature (vedge-yport e)))
                    (user-name (vnode-type child)))
         (ygraph-remove-edge (vnode-ynode parent)
                             (vnode-ynode child)
                             (vedge-yport e))
         (redraw e v)
         (op-prompt "done.")
         (finalize-instance e)))

;;; move a (possibly new) node to the front of a view
     (defmethod view-front-node ((v view) (n view-node))
       (setf (view-nodes v)
             (cons n (delete n (view-nodes v))))
       (redraw n v))

;;; add or delete an edge between two nodes in a view
     (defmethod view-connect-nodes ((v view) (parent view-node) (child
     view-node))
       (let ((already? (connected? parent child)))
         (if already?
             (view-delete-edge v already?)
             (view-add-edge v parent child))))

;;; move a node to a new position in a view.  We do this by
     ;;; figuring out the old extents of the node and its edges, then
     ;;; figuring out the new extents of the node and its edges, then
     ;;; invalidating all the areas that changed.
     (defmethod view-move-node ((v view) (n view-node) new-posn)
       (with-region extent
         (add-node-extent n extent)
         (setf (vnode-position n) new-posn)
         (add-node-extent n extent)
         (redraw extent v)))
```

```
;;;;;;;;;;;;;;;;;;;;;;;;;;;;;;;;;;;;;;;;;;;;;;;;;;;;;;;;;;;;;;;;;;;;;;;;-
;;;;;;;;;;;;;;
;;;; Hit Detection/Dragging on Views ;;; find the node in the view that was hit, if any.
     (defmethod view-hit-node ((v view) posn)
       (find-if #'(lambda (n) (hit? n posn)) (view-nodes v)))

;;; drag a grayed region, return the offset dragged or
     ;;; :out-of-range
     (defmethod view-drag-region-offset ((v view) extent start-point
                                          &optional maxup maxdown)
       (rlet ((limit-rect :rect)
              (slop-rect :rect))
         (copy-record (rref (window-record v) :grafport.portrect) :rect
     limit-rect)
         (inset-rect limit-rect 4 4)
         (when maxup (rset limit-rect :rect.top
                           (max (- (point-v start-point) maxup)
                                (rref limit-rect :rect.top))))
         (when maxdown (rset limit-rect :rect.bottom
                             (min (+ (point-v start-point) maxdown)
                                  (rref limit-rect :rect.bottom))))
         (copy-record limit-rect :rect slop-rect)
         (inset-rect slop-rect -36 -36)
         (let ((offset
                (with-port (window-record v)
                  (ccl:_DragGrayRgn :ptr extent :long start-point
                                    :ptr limit-rect :ptr slop-rect
                                    :word 0 :ptr nil
                                    :long))))
           (if (and (= (point-h offset) -32768)
                    (= (point-v offset) 0))
             :out-of-range
             offset))))

;;; create an outline for a single node and drag it,
     ;;; return its final center point or :out-of-range
     (defmethod view-drag-node-offset ((v view) start-point
                                        &optional maxup maxdown)
       (with-region extent
         (set-rect-region extent
                            (- (point-h start-point) *half-node-width*)
                            (- (point-v start-point) *half-node-height*)
                            (+ (point-h start-point) *half-node-width*)
```

```
                                    (+ (point-v start-point) *half-node-height*))
            (view-drag-region-offset v extent start-point maxup maxdown)))

;;; drag a grayed version of the selection, return the offset
       ;;; dragged or :out-of-range
       (defmethod view-drag-selection-offset ((v view) start-point
                                               &optional maxup maxdown)
          (with-region extent
             (add-selection-extent v extent)
             (view-drag-region-offset v extent start-point maxup maxdown)))

       ;;;;;;;;;;;;;;;;;;;;;;;;;;;;;;;;;;;;;;;;;;;;;;;;;;;;;;;;;;;;;;;;;;;;;-
       ;;;;;;;;;;;;;;;
       ;;;; Click Editing in Views
       ;;; a click on a node clears the existing selection and selects
       ;;; the node; shift-click extends/contracts the selection;
       ;;; dragging drags the selection; alt-click and drag between nodes
       ;;; connects/unconnects them; command-click adds a node;
       ;;; control-click deletes a node.
       (defmethod handle-click ((v view) where)
          (let ((shift? (shift-key-p))
                (option? (option-key-p))
                (control? (control-key-p))
                (command? (command-key-p))
                (hit-node (view-hit-node v where)))
             (unwind-protect
               (cond ((and control? (not command?) (not option?) (not shift?))
                      (maybe-click-delete v where))
                     ((and command? (not control?) (not option?) (not shift?))
                      (maybe-click-create v where))
                     ((or control? command?)
                      (ccl:ed-beep))
                     ((and shift? option?)
                      (ccl:ed-beep))
                     (shift?
                      (if hit-node
                          (extend-select-maybe-drag v hit-node where)
                         (ccl:ed-beep)))
                     (option?
                      (if hit-node
                         (maybe-connect v hit-node where)
                         (ccl:ed-beep)))
                     (t
                      (select-maybe-drag v hit-node where)))
                (window-update-event-handler v))))
```

```
;;; track the mouse and maybe delete the node it's over
(defmethod maybe-click-delete ((v view) mouse-pos)
    (let ((invnode nil)
          (curnode nil))
      (flet ((invert () (invert-region v (vobj-extent invnode))))
        ;; be sure to perform the action with interrupts ON
        (ccl:without-interrupts
         (loop
           (setf curnode (view-hit-node v mouse-pos))
           (cond ((eq curnode invnode))
                 ((null curnode)
                  (invert)
                  (setf invnode nil))
                 (t
                  (when invnode (invert))
                  (setf invnode curnode)
                  (view-front-node v invnode)
                  (draw invnode v)
                  (invert)))
           (when (mouse-up?)
             (when invnode (invert))
             (return))
           (setf mouse-pos (window-mouse-position v)))))
        (when (and invnode (check-key-state #'control-key-p))
          (view-delete-node v invnode)))
      t)

;;; track the mouse and maybe create a new node (selected)
(defmethod maybe-click-create ((v view) mouse-pos)
    (let ((offset (view-drag-node-offset v mouse-pos)))
      (when (and (numberp offset) (check-key-state #'command-key-p))
        (ccl:catch-abort
         (ccl:catch-cancel
          (let* ((center (add-points mouse-pos offset))
                 (posn (subtract-points center
                                         (make-point *half-node-width*
                                                     *half-node-height*)))
                 (node (view-add-node v posn)))
            (with-redraw-accumulation v
              (view-clear-selection v)
              (view-front-node v node)
              (view-select-node v node t)))))))
      t)
```

```
;;; track the mouse and maybe connect two nodes.  To ensure that
;;; the graph stays acyclic we only allow edges directed from an
;;; upper parent to a lower child
(defmethod maybe-connect ((v view) parent-node mouse-pos)
  (let ((invnode nil)
        (curnode nil)
        (min-pos (+ (point-v (vnode-position parent-node))
                    *node-height*
                    *node-separation*)))
    (flet ((invert () (invert-region v (vobj-extent invnode))))
      ;; be sure to perform the action with interrupts ON
      (ccl:without-interrupts
        (invert-region v (vobj-extent parent-node))
        (loop
          (setf curnode (view-hit-node v mouse-pos))
          (when (and curnode (< (point-v (vnode-position curnode)) min-pos))
            (setf curnode nil))
          (cond ((eq curnode parent-node)
                 (when invnode (invert))
                 (setf invnode nil))
                ((eq curnode invnode))
                ((null curnode)
                 (invert)
                 (setf invnode nil))
                (t
                 (when invnode (invert))
                 (setf invnode curnode)
                 (view-front-node v invnode)
                 (draw invnode v)
                 (invert)))
          (when (mouse-up?)
            (invert-region v (vobj-extent parent-node))
            (when invnode (invert))
            (return))
          (setf mouse-pos (window-mouse-position v)))))
      (when (and invnode (check-key-state #'option-key-p))
        (view-connect-nodes v parent-node invnode)))
    t)

;;; select the chosen node and maybe drag it
(defmethod select-maybe-drag ((v view) first-node first-pos)
  ;; first reset the selection
  (with-redraw-accumulation v
    (cond ((null first-node)
```

```
              (view-clear-selection v))
             ((selected? first-node)
              (view-front-node v first-node))
             (t
              (view-clear-selection v)
              (view-front-node v first-node)
              (view-select-node v first-node t))))
       (window-update-event-handler v)
       ;; now drag it
       (when first-node
          (maybe-drag-selection v first-pos))
       t)

;;; extend the selection and maybe drag a selected node
(defmethod extend-select-maybe-drag ((v view) first-node first-pos)
    ;; first fix the selection
    (with-redraw-accumulation v
      (view-front-node v first-node)
      (view-select-node v first-node (not (selected? first-node))))
    (window-update-event-handler v)
    ;; now drag it
    (when (selected? first-node)
       (maybe-drag-selection v first-pos))
    t)

;;; maybe drag the selection. to avoid confusion, we don't let
;;; anybody go above their parents.
(defmethod maybe-drag-selection ((v view) first-pos)
    ;; first see if user wants to drag
    (rlet ((small-rect :rect
                      :topleft (subtract-points first-pos #@(2 2))
                      :bottomright (add-points first-pos #@(2 2))))
       (loop
          (when (mouse-up?)
             (return-from maybe-drag-selection nil))
          (when (not (point-in-rect-p small-rect (window-mouse-position
v)))
             (return))))
    ;; now drag
    (multiple-value-bind (maxup maxdown) (view-selection-bracket v)
       (let ((offset (view-drag-selection-offset v first-pos maxup
maxdown)))
          (when (numberp offset)
             (view-move-selection v offset)))))
```

```
;;;;;;;;;;;;;;;;;;;;;;;;;;;;;;;;;;;;;;;;;;;;;;;;;;;;;;;;;;;;;;;;;;;;;;;;-
;;;;;;;;;;;;;
;;;; Support Routines ;;; print a character centered on a white rectangle at the given
;;; position in the current grafport
(defun center-char (char posn)
  (multiple-value-bind (ascent descent widmax)
                       (ccl:font-info)
    (let* ((cx (point-h posn))
           (cy (point-v posn))
           (cwid (ccl:_CharWidth :word (char-code char) :word))
           (rd (truncate widmax 2))
           (ld (- widmax rd))
           (td (truncate (+ ascent descent) 2))
           (bd (- (+ ascent descent) td))
           (bline (- bd descent))
           (rdist (- cwid (truncate cwid 2))))
      (rlet ((cr :rect
                 :top     (- cy td) :left   (- cx ld)
                 :bottom  (+ cy bd) :right  (+ cx rd)))
        (ccl:_EraseRect :ptr cr :novalue)
        (ccl:_MoveTo :word (- cx rdist) :word (+ cy bline) :novalue)
        (ccl:_DrawChar :word (char-code char) :novalue)))))

;;; -*- mode:lisp; package:y3ui -*-
;;; Copyright (c) 1989 by the Xerox Corporation.  All rights reserved.

;;;; YGraph Manipulation from Yeti's Editor (in-package 'y3ui)

;;;;;;;;;;;;;;;;;;;;;;;;;;;;;;;;;;;;;;;;;;;;;;;;;;;;;;;;;;;;;;;;;;;;;;;;-
;;;;;;;;;;;;;
;;;; Editor Signature Information
;;;
;;; This code just provides the defining forms for signatures;
;;; the actual signature declarations are done in SIGNATURES.

;;; Both nodes and ports have signatures, which always keep a
;;; user-visible name for the op or port.
(defclass signature ()
  ((real-name :type symbol :accessor real-name :initarg :real-name)
   (user-name :type string :accessor user-name :initarg :user-name))
  )
```

```
;;; here's a normal print function and a user-name print function
(defmethod print-object ((s signature) stream)
  (format stream "#<~S ~S ~D>"
          (class-name (class-of s))
          (real-name s)
          (ccl:%ptr-to-int s)))
(defmethod princ-real-name ((s signature) stream)
  (princ (real-name s) stream))
(defmethod princ-user-name ((s signature) stream)
  (princ (user-name s) stream))

;;; node signatures point to the node's ports and its icon and
;;; indicated whether it should be labelled in the view.
(defclass node-signature (signature)
  ((ports :type list :accessor ports :initarg :ports)
   (icon :accessor icon :initarg :icon)
   (label? :accessor label? :initarg :label?))
  )

;;; port signatures say whether it's a single- or multi-port
;;; (or possibly a max-limited multi-port) and also the types of
;;; nodes that can fill this port.
(defclass port-signature (signature)
  ((arity :type (or keyword number) :accessor port-arity :initarg :arity)
   (types :type list :accessor port-types :initarg :types)
   )
  )

;;; the list of all known node signatures.  The order of entries
;;; in this list is important; it's the order used to present
;;; node types to the user when a choice is needed.
(defvar *node-signatures* nil)

;;; this is a handy way to declare a node's signature in full;
;;; it's careful to maintain the order of the signatures when one
;;; gets redefined.
(defmacro define-node-signature (node-name
                                 (user-name icon &optional label?)
                                 &body port-specs)
  (let ((class (find-class node-name nil)))
    (unless (and class (typep class 'yl::operator-class))
      (error "There is no node type named ~S." node-name))
    (unless (stringp user-name)
      (error "Node's user name not a string: ~S" user-name))
```

```
              (unless (numberp icon)
                (error "Node's icon resource ID is not a number."))
              (let* ((signature (yl::signature class)))
                (flet ((port-spec->constructor (spec)
                         (unless (and (listp spec) (>= (length spec) 2))
                           (error "Invalid port signature specification: ~S"
spec))
                         (let* ((sig (assoc (first spec) signature))
                                (user-name (coerce (second spec) 'string))
                                (max-fillers (and (eq (second sig) :multiple)
                                                  (numberp (third spec))
                                                  (third spec)))
                                (fillers (if max-fillers (cdddr spec) (cddr
spec))))
                           (unless sig
                             (error "No port ~S on ~S nodes." (first spec)
node-name))
                           (unless (Rand (typep (find-class (Elist fillers) nil)
                                          'yl::operator-class))
                             (error "Allowed filler not a node type: ~S"
fillers))
                           (setf signature (remove sig signature))
                           `(make-instance 'port-signature
                                           :real-name ',(first sig)
                                           :user-name ',user-name
                                           :arity ',(or max-fillers (second
sig))
                                           :types ',(or (copy-list fillers)
                                                        (list 'yl::operator)-
))))))
                  `(eval-when (eval load)
                     (let ((sig (make-instance 'node-signature
                                   :real-name ',node-name
                                   :user-name ',user-name
                                   :icon ',icon
                                   :label? ',label?
                                   :ports (list ,@(mapcar #'port-spec->constructor
                                                          port-specs))))
                           (curpos (position ',node-name *node-signatures*
                                             :key #'real-name)))
                       (if curpos
                           (setf (elt *node-signatures* curpos) sig)
                           (setf *node-signatures*
                                 (nconc *node-signatures* (list sig))))
                       sig))))))
```

```
;;; for reference: an alist of all the known nodes and their
;;; signatures.  You can check to see which nodes haven't yet
;;; had signatures defined by doing
#|
     (set-difference (mapcar #'car *node-types*)
                     (mapcar #'real-name *node-signatures*))
|#
(defparameter *node-types*
  (let ((ops nil))
    (do-symbols (s 'yeti-language)
      (let ((class (find-class s nil)))
        (when (and class (typep class 'yl::operator-class))
          (push (cons s (yl::signature class)) ops))))
    ops))

;;;;;;;;;;;;;;;;;;;;;;;;;;;;;;;;;;;;;;;;;;;;;;;;;;;;;;;;;;;;;;;;;;;;;;;;;-
;;;;;;;;;;;;;;;
;;;; Dialogs for Node and Port Selections ;;; a sequence item for a nptype dialog
(defclass nptype-sequence-item (sequence-dialog-item-object)
  ((types :accessor types)
   (dialog :accessor dialog :initarg :dialog))
  (:metaclass matched-object-class)
  (:default-initargs
    :dialog-item-font '("Monaco" 9 :plain)
    :sequence-order :vertical
    :table-hscrollp nil
    :selection-type :single))

;;; the cell size of the nptype sequence is as large as the table
(defmethod initialize-instance ((bsi nptype-sequence-item) &rest
initargs)
  (call-next-method)
  (setf (cell-size bsi)
        (make-point (point-h (dialog-item-size bsi)) 12)))

;;; double-clicking an nptype-sequence item is like doing an OK
(defmethod dialog-item-click-event-handler ((bsi nptype-sequence-item)
where)
  (if (ccl:double-click-p)
      (accept-values (dialog bsi))
    (call-next-method)))

;;; nptype-selection dialogs are modal and have a seq of names
```

```
(defclass nptype-dialog (dialog-object)
  ((sequence :accessor sequence)
   (prompt :accessor prompt))
  (:metaclass matched-object-class)
  (:default-initargs
    :window-type :double-edge-box
    :close-box-p t
    :window-title "Type Dialog"
    :window-position '(:top 40)
    :window-size #@(300 215)
    :window-font '("Chicago" 12 :plain))
  )

;;; nptype-selection dialogs have a prompt and OK and cancel
;;; buttons, along with their sequence.
(defmethod initialize-instance ((npd nptype-dialog)
                                &rest initargs)
  (apply #'call-next-method npd :window-show nil initargs)
  (setf (sequence npd)
        (make-instance 'nptype-sequence-item
                       :dialog npd
                       :dialog-item-size #@(200 170)
                       :dialog-item-position #@(15 35)))
  (setf (prompt npd) (make-instance 'static-text-dialog-item-object
                                    :dialog-item-text "No prompt"
                                    :dialog-item-position #@(15 8)
                                    :dialog-item-size #@(200 18)))
  (add-dialog-items npd
    (make-instance 'nptype-ok-button
                   :dialog-item-position #@(235 89)
                   :dialog npd)
    (make-instance 'nptype-cancel-button
                   :dialog-item-position #@(235 113)
                   :dialog npd)
    (prompt npd)
    (sequence npd)
    )
  )

;;; remake an nptype dialog with new prompt and sequence
(defmethod reset-instance ((npd nptype-dialog) prompt types)
  (setf (dialog-item-text (prompt npd)) prompt)
  (let ((seq (sequence npd)))
    (when (selected-cells seq)
      (cell-deselect seq (first (selected-cells seq))))
```

```
       (setf (types seq) types)
       (setf (table-sequence seq) (mapcar #'user-name types)))
     npd)

;;; accept the user values if we can
   (defmethod accept-values ((npd nptype-dialog))
     (let* ((seq (sequence npd)))
       (cond ((= 1 (length (selected-cells seq)))
              (let* ((name (cell-contents seq (first (selected-cells
   seq))))
                     (nptype (find name (types seq) :key #'user-name)))
                (unless nptype
                  (error "Couldn't find sigature for name: ~S" name))
                (return-from-modal-dialog nptype)))
             (t
              (ccl:_SysBeep :word 10 :novalue)))))

;;; an OK button for a nptype dialog
   (defclass nptype-ok-button (button-dialog-item-object)
     ((dialog :accessor dialog :initarg :dialog))
     (:metaclass matched-object-class)
     (:default-initargs
      :dialog-item-text "OK"
      :dialog-item-size #@(50 18))
     )

;;; the action for the OK button is to set the values
   (defmethod dialog-item-action ((ok nptype-ok-button))
     (accept-values (dialog ok)))

;;; a Cancel button for a nptype dialog
   (defclass nptype-cancel-button (button-dialog-item-object)
     ((dialog :accessor dialog :initarg :dialog))
     (:metaclass matched-object-class)
     (:default-initargs
      :dialog-item-text "Cancel"
      :dialog-item-size #@(50 18))
     )

   ;;; the action for the Cancel button is to cancel
   (defmethod dialog-item-action ((ok nptype-cancel-button))
     (return-from-modal-dialog :cancel))

;;; create a hidden modal dialog for quick use in
   ;;; nptype-selection
```

```
          (let ((nptype-dialog nil))
            (defun current-nptype-dialog ()
              nptype-dialog)
            (defun destroy-nptype-dialog ()
              (when (and nptype-dialog
                         (typep nptype-dialog 'nptype-dialog))
                (window-close nptype-dialog)))
            (defun ensure-nptype-dialog (prompt types)
              (setf nptype-dialog
                    (reset-instance (or (and nptype-dialog
                                             (typep nptype-dialog 'nptype-di-
alog)
                                             (matched-object nptype-dialog)
                                             (window-record-boundp nptype-di-
alog)
                                             nptype-dialog)
                                        (make-instance 'nptype-dialog))
                                    prompt types)))
          ) ;let ;;; select a signature object modally
          (defun select-signature (types prompt)
            (unless (and (stringp prompt) (consp types))
              (error "No prompt or types for an type selection?"))
            (modal-dialog (ensure-nptype-dialog prompt types)
                          nil)
          #|
            (first (ccl:select-item-from-list types
                     :window-title prompt
                     :table-print-function #'princ-user-name
                     :selection-type :single))
          |#
          )

;;;;;;;;;;;;;;;;;;;;;;;;;;;;;;;;;;;;;;;;;;;;;;;;;;;;;;;;;;;;;;;;;;;;;-
;;;;;;;;;;;;
          ;;;; Node Creation
          ;;;
          ;;; When the user creates a node in the view, he is asked what
          ;;; type the node should be and then a ygraph node of that type is
          ;;; created.  Node type selection is defined here; node
          ;;; generation is controlled in the usual ways.

;;; have the user choose a node type; return its signature
```

```
(defun select-node-type (&optional (format-string "Choose a node
type:")
                                  &rest format-args)
  (let* ((prompt (apply #'format nil format-string format-args))
         (type (select-signature *node-signatures* prompt)))
    (unless (and type (typep type 'signature))
      (op-cancel "~|Unknown error during node type selection."))
    type))

;;;;;;;;;;;;;;;;;;;;;;;;;;;;;;;;;;;;;;;;;;;;;;;;;;;;;;;;;;;;;;;;;;;-
;;;;;;;;;;;;;;
;;;; Node Connection
;;;
;;; When the user connects two nodes in the view, their ygraph
;;; nodes are connected as well.  To do this, we have to figure
;;; out what port the connection should be along (asking if
;;; necessary) and which member of the port the connection
;;; should be (asking if necessary)

;;; edges refer back to ygraph connections via port
;;; specifications, which are essentially a list of a port name
;;; and a position within the port
(defclass port-spec ()
  ((signature :type port-signature :reader signature :initarg
:signature)
   (index :type number :reader index :initarg :index :initform 0))
  )

;;; port spec's print with their port name and index
(defmethod print-object ((p port-spec) s)
  (format s "#<~S ~S ~S ~D>"
          (class-name (class-of p))
          (real-name (signature p))
          (index p)
          (ccl:%ptr-to-int p)))

;;; find the port that a child should be attached to its parent
;;; to (according to the type of both).  Return a port spec (to add
;;; the child to) or NIL.
(defun select-port (parent child)
  (let ((sig (find (class-name (class-of parent)) *node-signatures*
                   :key #'real-name))
        (matches nil))
    (when sig
      (do ((psigs (ports sig) (rest psigs)))
```

```
                  ((null psigs))
                (when (find child (port-types (first psigs)) :test #'typep)
                  (unless (port-full parent (first psigs))
                    (push (first psigs) matches))))
     (when matches
       (if (null (rest matches))
           (make-instance 'port-spec
                          :signature (first matches)
                          :index (select-port-index
                                  parent child (first matches)))
           (let* ((prompt "Connect using which port:")
                  (port (select-signature matches prompt)))
             (unless (and port (typep port 'port-signature))
               (op-cancel "~|Unexpected error choosing port name."))
             (make-instance 'port-spec
                            :signature port
                            :index (select-port-index parent child
port))))))))

;;; see if a port is already filled
(defun port-full (parent port-sig)
  (let ((arity (port-arity port-sig)))
    (cond ((eq arity :single)
           (not (yl::empty-arg-p parent (real-name port-sig))))
          ((eq arity :multiple)
           nil)
          ((numberp arity)
           (>= (yl::number-of-occupants parent (real-name port-sig))
arity))
          (t
           (error "Unexpected port signature arity: ~S" arity)))))

;;; find the index within a port that a child should be in
(defun select-port-index (parent child port-sig)
  (declare (ignore child))
  (let ((parent-sig (find (class-of parent) *node-signatures*
                          :key #'real-name))
        (max (port-arity port-sig))
        (current (yl::number-of-occupants parent (real-name
port-sig))))
    (cond ((eq max :single)
           (unless (yl::empty-arg-p parent (real-name port-sig))
             (op-cancel "~|Sorry, but the ~A node~%already has a ~A
child."
                        (user-name parent-sig) (user-name port-sig)))
```

```
                            nil)
                         ((eq max :multiple)
                          :last)
                         ((numberp max)
                          (when (<= max current)
                            (if (= max 1)
                                (op-cancel "~|Sorry, but the ~A node~%already has a
~A child."
                                           (user-name    parent-sig)    (user-name
            port-sig))
                                (op-cancel "~|Sorry, but the ~A node~%already has ~D ~A
children."
                                           (user-name    parent-sig)    max   (user-name
port-sig))))
                          :last)
                         (t
                          (error "Unexpected port signature arity: ~S" max)))))

;;; add an edge to a ygraph from the parent node to the child
      ;;; node according to the port specification.
      (defmethod ygraph-add-edge ((parent yl::operator)
                                  (child yl::operator)
                                  (port port-spec))
        (yl::connect-nodes parent (real-name (signature port)) child (index
      port)))

     ;;; remove an edge in a ygraph between the parent node and the
      ;;; child node according to the port specification and assuming
      ;;; there is only one such edge
      (defmethod ygraph-remove-edge ((parent yl::operator)
                                     (child yl::operator)
                                     (port port-spec))
        (let* ((psig (signature port))
               (parity (port-arity psig))
               (pname (real-name psig)))
          (cond ((not (yl::parent-child-p parent child pname))
                 (cerror "Just ignore the edge-removal attempt."
                         "Trying to remove an edge from ~S~@
                          to ~S along ~S,
                          but there isn't one."
                         parent child port))
                ((eq parity :single)
                 (yl::disconnect-child parent pname))
                ((or (eq parity :multiple) (numberp parity))
                 (yl::disconnect-one-child parent pname child))
```

```
              (t
                (error "Unexpected port signature arity: ~S" parity)))))

;;;;;;;;;;;;;;;;;;;;;;;;;;;;;;;;;;;;;;;;;;;;;;;;;;;;;;;;;;;;;;;;;;;;;;-
      ;;;;;;;;;;;;;;
      ;;;; Language Modifications ;;; redefine zero-reference count action on nodes so that they
      ;;; don't get clobbered when their parents go away. Otherwise
      ;;; removing an edge in the view from an existing node could lead
      ;;; to real problems
      (defmethod yl::zero-reference-action ((op yl::operator))
        ;; (format t "~&Disconnected -S." op)
        ())

;;; improve the message for the most common error encountered
      ;;; during execution: missing children.  Do this by pre-checking
      ;;; to make sure there are none.
      (defmethod yl::coalesce-view-regions :before ((node yl::graphic-operator)
                                                    &rest ignore)
        (declare (ignore ignore))
        (yl::mapc-arguments-with-name
         #'(lambda (parent arg-name child)
             (when (eq child yl::*unspecified-operator*)
               (let* ((parent-sig (find (class-name (class-of parent))
                                        *node-signatures*
                                         :key #'real-name))
                      (port-sig (find arg-name (ports parent-sig)
                                      :key #'real-name)))
                 (op-cancel "~|Graph Execution Error: the graph contains a~@
                             ~A node which is missing a child~@
                             on its ~A port."
                            (user-name parent-sig)
                            (user-name port-sig)))))
         node))

;;; -*- mode:lisp; package:y3ui -*-
      ;;; Copyright (c) 1989 by the Xerox Corporation.  All rights reserved.

;;;; Editor Signature information about ygraph nodes (in-package 'y3ui)
```

```
;;;;;;;;;;;;;;;;;;;;;;;;;;;;;;;;;;;;;;;;;;;;;;;;;;;;;;;;;;;;;;;;;;;;;;;;;;;-
;;;;;;;;;;;;;
;;;; Declarations of Actual Signatures (define-node-signature yl::raster-canvas
    ("Viewer" #x080 t)
    (yl::components "Raster Appearance" 1 yl::raster-appearance)
    )

(define-node-signature yl::pattern-raster-constant
    ("Background" #x102 t)
    )

(define-node-signature yl::raster-constant
    ("Raster Appearance" #x100 t)
    )

(define-node-signature yl::segment-set
    ("Line Segment Appearance" #x101 t)
    )

(define-node-signature yl::raster-displacement
    ("Displacement" #x103 t)
    )

(define-node-signature yl::raster-point
    ("Point" #x104 t)
    )

(define-node-signature yl::superposition
    ("Superposition" #x205 nil)
    (yl::components "Raster Appearances" yl::raster-appearance)
    )

(define-node-signature yl::translation
    ("Translation" #x202 nil)
    (yl::input "Translated Appearance"
               yl::raster-appearance yl::segment-appearance)
    (yl::displacement "Displacement" yl::raster-displacement)
    )

(define-node-signature yl::segment->raster
    ("Scan Conversion" #x203 nil)
    (yl::segment-set "Line Segments" yl::segment-appearance)
    )
```

```
(define-node-signature yl::segment->raster-parameterized
  ("Parameterized Scan Conversion" #x203 nil)
  (yl::segment-set "Line Segments" yl::segment-appearance)
  (yl::pen-pattern "Pen Appearance" yl::pattern-raster-constant)
  (yl::pen-size "Pen Size" yl::raster-point)
  )

(define-node-signature yl::polygon-finder
  ("Polygon Finder" #x201)
  (yl::segment-set "Line Segments" yl::segment-appearance)
  (yl::interior-point "Enclosed Point" yl::raster-point)
  )

(define-node-signature yl::raster-clipper
  ("Mask" #x204 nil)
  (yl::source-raster "Masked Raster Appearance" yl::raster-appearance)
  (yl::clip-polygon "Masking Polygon" yl::segment-appearance)
  )
```

What is claimed is:

1. An electronic image generator for generating electronically manipulatable images, comprising:

means for generating two or more output images capable of being displayed, said output images being generated as a result of performing zero or more operator selected graphics transformation operations on one or more source images;

means for constructing and displaying a graphical flow diagram of an image forming process used to generate said two or more output images from said one or more source images using the selected graphics transformation operations, said graphical flow diagram including:

a plurality of nodes which represent said one or more source images, said zero or more selected transformation operations, and said two or more output images, each of said plurality of nodes representing only a single source image, selected graphics transformation operation, or output image, said graphical flow diagram further including:

interconnections that interconnect said nodes in accordance with said image formation process so that said selected graphics transformation operations are interconnected between said one or more source images and said two or more output images formed from said one or more source images;

means for controlling said graphical display constructing means to form and modify said graphical flow diagram, and means for automatically generating and displaying an output window for each output node whenever the graphical flow diagram is executed and displaying each output window simultaneously with a window displaying the graphical flow diagram, wherein said means for generating two or more output images is responsive to the graphical flow diagram generated by said graphical display constructing means, as controlled by said means for controlling, so as to generate said two or more output images.

2. The electronic image generator of claim 1, wherein said graphical flow diagram is acrylic.

3. The electronic image generator of claim 1, wherein said graphical flow diagram corresponds to an image formation process having a plurality of said source images in which each source image is interconnected to zero or more of said selected graphics transformation operations, in which an output of at least some of said selected graphics transformation operations are subjected to further graphics transformation operations, in which at least one of said plural source images and the output of at least some of said graphics transformation operations is used as the two or more output images.

4. The electronic image generator of claim 3, wherein said output images result from said selected graphics transformation operations when at least one of said graphics transformation operations is selected.

5. The electronic image generator of claim 3, further comprising means for translating image data defining said source images or outputs of transformation operations into different graphical domains so that said image data is processed by transformation operations operating in different graphical domains.

6. The electronic image generator of claim 5, wherein said means for translating permits translation of image data into a graphical domain for display.

7. The electronic image generator of claim 5, wherein said different graphical domains include at least two-dimensional raster and two-dimensional vector.

8. The electronic image generator of claim 7, wherein said transformation operations selectively operate in a single graphical domain or across different graphical domains so that each transformation operation has input protocols and output protocols, and wherein said means for controlling controls said means for constructing and displaying a graphical flow diagram so that the graphical flow diagram is constructed according to said input and output protocols.

9. The electronic image generator of claim 1, wherein said means for controlling is responsive to operator inputted commands.

10. The electronic image generator of claim 1, wherein said means for controlling causes said means for generating one or more output images to simultaneously display the one or more output images with the displayed graphical flow diagram.

11. The electronic image generator of claim 1, wherein the nodes of the graphical flow diagram are generated and displayed in a vertically-ordered manner, such that the nodes representing transformation operations appear above the nodes representing source images or other transformation operations to which they are being applied, and the nodes representing output images appear above the nodes representing source images or the transformation operations to which they are connected.

12. The electronic image generator of claim 1, wherein said means for controlling permits the source images and the graphics transformation operations to be selected by an operator from a library.

13. The electronic image generator of claim 12, further comprising means for defining and entering additional source images and transformation operations into said library.

14. The electronic image generator of claim 1, wherein said means for generating two or more output images can use source images and results of performing graphics transformation operations on source images as inputs to a plurality of further graphics transformation operations, said means for constructing a graphical flow diagram displays an interconnection between a node associated with said source images and said results of performing graphics transformation operations and nodes representing each of said plurality of said further graphics transformation operations.

15. The electronic image generator of claim 1, further comprising a display screen, wherein said output images and said graphical flow diagram of an image formation sequence used to produce said output images are generated on said display screen.

16. An electronic image generator for generating electronically manipulatable images, comprising:

means for generating, selecting and displaying image source display icons representative of one or more image sources which are used in an image formation process, transformation operation display icons representative of graphics transformation operations which are performed in the image formation process on the image source and on outputs of other graphics transformation operations, and output image display icons representative of two or more output images that are output by said image formation process, each image source display icon representing one image source, each transformation operation display icon representing one graphics transformation operation, each output image display icon representing one output image formed by said image formation process;

means for generating and displaying interconnect display lines which interconnect said image source icons, said transformation operation icons and said output image display icons to form and display a graphical flow diagram in which at least one source image icon is connected either directly or through a sequence of transformation operation icons to at least one output image display icon, wherein said graphical flow diagram represents said image formation process performed on the source images to produce the two or more output images and the graphical flow diagram can be modified by altering at least one of the group including the image source display icons and the interconnect display lines;

means for generating said two or more output images using the image formation process shown in the displayed graphical flow diagram; and means for automatically generating and displaying an output window for each output image display icon whenever the graphical flow diagram is executed and displaying each output window simultaneously with a window displaying the graphical flow diagram.

17. The electronic image generator of claim 16, wherein said graphical flow diagram is an acrylic graph.

18. The electronic image generator of claim 17, further comprising means for controlling said display icon generating and displaying means and for controlling said means for generating and displaying interconnect display lines responsive to commands input by an operator for forming and modifying a displayed graphical flow diagram.

19. The electronic image generator of claim 16, wherein said image source display icons, said transformation operation display icons, and said output image display icons are generated in a vertically-ordered manner, such that the display icons of all transformation operations appear above the display icons of the source images or other transformation operations to which they are being applied, and the display icons of each output image appears above the display icon of the source image or transformation operation to which it is connected.

20. A method of generating a graphical representation of an image formation process, comprising:

selecting at least one image source used as a component of two or more final output images;

selecting zero or more graphics transformation operations that are performed on said one or more image sources to produce said two or more final output images; and generating a graphical flow diagram including:

display icons representing said selected image sources, said selected graphics transformation operations, and said selected final output images, each of said display icons representing only a single image source, selected graphics transformation operation, or selected final output image, display interconnections between said image sources, said selected graphics transformation operations, and said final output images which represent an image formation sequence which is performed to produce said two or more final output images from said at least one image source, and automatically generating and displaying an output window for each output image display icon whenever the graphical flow diagram is executed and displaying each output window simultaneously with a window displaying the graphical flow diagram.

21. The method of claim 20, further comprising:

defining said display interconnections between said image sources, said graphics transformation operations, and said final output images.

22. The method of claim 21, wherein said selecting and defining steps are performed based upon operator inputted control signals.

23. The method of claim 22, wherein said graphical flow diagram is generated on a display screen, and said operator inputted control signals are input by operator manipulations of a cursor on said display screen.

24. The method of claim 20, wherein said selecting steps are performed based upon operator inputted control signals.

25. The method of claim 24, wherein said graphical flow diagram is generated on a display screen, and said operator inputted control signals are input by operator manipulations of a cursor on said display screen.

26. A method of constructing a graphics image represented by an output image display icon from one or more image sources represented by image source display icons, each of said one or more image sources represented by a single one of said image source display icons, and from zero or more graphics transformation operations represented by transformation operation display icons, each of said zero or more graphics transformation operations represented by a single one of said transformation operation display icons, each graphics transformation operation capable of being performed on at least one of said image sources, said method comprising:

selecting at least one of said image source from a library as a component of a final output image;

selecting zero or more of said graphics transformation operations to be performed on said at least one image source to produce said final output image from a library;

generating a graphical flow diagram of an image formation sequence required to produce said final output image by generating on a display screen the display icons associated with the selected image sources, the selected transformation operations, the final output image, and interconnections extending between said image source display icons, said selected transformation operation display icons, and said output image display icon which represent the image formation sequence which is performed to produce said final output image;

generating the final output image by executing the selected graphics transformation operations on the selected image sources according to said graphical flow diagram, and automatically generating and displaying an output window for each output image display icon whenever the graphical flow diagram is executed and displaying each output window simultaneously with a window displaying the graphical flow diagram.

27. The method of claim 26, wherein said graphical flow diagram is generated as an acyclic graph.

28. The method of claim 26, wherein said selecting steps are performed based upon operator inputted control signals.

29. The method of claim 28, wherein said operator inputted control signals are input by operator manipulations of a cursor on said display screen.

30. The method of claim 26, wherein said image source display icons, said transformation operation display icons, and said output image display icon are generated in a vertically-ordered manner, such that the display icons of all transformation operations appear above the display icons of the source images and other transformation operations to which they are being applied, and the display icon of said output image appears above the display icon of the source image or transformation operation to which it is connected.

31. An electronic image generator for generating electronically manipulatable images, comprising:

a display that generates two or more output images, said two or more output images being generated as a result of performing zero or more operator selected graphics transformation operations on one or more source images;

a processor constructing and displaying a graphical flow diagram of an image forming process used to generate said two or more output images from said one or more source images using the selected graphics transformation operations; and a memory that stores data, the data including plurality of nodes which represent said one or more source images, said zero or more selected transformation operations, and said two or more output images, each of said plurality of nodes representing only a single source image, selected graphics transformation operation, or output image;

wherein said display automatically generates and displays an output window for each output node whenever the graphical flow diagram is executed and displays each output window simultaneously with a window displaying the graphical flow diagram, said processor controls formation and modification of said graphical flow diagram, said display being responsive to the graphical flow diagram generated by said to generate said one or more output images.

32. A generator according to claim 31, further comprising interconnections that connect said plurality of nodes in accordance with said image formation process so that said selected graphics transformation operations are interconnected between said two or more source images and said one or more output images formed from said one or more source images.

33. A generator according to claim 31, further comprising an operator input device that provides operator input to said processor.

34. A generator according to claim 31, wherein the data further includes instruction data that instructs the processor to construct and display the graphical flow diagram.

* * * * *

UNITED STATES PATENT AND TRADEMARK OFFICE
CERTIFICATE OF CORRECTION

PATENT NO. : 5,490,246
DATED : February 6, 1996
INVENTOR(S) : Daniel C. BROTSKY, Daniel Eli RABIN, and David Myron LEVY It is certified that error appears in the above-identified patent and that said Letters Patent is hereby corrected as shown below:

Figure 5, please change "VIEWER E" to --DISPLACEMENT G--

Signed and Sealed this

Ninth Day of January, 2001

*Attest:*

Q. TODD DICKINSON

*Attesting Officer*     *Commissioner of Patents and Trademarks*